United States Patent [19]
Hayashi et al.

[11] Patent Number: 5,633,996
[45] Date of Patent: May 27, 1997

[54] DEVICE AND METHOD FOR LAYOUT OF A STRUCTURED DOCUMENT USING MULTI-COLUMN AREAS

[75] Inventors: Naoki Hayashi; Kazuo Saito; Minoru Ikeda, all of Yokohama, Japan

[73] Assignee: Fuji Xerox Co., Ltd., Japan

[21] Appl. No.: 336,324

[22] Filed: Nov. 8, 1994

Related U.S. Application Data

[63] Continuation of Ser. No. 956,046, Oct. 2, 1992, abandoned.

[30] Foreign Application Priority Data

Oct. 2, 1991 [JP] Japan ................................ 3-255576

[51] Int. Cl.$^6$ ............................................. G06F 15/00
[52] U.S. Cl. ................................... 395/774; 395/783
[58] Field of Search ............................ 395/144–149, 395/774, 783

[56] References Cited

U.S. PATENT DOCUMENTS

| | | | |
|---|---|---|---|
| 4,539,653 | 9/1985 | Bartlett et al. | 395/148 |
| 4,575,813 | 3/1986 | Bartlett et al. | 395/147 |
| 4,608,662 | 8/1986 | Watanabe et al. | 364/900 |
| 4,891,771 | 1/1990 | Edel et al. | 395/148 |
| 5,051,930 | 9/1991 | Kuwabara et al. | 395/148 |
| 5,214,755 | 5/1993 | Mason | 395/147 |
| 5,249,265 | 9/1993 | Liang | 395/160 |

OTHER PUBLICATIONS

"Quattro Pro", 1990, pp. 282,283,314,315.
"Using Microsoft Word", 1989, pp. 399–412.
ISO8613-2 Information Processing—Office Document Architecture (ODA) and interchange format (1989).
Furuta, et al., "Concepts and Models for Structured Documents," Cambridge University Press (1989), pp. 8–74.
L. Lamport, "LATEX: A Document Preparation System." Addison—Wesley Publishing Company, Inc. (1986). pp. 82–84.

Primary Examiner—Almis R. Jankus
Assistant Examiner—Joseph R Burwell
Attorney, Agent, or Firm—Welsh & Katz, Ltd.

[57] ABSTRACT

A document layout processing device for the layout of a structured document is disclosed wherein a logical structure of a document is stored in the device; the logical structure has a preselected specific page format with a plurality of columns; document contents corresponding to each of the components of the logical structure; and a layout directive information indicating whether the components of the logical structure should be laid out in a single column or in a multi-column area, whereby a content layout method lays out the document in one of the columns or in the multi-column area according to the logical structure while referring to the layout directive information; and a method of using the device for generating a multi-column area that extends over a number of columns including a specific column.

15 Claims, 71 Drawing Sheets

| ATTRIBUTE NAME | ATTRIBUTE VALUE |
|---|---|
| PAGE WIDTH | 210 |
| PAGE HEIGHT | 297 |
| NUMBER OF COLUMNS | 2 |
| COLUMN WIDTH | 80 |
| NUMBER OF LINES | 25 |
| LINE HEIGHT | 10 |
| COLUMN SPACING | 10 |

DEVICE AND METHOD FOR LAYOUT OF A STRUCTURED DOCUMENT USING MULTI-COLUMN AREAS

This is a continuing application based on U.S. Ser. No. 956,046, filed Oct. 2, 1992 abandoned.

BACKGROUND OF THE INVENTION

1. Field of the Invention

The present invention relates to a document layout processing device for automatically generating a document layout structure based on the contents of a document in accordance with restrictions on the document layout.

2. Description of the Related Art

There have been proposed document processing models as the basis of a document processing technique which automatically generates a document layout structure in accordance with the contents of the document (hereinafter referred to as document layout processing) Such models include ODA (ISO863: Information Processing-Text and Office Systems-Open Document Architecture (ODA) and Interchange Format (1989)) and tnt (J. Andre, R. Furuta, V. Quint: Structured Documents, Cambridge University Press (1989) or LATEX (L. Lamport: LATEX: A Document Preparation System, Addison-Wesley Publishing Company, Inc. (1986)). Layout processing devices on the basis of these models are realized. For example, a layout processing device on the basis of the ODA is disclosed in Published Unexamined Patent Applications Hei 2-157067 and Hei 2-157068 filed in Japan by the same applicant as that of this application.

Such layout processing devices have rendered it possible to automatically determine the position of a frame in accordance with a quantity of contents to be laid out without manually laying out the frame at a specified position on a page.

However, in such conventional devices, the generated layout structure is of nested rectangular areas. When rectangular areas are required to have same dimensions, a rectangular area which encloses these rectangular areas is required. For example, when a layout as shown in FIG. 56(a) is desired, a structure expressed by the conventional model is as shown in FIG. 56(b). If there are rectangular areas whose nesting levels are the same, the sequence of laying out logical structures to those rectangular areas is uniquely determined, for example, from an upper area to a lower one.

In FIG. 56(b), a rectangular area 1, a figure area and a rectangular area 2 are at the same nesting level, so that logical structures are laid out in the sequence of the rectangular area 1, figure area and rectangular area 2. Since sentence areas 1 and 2 in the rectangular area 1 are at the same nesting level, logical structures are laid out in the sequence of sentence areas 1 and 2. This applies to sentence areas 3 and 4 in the rectangular area 2. As a result, in this example, the sentence contents which the logical structures have can be laid out in accordance with the sequence of sentence areas 1, 2, 3 and 4.

However, the above-described document layout processing raises a problem when laying out a multi-column document. FIG. 57(a) shows an example of a manual layout in which a heading frame covering two columns appears for each paragraph heading in a basic page of 3 columns. In this example, heading frames are alternately laid out depending on quantities of contents of paragraphs. However, the conventional document layout processing cannot automatically generate such a layout structure with alternate heading frames.

This is because, in the layout of the "heading" shown in FIG. 57(a), the contents of the document are generally laid out in the sequence of areas 1, 2 . . . , 7, as shown in FIG. 57(b). In the case that nests for rectangular areas are defined such that headings are alternately laid out with equal column heights, the layout structure is shown in FIG. 58 in which the sequence of layout of the document contents is areas 1, 2, 3 . . . , and 11 in accordance with the uniqueness of the sequence of layout according to nesting level. This structure differs from that shown in FIG. 57(b). As seen from the foregoing description, the conventional document layout processing cannot perform alternate disposition of headings and layout of document contents at appropriate positions at the same time. Thus, a layout structure with alternate heading frames cannot be generated automatically.

In addition to the layout design described above, there is a layout design often used in general documents in which the contents of a text laid out in a column continue to an area next to a figure area which extends to that column by jumping the figure area. This, for example, corresponds to the layout of sentences in the sequence of areas 1, 3, 2 and 4 shown in FIG. 56(b). When this layout design is used, it is often the case that the sentences in the last line of the area 1 or 2 refer to the contents of the figure. However, the conventional document layout technique cannot automatically generate such layout structure due to the requirement of rectangular areas used to provide equal column heights and the uniqueness of the sequence of the layout based on the nesting levels.

In addition, there is still another layout design often employed in general documents as shown in FIG. 59(a), in which a heading which covers three columns and a heading which covers one or two columns co-exist. In order to realize this design, the conventional document layout is required to use the layout of rectangular areas such as that shown in FIG. 59(b). However, when the contents of one document are laid out to rectangular areas having different nesting levels, as shown by areas 1, 2 and 3 in FIG. 59(b), the heights of areas 1 and 2 cannot automatically be determined such that the upper edges of areas 1 and 2 coincide at the level shown by the arrow A (shown by the doubled lines) in FIG. 59(b). Coexistence of a frame covering all the columns and frames covering some of the columns cannot be treated by conventional document layout techniques.

SUMMARY OF THE INVENTION

It is an object of the present invention to provide a document layout processing device which is capable of automatically generating a multi-column document which can take various ways in the flow of sentences before and after a multi-column covering frame.

Further objects and advantages of this invention will easily be confirmed by the following detailed description and the accompanying drawings.

In order to achieve the above objects, the present invention provides a document layout processing device comprising structure identifying means for identifying a column structure which is a layout structure corresponding to a column and a multi-column covering frame structure which is a layout structure corresponding to a multi-column covering frame; layout directive means for directing either the column structure or the multi-column covering frame structure to which a content of a document is to be laid out; content layout means for recognizing a structure directed by the layout directive means on the basis of the result of identification by the structure identifying means and for laying out the content of the document to the recognized structure; and multi-column covering frame structure layout means for determining the position of the multi-column covering frame structure on a display or Drinking in consideration of the content of the document laid out to the column structure.

According to this invention, the content layout means lays out the contents of a document by searching an area for display or printing to which the contents of the document can be laid out and then by laying out the contents of that document such that the document is displayed or printed in that area. The searched area is an area of column structure capable of being laid out from which overlapping area of column structure and the multi-column covering frame structure is excluded on the basis of the result of identification by structure identifying means.

The multi-column covering structure layout means determines the position of the multi-column covering frame structure such that the area of the multi-column covering frame structure in display or printing overlap with a column. In this determination, the position and size of the area of the column structure identified by the structure identifying means, and the document contents except for those laid out to the multi-column covering frame structure are considered.

BRIEF DESCRIPTION OF THE DRAWINGS

FIGS. 25–55 illustrate a layout processing in the present embodiment; and

DESCRIPTION OF THE PREFERRED EMBODIMENTS

Now, embodiments of the present invention will be described with reference to FIGS. 1–55.

Figure 1:
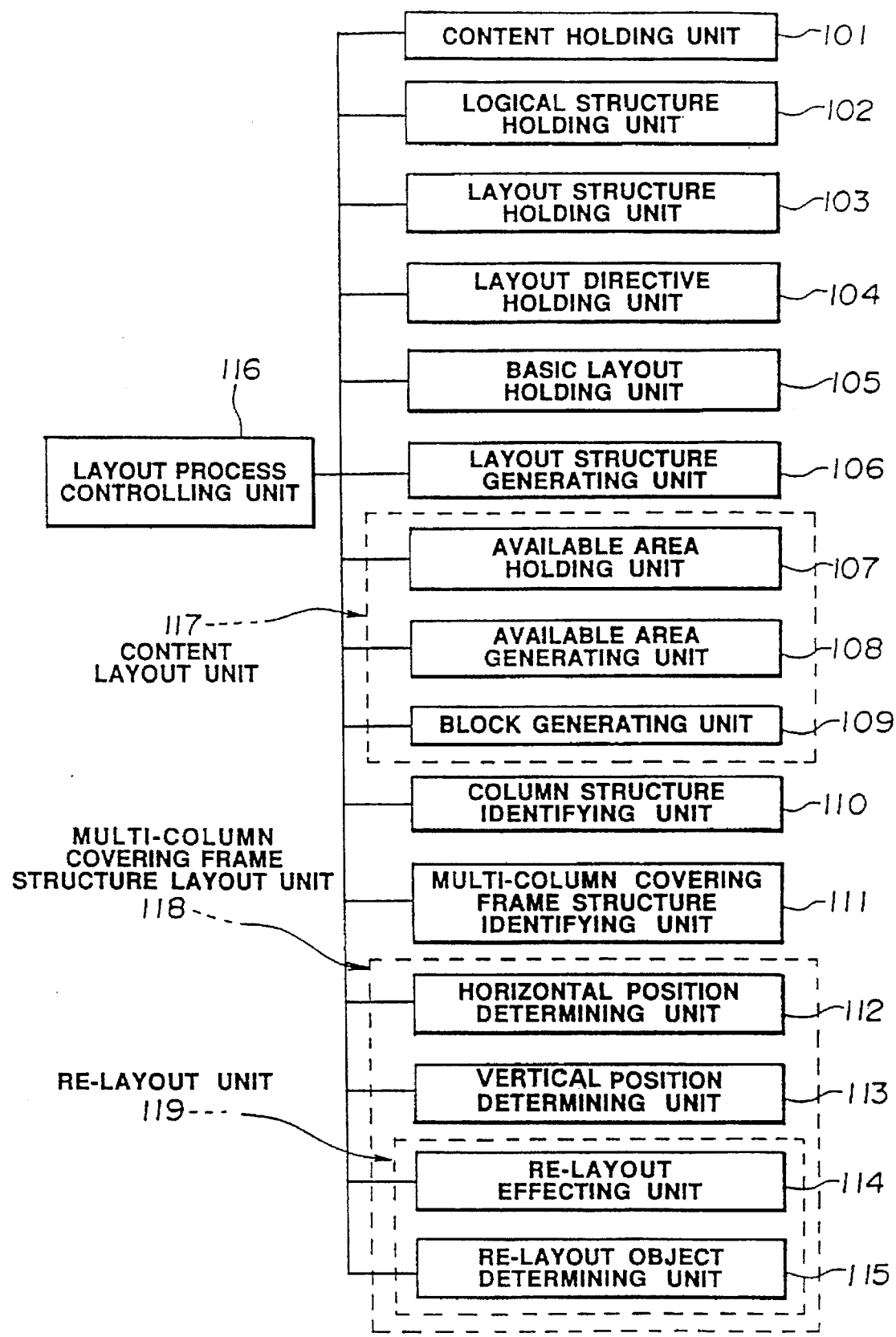
FIG. 1 is a functional block diagram indicative of one embodiment of a document layout processing device according to the present invention.

FIG. 1 is a functional block diagram of one embodiment of a document layout processing device according to the present invention.

In this embodiment, a document to be laid out is one on which characters or letters are laterally or horizontally arranged. In the following description, an "vertical direction" is a direction from above to below along which lines proceed while a "horizontal direction" is a direction from left to right along which the characters proceed. It will be understood that this embodiment is applicable to a document of vertically arranged characters by replacing the above-to-below direction with the right-to-left direction and replacing the left-to-right direction with the above-to-below direction.

For simplicity, the vertical dimension of a multi-column covering frame is fixed in this embodiment. Of course, the vertical dimension is changeable depending on the contents of a document laid out in the multi-column covering frame. This change in the vertical dimension, however results in no problem as long as the contents of the document are laid out before the multi-column covering frame is positioned. Further, a single content is laid out in a single multi-column covering frame in this embodiment. However, it is obvious that some contents can be laid out in a single multi-column covering frame, and the multi-column covering frame can be structured.

In FIG. 1, the document layout processing device includes a content holding unit 101, a logical structure holding unit 102, a layout structure holding unit 103, a layout directive holding unit 104, a basic layout holding unit 105, a layout structure generating unit 106, an available area holding unit 107, an available area generating unit 108, a block generating unit 109, a column structure identifying unit 110, a multi-column covering frame structure identifying unit 111, a horizontal positioning determining unit 112, a vertical position determining unit 113, a re-layout effecting unit 114, a re-layout object determining unit 115 and a layout process controlling unit 116.

In this embodiment, the available area holding unit 107, available area generating unit 108 and block generating unit 109 cooperate to serve the function of a content layout unit 117 which lays out the contents of a document in a structure depending on layout directive. The horizontal position determining unit 112, vertical position determining unit 113, re-layout effecting unit 114, and re-layout object determining unit 115 cooperate to serve the function of a multi-column covering frame structure layout unit 118 which determines a display or printing position in a multi-column covering frame structure in consideration of the contents of a document laid out to a column structure. The re-layout effecting unit 114 and the re-layout object determining unit 115 cooperate to serve a re-layout unit 119 which re-lays out a layout structure generated depending on a newly laid out multi-column covering frame structure before the generation of that structure.

The content holding unit 101 holds the contents of a document such as strings of characters, images or figures. The held contents of the document are directly referred to from a logical structure held in the logical structure holding unit 102 and a layout structure held in the layout structure holding unit 103. In this embodiment, the content holding unit 101 is realized by a memory and data stored in that memory (similar to a code system stipulated under ISO 8613).

The logical structure holding unit 102 holds the logical structure of a document. The logical structure is data on the sequence of the logical units in which the contents of a document held in the content holding unit 101 are divided into groups. The logical sequence in the logical structure becomes the sequence of layout. While in this embodiment the logical structure holding unit 102 is realized by a memory and the data stored in that memory (having a tree data structure of logical objects similar to those stipulated under ISO8613), the stored data may have any data structure (such as, for example, a list structure or a stream structure) as long as the sequence of the logical units and the layout directives applied to those logical units are expressed.

The layout structure holding unit 103 holds the layout structure of a document. The layout structure is data which represents areas required for display or printing. In the embodiment, the layout structure holding unit 103 is realized by a memory and data stored in that memory (having a tree data structure of layout objects and similar to that stipulated under ISO8613. The area which the layout object occupies in display or printing is rectangular. The position of the rectangular area is given by its top left corner point and the size of the area is expressed by a set of horizontal and vertical dimensions. The layout object may have attribute data on a set of name and value of an attribute attached thereto. Data stored in the memory may take any data structure (for example, of a page descriptive language) as long as data corresponding to a column or multi-column covering frame can be identified from other units and is visualized in display or printing.

The layout directive holding unit 104 holds layout directives. A layout directive in this embodiment specifies how to lay out a logical object and its contents and is directly referred to from the logical object in a logical structure held in the logical structure holding unit 102. The attributes of a layout directive in this embodiment include a type, kind of frame, number of columns covered, and frame height. For the signs or values which the respective attributes can take are: a defined sign indicative of "intra-column" or "multi-column covering frame" for the type, a defined sign indicative of "reflection" or "jump" for the kind of frame, and integer values indicative of the number of columns covered and a frame height. The frame height is expressed in the number of lines.

Figures 56A, 56B:
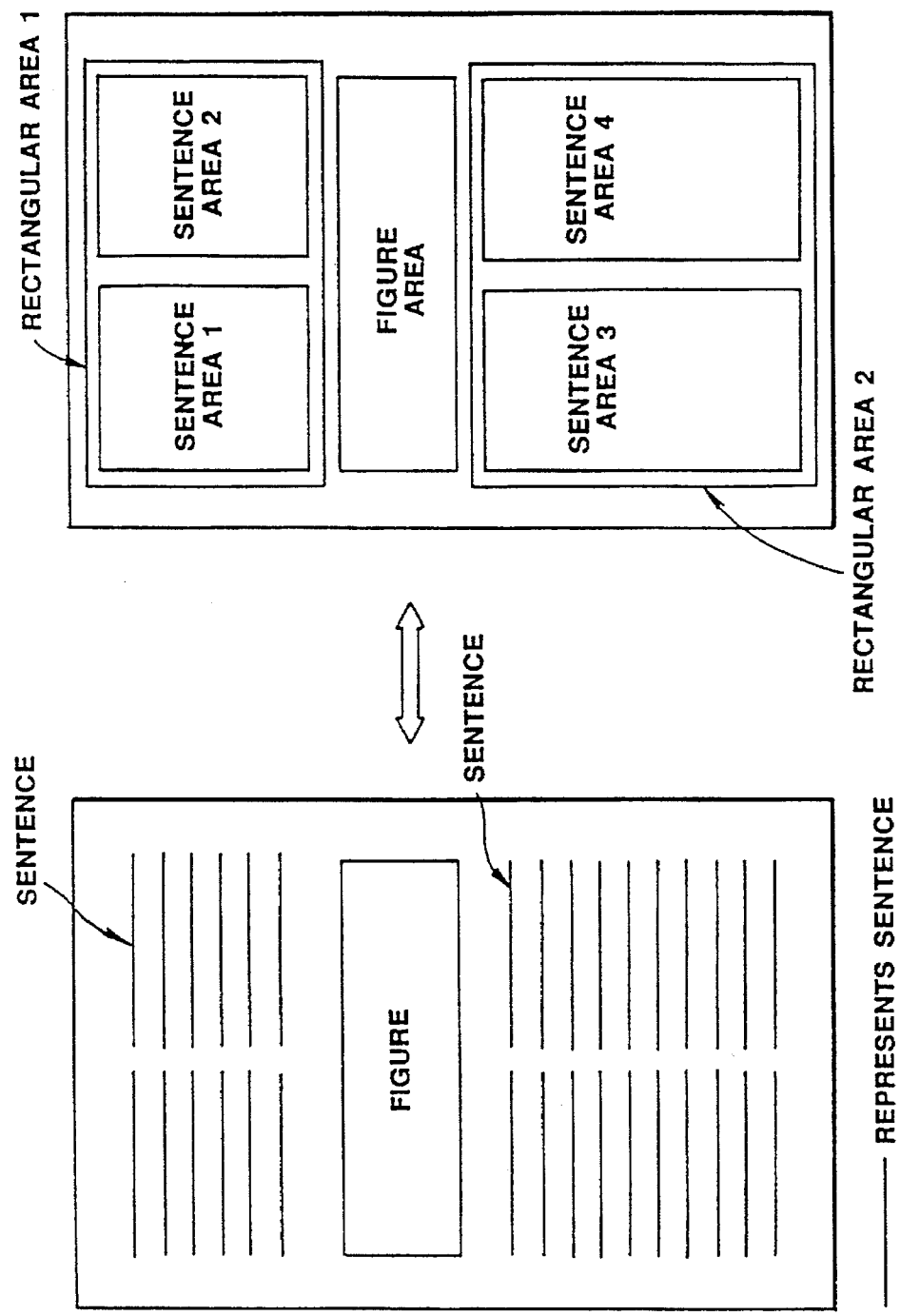
FIGS. 56A, 56B, 57, 58, 59A and 59B illustrate a conventional layout processing.
Figures 57A, 57B:
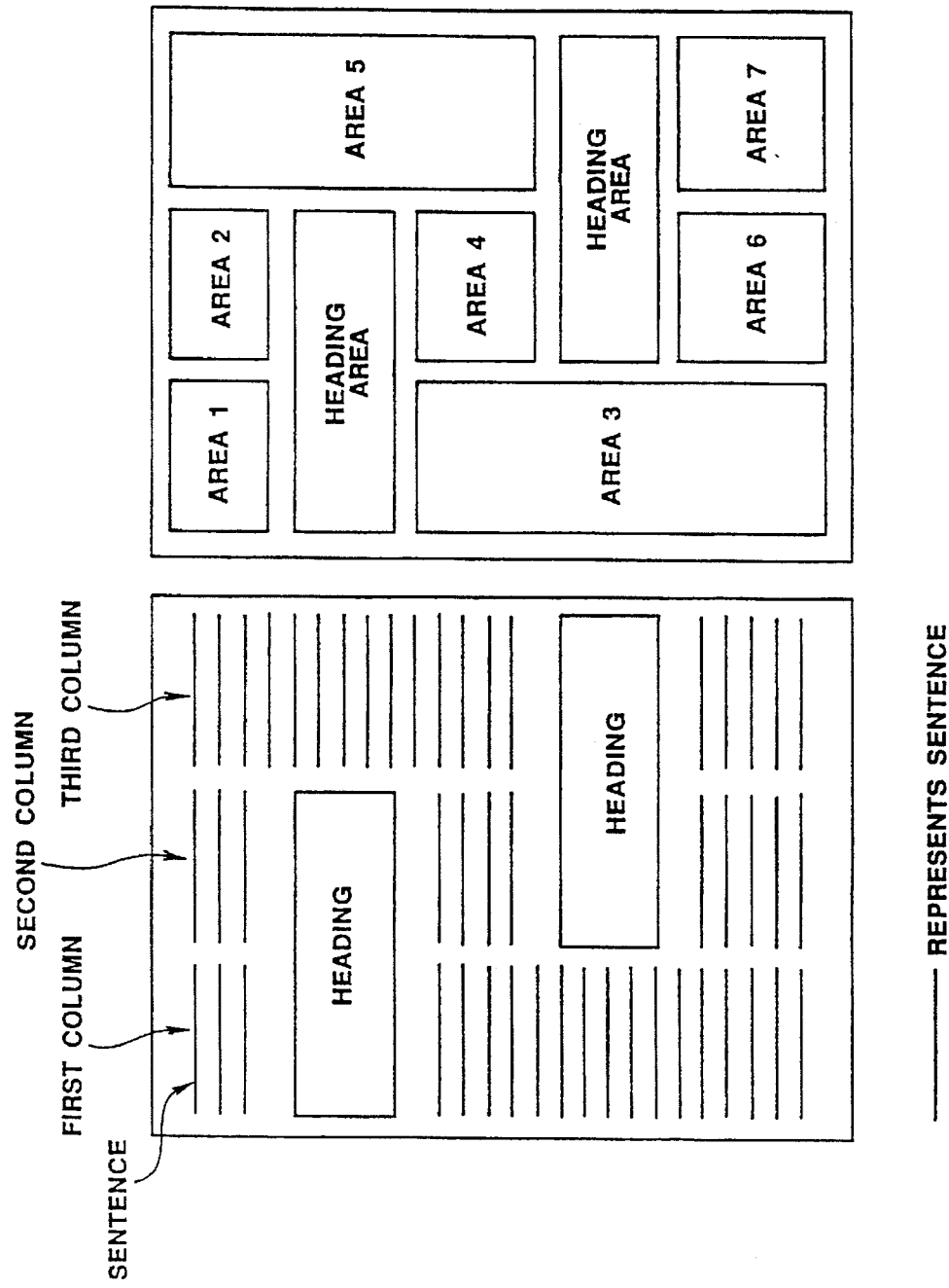
Figure 58:
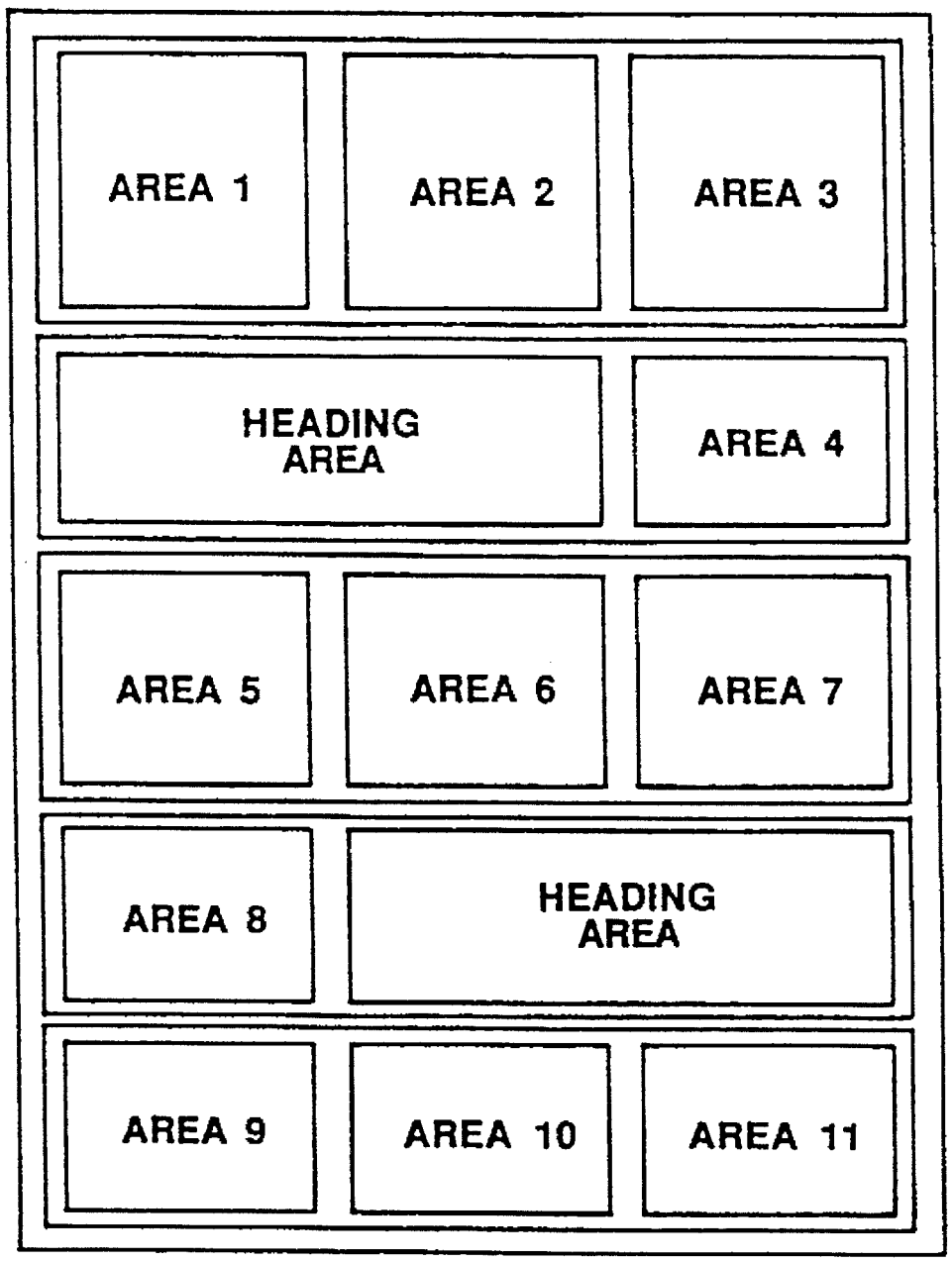
Figures 59A, 59B:
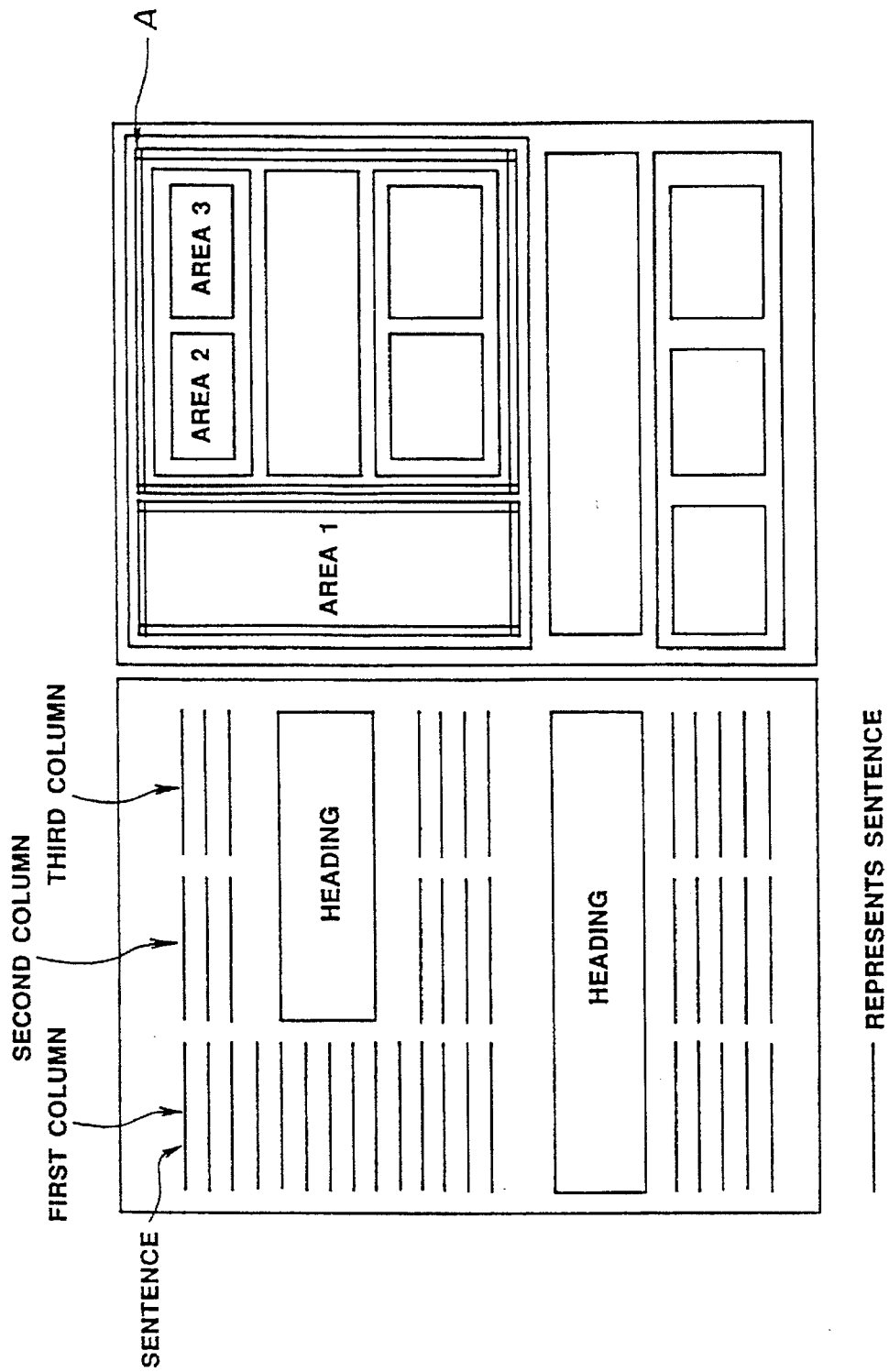

The "reflection" for the kind of frame is a directive that the layout to a column structure is displayed or printed such that it is reflected and folded above and below the frame structure (multi-column covering frame) generated by the layout directive, for example, to thereby lay out the sentences in the sequence of areas 1, 2, 3 and 4 in the layout shown in FIG. 56(b). The "jump" for the kind of frame is a directive that the layout to a column structure jumps over a frame structure (multi-column covering frame) generated by the layout directive to a required location such that sentences are laid out in the sequence, for example of areas 1, 3, 2 and 4 in the layout of FIG. 56(b).

In this embodiment, the layout directive holding unit 104 is realized by a memory and data stored in that memory (a list-like data structure of sets of name and value of an attribute.

The basic layout holding unit 105 holds data on a page having columns which page will be the basic structure of document layout (herein referred to as a basic layout). The attributes of the basic layout in this embodiment includes page width, page height, number of columns, column width, number of lines, line height and column spacing. For the respective values which the attributes can take, the page width, page height, column width, line height and column spacing each are an integer value indicative of the number of millimeters, and the number of columns and the number of lines are each an integer value. In this embodiment, the basic layout holding unit 105 is realized by memory and data stored in that memory (a list-like data structure of sets of name and value of an attribute).

The layout structure generating unit 106 generates a layout object on the basis of data in the basic layout holding unit 105 or layout directive holding unit 104 and stores that object in the layout structure holding unit 103. When the layout structure generating unit 106 is called, it returns the uppermost level layout object in the generated layout structure to the calling process.

When the layout structure generating unit 106 is required to generate a page, it refers to the data in the basic layout holding unit 105 to generate a layout structure which includes one page object and frame objects immediately subordinate to that page object and corresponding to the columns the number of which is indicated by the value of the "number of columns" of the attribute and sets the respective positions and dimensions of the frame objects. It adds the data on the attributes which has a set of attribute name "type" and attribute value "column" to frame objects corresponding to the "column".

The vertical dimension of each frame object corresponding to a column is obtained by calculating: (the number of lines on a basic layout)×(the height of a line on that basic layout) . . . (1)

The horizontal dimension of each frame object corresponding to the column is given by a column width on the basic layout.

The vertical position of each frame object corresponding to the column is obtained by calculating: {(the height of the basic layout)−(the number of lines on the basic layout)×(the line height on the basic layout)}/2 . . . (2)

The horizontal position of a frame object corresponding to a first column is obtained by calculating: {(the width of the basic layout)−(the column width on the basic layout)×(the number of columns on the basic layout)−(the column spacing on the basic layout)×[(the number of columns on the basic layout)−1]}÷2 . . . (3)

The horizontal position of a frame object corresponding to an n-th column is obtained by calculating: {the horizontal position of a frame object corresponding a first column+[(the column width of the basic layout)+(the column spacing on the basic layout)]×(n−1)} . . . (4)

Figures 2, 3:
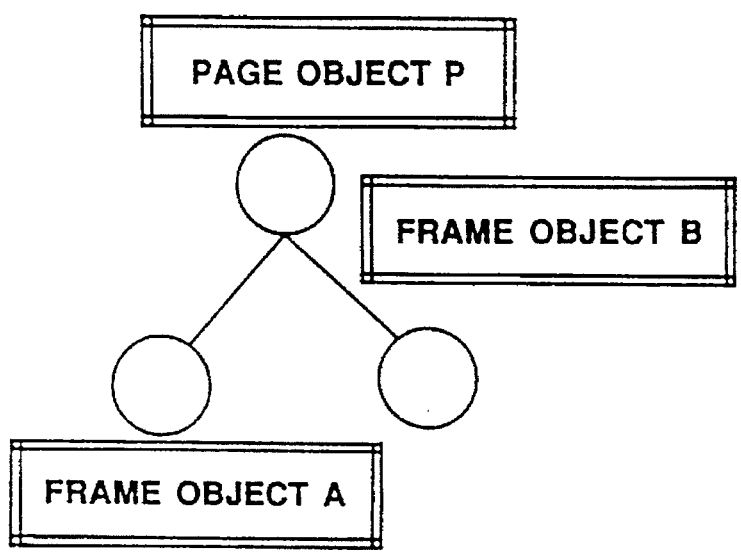
FIG. 2 shows one example of data stored in a page holding unit in an embodiment.
FIG. 3 shows a structure generated on the basis of data shown in FIG. 2 by a layout structure generating unit in the present embodiment.

For example, when data such as is shown in FIG. 2 is held in the basic layout holding unit 105, and page generation is required, the layout structure generating unit 106 generates a structure such as that shown in FIG. 3. In the structure of FIG. 3, a frame object A corresponding to a column and a frame object B corresponding to a column are subordinate to a page object P corresponding to one page.

Figure 4:
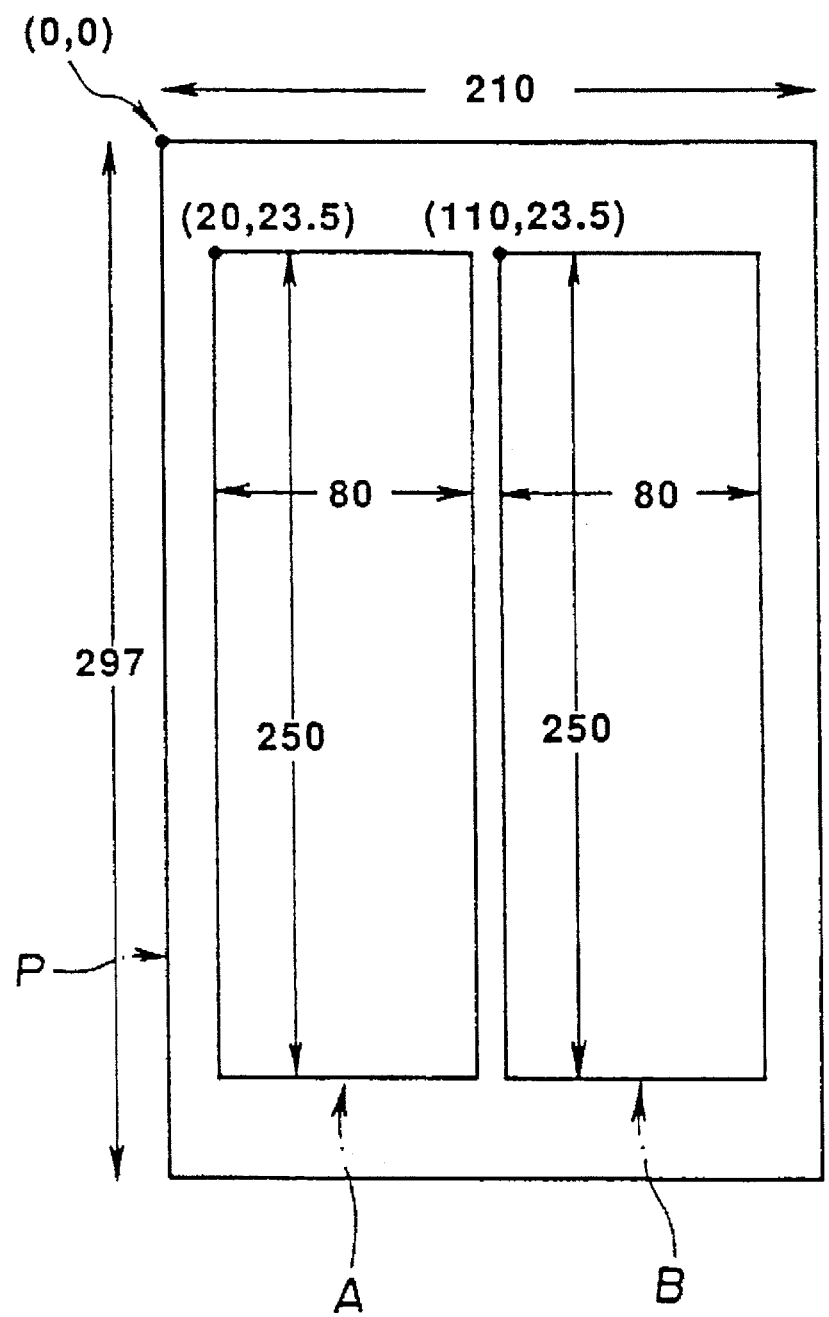
FIG. 4 illustrates rectangular areas having the structure shown in FIG. 3.

FIG. 4 illustrates a rectangular area having a structure such as that shown in FIG. 3. In FIG. 4, reference character P denotes a page object; and A and B each denote an frame object.

When the layout structure generating unit 106 is required to generate a multi-column covering frame, it refers to a layout directive and data in the basic layout holding unit 105 to generate a frame object and sets the dimensions of this frame object. It then adds a copy of attribute data on the layout directive and attribute data having a set of attribute name "type" and attribute value "multi-column covering frame" to the frame object.

The vertical dimension of a frame object corresponding to a multi-column covering frame is obtained by calculating: (the frame height of the layout directive for the frame object)×(the line height of the basic layout) . . . (5)

The horizontal dimension of a frame object corresponding to a multi-column covering frame is obtained by calculating: {(the number of columns covered of the layout directive for the frame object)×(the column width on a basic layout)+[(the number of columns covered of the layout directive for the frame object)−1]×(the line spacing on the basic layout)}. . . (6)

For example, if a basic layout is as shown in FIG. 2 and a layout directive have 3 as the value of "column height" and 2 as the value of "number of columns covered", the vertical dimension of a frame object corresponding to a multi-column covering frame and generated according to these data is 30 [mm] and its horizontal dimension is 170 [mm].

Figure 5:
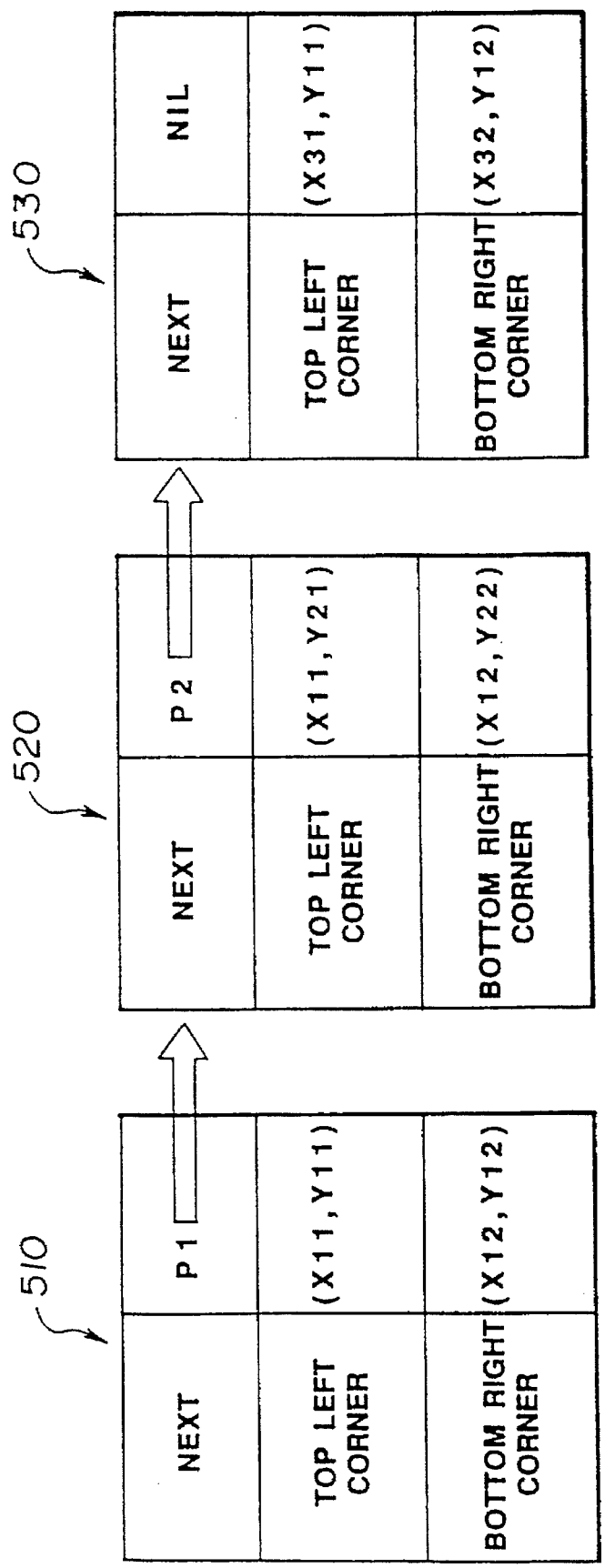
FIG. 5 shows one example of a data structure of an available area held by an available area holding unit in the present embodiment.

The available area holding unit 107 holds an available area, which represents a continuation of rectangular areas (hereinafter referred to as available area elements) in a page in which the contents of a document can be laid out. An available area element is expressed by a top left corner point and a bottom right corner point. The available area is expressed by the formation of a list structure by such available area elements. One example of the available area data structure is shown in FIG. 5. A rectangular area expressed by FIG. 5 is shown in FIG. 6.

In FIG. 5, the available area has a list structure formed of available area elements 510, 520 and 530. The available area element 510 is composed of top left corner X-Y coordinate values (X11, Y11), bottom right corner X-Y coordinate values (X12, Y12) and a pointer P1 to the next available area element 520. The available area element 520 is composed of top left corner X-Y coordinate values (X11, Y21), bottom right corner X-Y coordinate values (X12, Y22), and a pointer P2 to the next available area element 530. The available area element 530 is composed of top left corner X-Y coordinate values (X31, Y11), bottom right corner X-Y coordinate values (X32, Y12), and "NIL" indicative of the absence of the next available area component.

Figure 6:
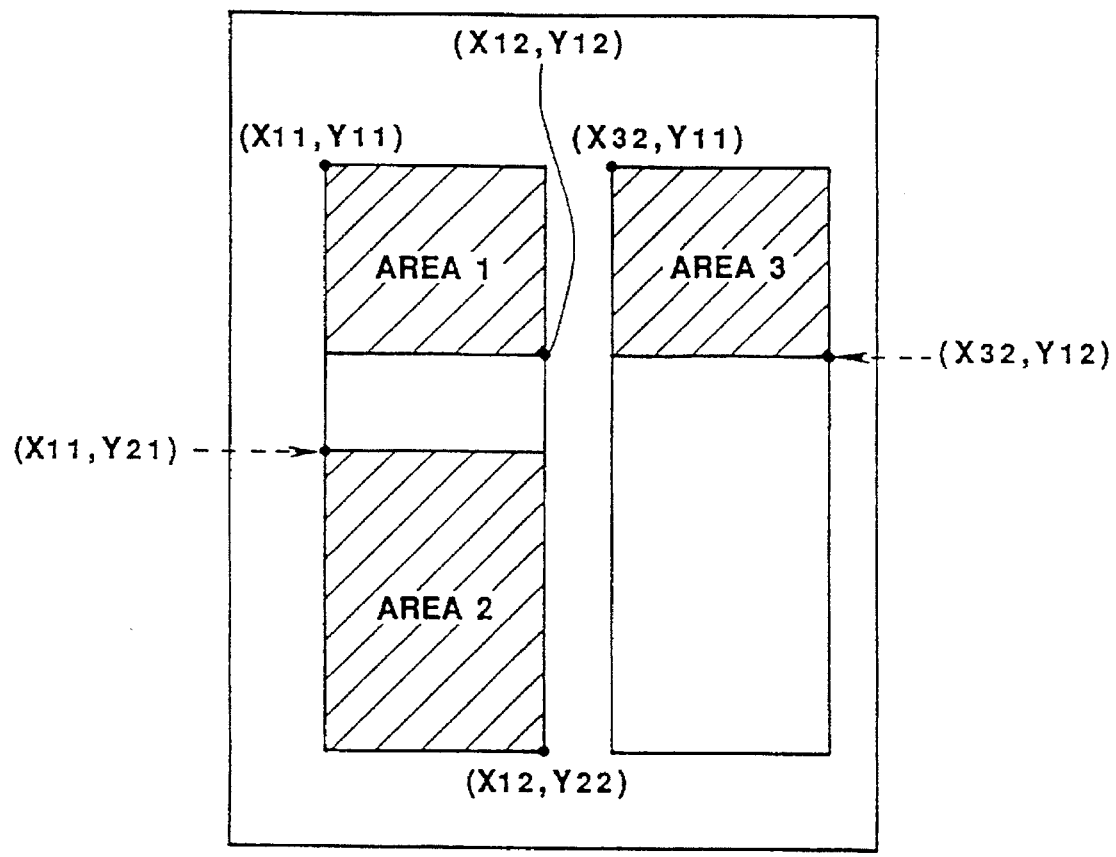
FIG. 6 illustrates rectangular areas expressed by the data structure of FIG. 5.

In FIG. 6, hatching shows an area where the contents of a document can be laid out and the contents of the document are laid out in the order of areas 1, 2 and 3 corresponding to the available area elements 510, 520 and 530, respectively.

In this embodiment, the available area holding unit 107 is realized by a memory and data stored in that memory (a list-like data structure of available area elements and their sequence).

The available area generating unit 108 inspects a page object and its subordinate at a point of time, generates an available area of the layout structure and stores data of the available area to the available area holding unit 107.

When the available area generating unit 108 is called, a frame object corresponding to a column identified by the column structure identifying unit 110 or a frame object corresponding to a multi-column covering frame identified by the multi-column covering structure identifying unit 111 is passed as a search starting object to the available area generating unit 108. When the search starting object corresponds to a column, there are cases where in addition to the search starting object a frame object corresponding to a column and a frame object corresponding to a multi-column covering frame are passed as an end column and an end frame, respectively, to the available area generating unit 108.

The block generating unit 109 generates a rectangular area (hereinafter referred to as a block), having a fixed dimensions in which the contents of a document are visualized in display or printing, from the contents of the document in the content holding unit 101 and the available area in the available area holding unit 107. If the available area is given as a continuation of available area elements, the block generating unit 109 divides the contents of the document in accordance with its quantity of contents into blocks whose respective positions are given by top left corner points of the corresponding available area elements. The horizontal dimension of a block is given by the horizontal dimension of the corresponding available area element. The vertical dimension of the block depends on a quantity of document contents laid out, but does not exceed at least the vertical dimension of the available area element. If the contents of a document cannot be accommodated in one of available area elements, the next available area element is searched by the tracing of its list structure and the remaining contents of the document are laid out to the obtained available area element. If there is no next available area, layout of the contents of the document is terminated at this stage.

When the column structure identifying unit 110 is given a layout object which is a frame object and which has a set of attribute name "type" and attribute value "column" as attribute data, the column structure identifying unit 110 returns a defined sign "true". Otherwise, it returns a defined sign "false".

When the multi-column covering frame structure identifying unit 111 is given a layout object which is a frame object and which has a set of attribute name "type" and attribute value "multi-column covering frame" as attribute data, the multi-column covering frame structure identifying unit 111 returns a defined sign "true". Otherwise, it returns a defined sign "false".

The horizontal position determining unit 112 determines the position of a frame object corresponding to a multi-column covering frame in the horizontal direction. It determines a column where the contents of a document laid out below a frame object corresponding to a multi-column covering frame exists and appears in display or printing.

In this embodiment, the use of a lateral printed or written document is assumed, so that a position where the left vertical side of a multi-column covering frame and the left vertical side of a rectangular area corresponding to a column coincide (hereinafter referred to as a frame starting position) is uniquely determined by a column to which the last block is laid out. Alternatively, the optimal frame starting position may be determined by using as input data on the layout structure and a multi-column covering frame at that time and inferring the optimal frame starting position from a data base where the knowledge of those skilled in the art is stored as rules.

The vertical position determining unit 113 determines the vertical position of a frame object corresponding to a multi-column covering frame. In decision, it calls the re-layout effecting unit 114 to cause same to execute partial re-layout in a page and inspects whether there is no problem with the set vertical position.

The re-layout effecting unit executes a re-layout process using other respective units concerned.

The re-layout object determining unit 115 deletes a part of a Layout structure Laid out so far and searches a logical object having the earliest logical sequence and to be again laid out.

The layout process controlling unit 116 executes a whole layout process using other respective units concerned. The unit 116 holds reference data on a logical object which is a current object for layout (hereinafter referred to as a current logical object) and on a layout object corresponding to a current column for layout (hereinafter referred to as a current layout object). The layout process controlling unit 116 updates the current logical object and current layout objects when required, and calls the other respective units concerned in accordance with the attributes of those objects to execute the layout process.

In this embodiment, the layout structure generating unit 106, available area generating unit 108, block generating unit 109, column structure identifying unit 110, multi-column covering frame structure identifying unit 111, horizontal position determining unit 112, vertical position determining unit 113, re-layout effecting unit 114, re-layout object determining unit 115, and layout process controlling unit 116 are realized by a memory which stores software (programs) to serve the respective functions of those units and a central processing unit (CPU) which loads and executes the respective programs. Of course, this may be realized by hardware or firmware.

The layout process by the layout process controlling unit 116 will be described with reference to the flowcharts of FIGS. 7–10.

Figure 7A:
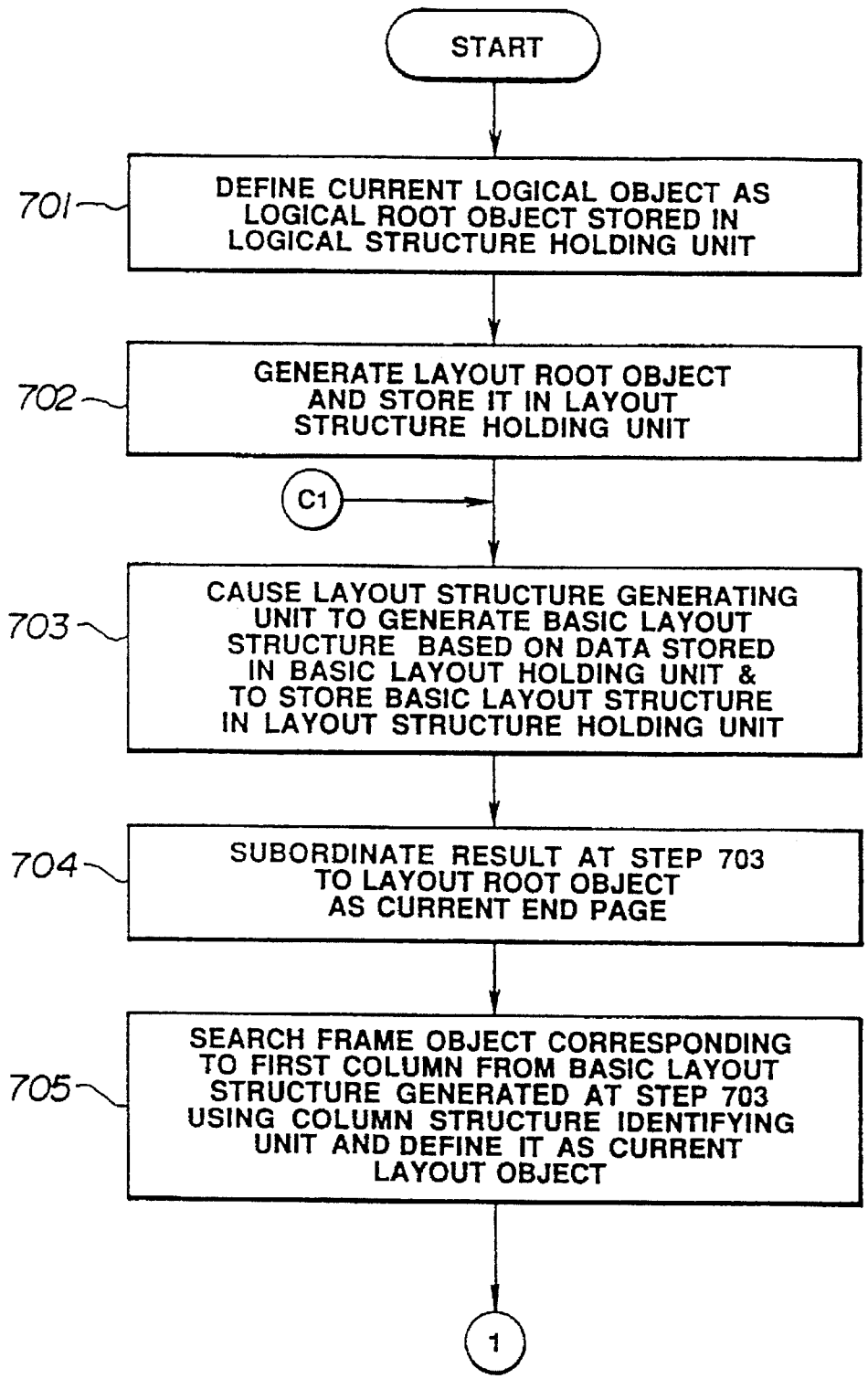
FIGS. 7A, 7B and 8A, 8B and 9–10 are flowcharts indicative of the operation of a layout process controlling unit in the present embodiment.
Figure 7B:
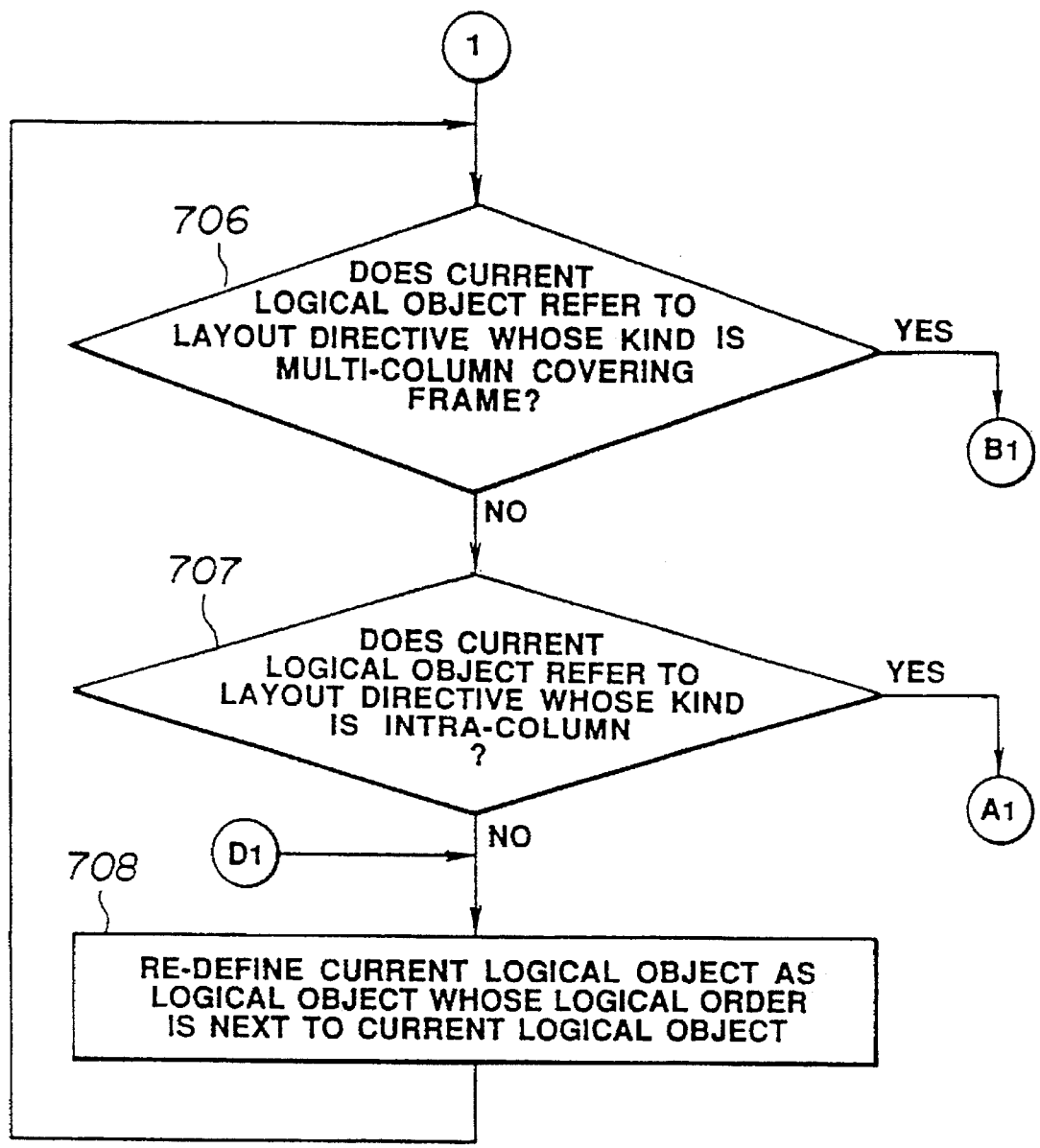

As shown in FIG. 7, the layout process controlling unit 116 defines as a current logical object a logical root object in the logical structure holding unit 102 (step 701), then generates a layout root object and stores it in the layout structure holding unit 103 (step 702), causes the layout structure generating unit 106 to generate a layout structure corresponding to a basic layout on the basis of data stored in the page holding unit 105 and to store the result in the layout structure holding unit 103 (step 703). The layout process controlling unit 116 link the result of processing at step 703 or a layout structure corresponding to the basic layout as the end page at the current stage subordinate to the layout root object (step 704). It also uses the column structure identifying unit 110 to search a frame object corresponding to the first column from the inside of the basic layout structure generated at step 703 and defines it as a current layout object (step 705).

The layout process controlling unit 116 determines whether the current logical object defined at step 701 refers to a layout directive whose kind is a "multi-column covering frame" (step 706).

If the current layout directive is not referred to at step 706, the layout process controlling unit further determines whether the defined current logical object refers to a layout directive whose kind is "intra-column" (step 707).

If the current logical object does not refer to a layout directive whose kind is "intra-column" at step 707, the layout process controlling unit 116 redefines as a current logical object a logical object having a logical order next to that of the current logical object in the logical sequence (step 708), and then returns to step 706 to execute the step 706 seqq.

If at step 706 the current logical object refers to a layout directive whose kind is "multi-column covering frame", the layout process controlling unit 116 performs the processing shown in FIG. 9 to be described later. If at step 707 the current logical object refers to a layout directive whose kind is "intra-column", it performs the processing shown in FIG. 8.

The processing performed when the current logical object has referred to a layout directive whose kind is "intra-column will be described with respect to FIG. 8.

Figure 8A:
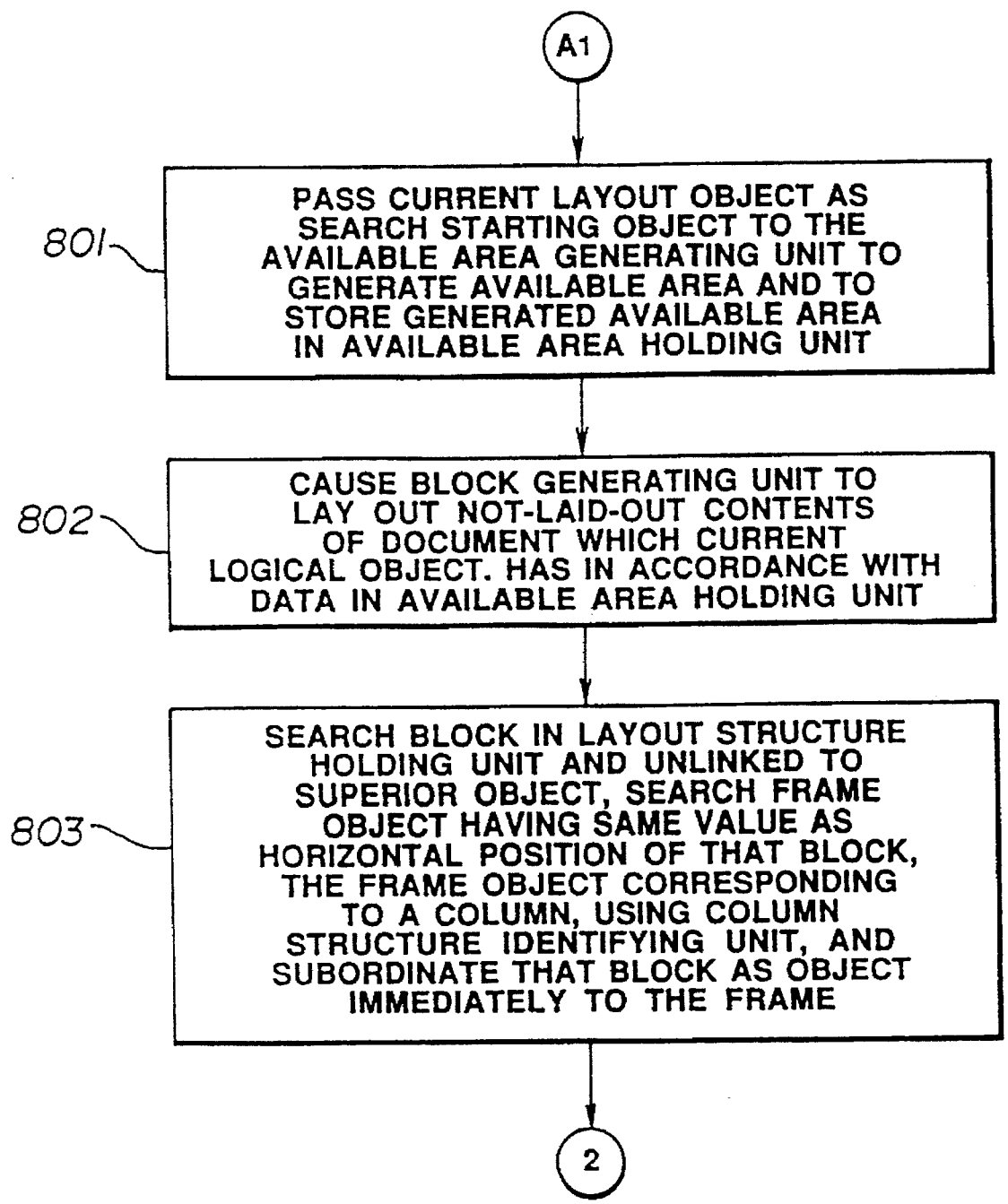
Figure 8B:
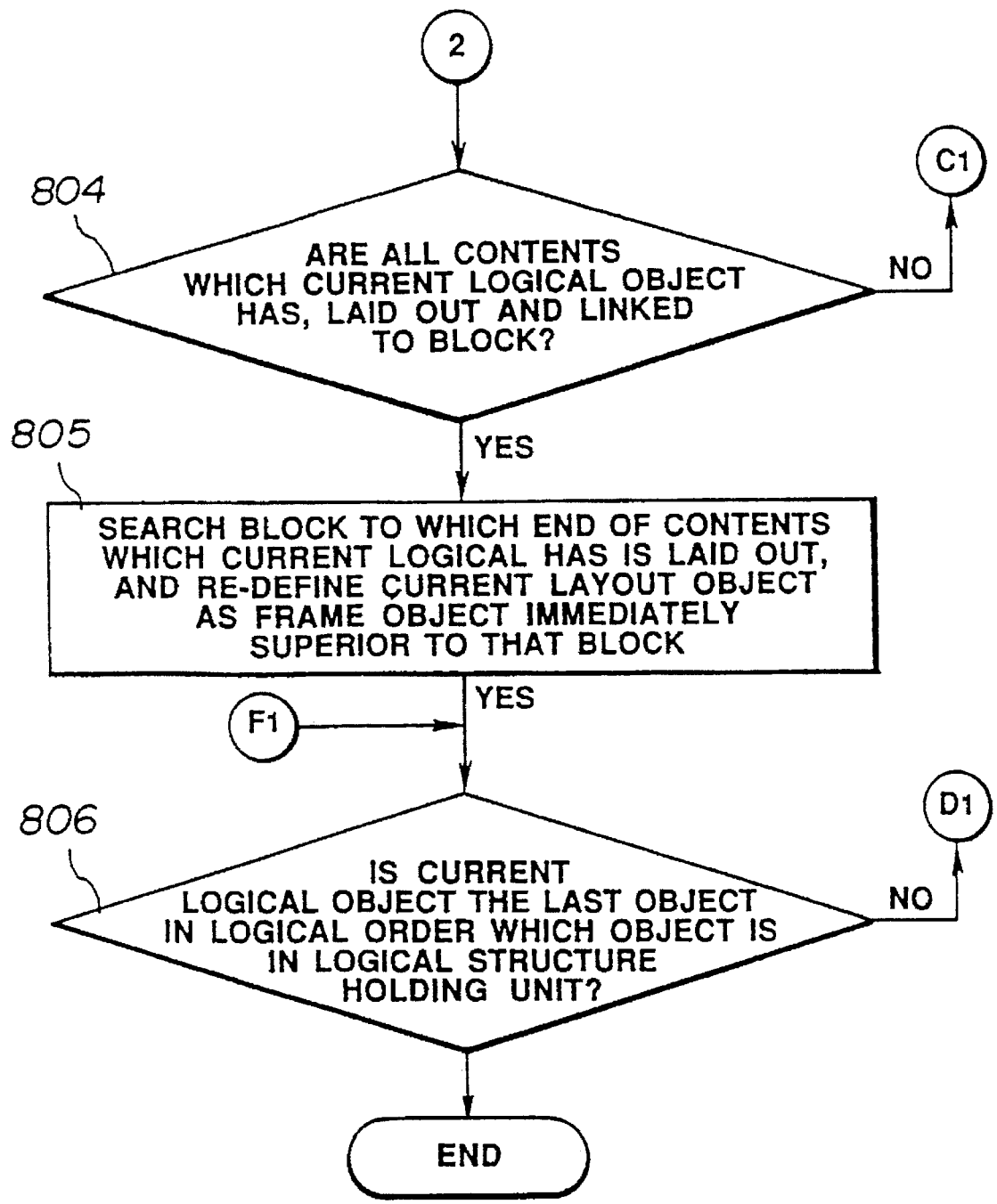

As shown in FIG. 8, the layout process controlling unit 116 passes the current layout object as a search starting object to the available area generating unit 108 to cause same to generate an available area and to store the generated available area in the available area holding unit 107 (step 801). The layout process controlling unit 116 also causes the block generating unit 109 to layout the contents of the document, which the current logical object has and which is not yet laid out, in accordance with data in the available area holding unit 107 (step 802). In addition, the layout process controlling unit 116 searches a block in the layout structure holding unit 103 and not linked to a higher-level (superior) object and further searches, using the column structure identifying unit 110 a frame object having the same value as the horizontal position of that block and corresponding to a column, and links that block with the frame as an object immediately subordinate to the frame (step 803).

The layout process controlling unit 116 determines whether all the contents of the current logical object are laid out and linked to blocks (step 804).

If the answer of step 804 is "YES", the layout process controlling unit 116 searches a block to which the end of the contents of the document which the current logical object has is laid out, and defines as a current layout object a frame object directly above that block (step 805). It determines whether the current logical object is the object in the logical sequence in the logical structure holding unit 102 (step 806). It the answer is "YES", it terminates the processing.

If "NO" at step 804, it returns to step 703 of FIG. 7 while if "NO" at step 806, it returns to step 708 of FIG. 7.

Figure 9:
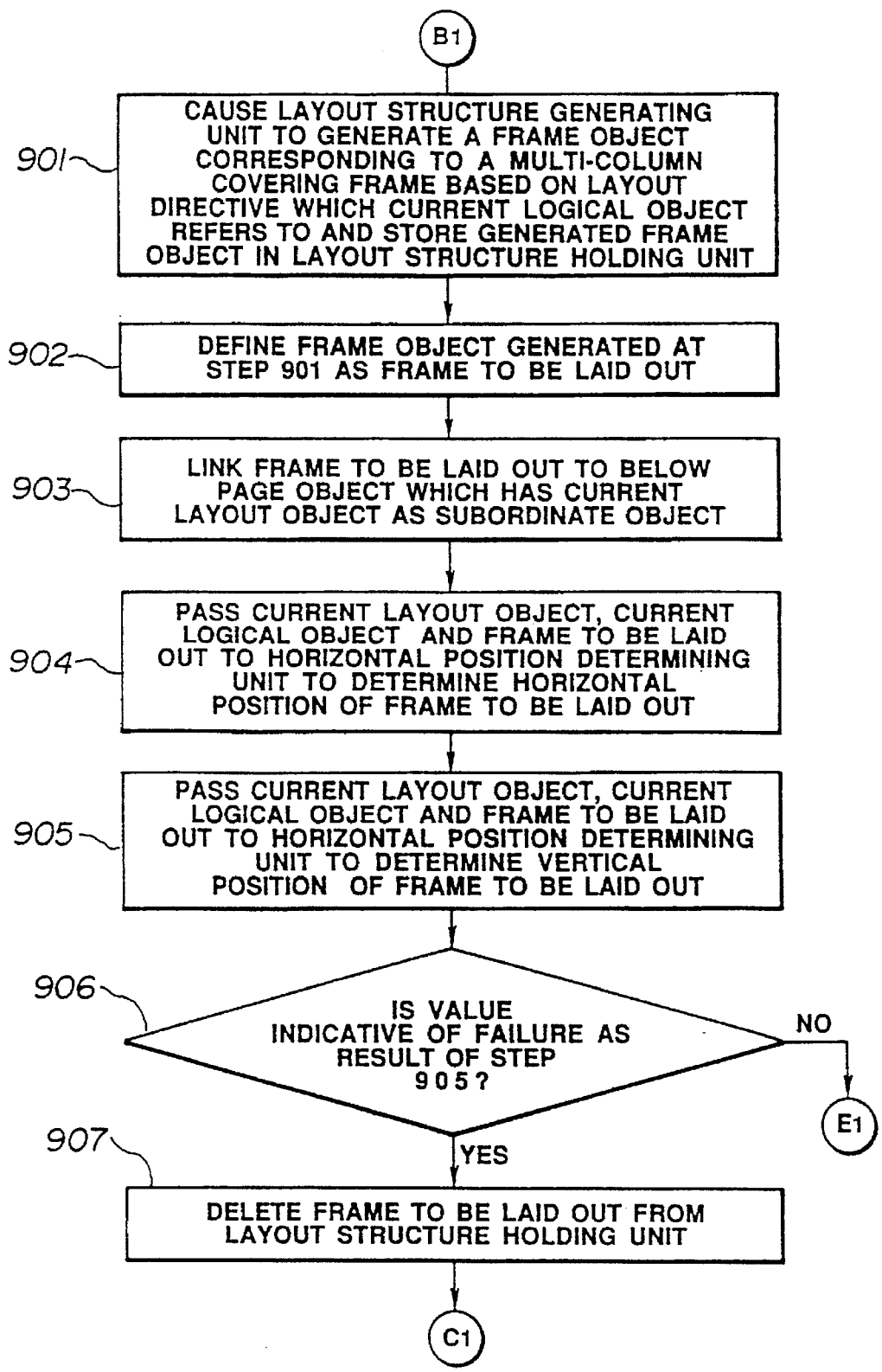

If at step 706 of FIG. 7 the current logical object has referred to the layout directive whose kind is "multi-column covering frame", the controlling unit 116 performs the processing shown in FIG. 9.

As shown in FIG. 9, the layout process controlling unit 116 causes the layout structure generating unit 106 to generate a frame object corresponding to the multi-column covering frame on the basis of the layout directive which the current logical object refers to and to store the result in the layout structure holding unit 103 (step 901). The layout process controlling unit 116 stores as a frame to be laid out the frame object generated at step 901 (step 902), and links the frame object with a page object which has the current layout as a lower-level (subordinate) object (step 903).

The layout process controlling unit 116 passes the current layout object, current logical object and a frame to be laid out to the horizontal position determining unit 112 to cause same to determine the horizontal position of a layout structure of the frame to be laid out (step 904) and also passes to the vertical position determining unit 113 the current layout object, current logical object and laid out object frame to cause the unit 113 to determine the vertical position of the layout structure of the frame to be laid out (step 905).

The layout process controlling unit 116 determines whether a value indicative of failure has returned as the result of the processing at step 905 (step 906).

If the answer is "YES", it deletes the frame to be laid out from the layout structure holding unit 103 (step 907), and then returns to step 703 of FIG. 7 and executes the processing at step 703 seqq.

Figure 10:
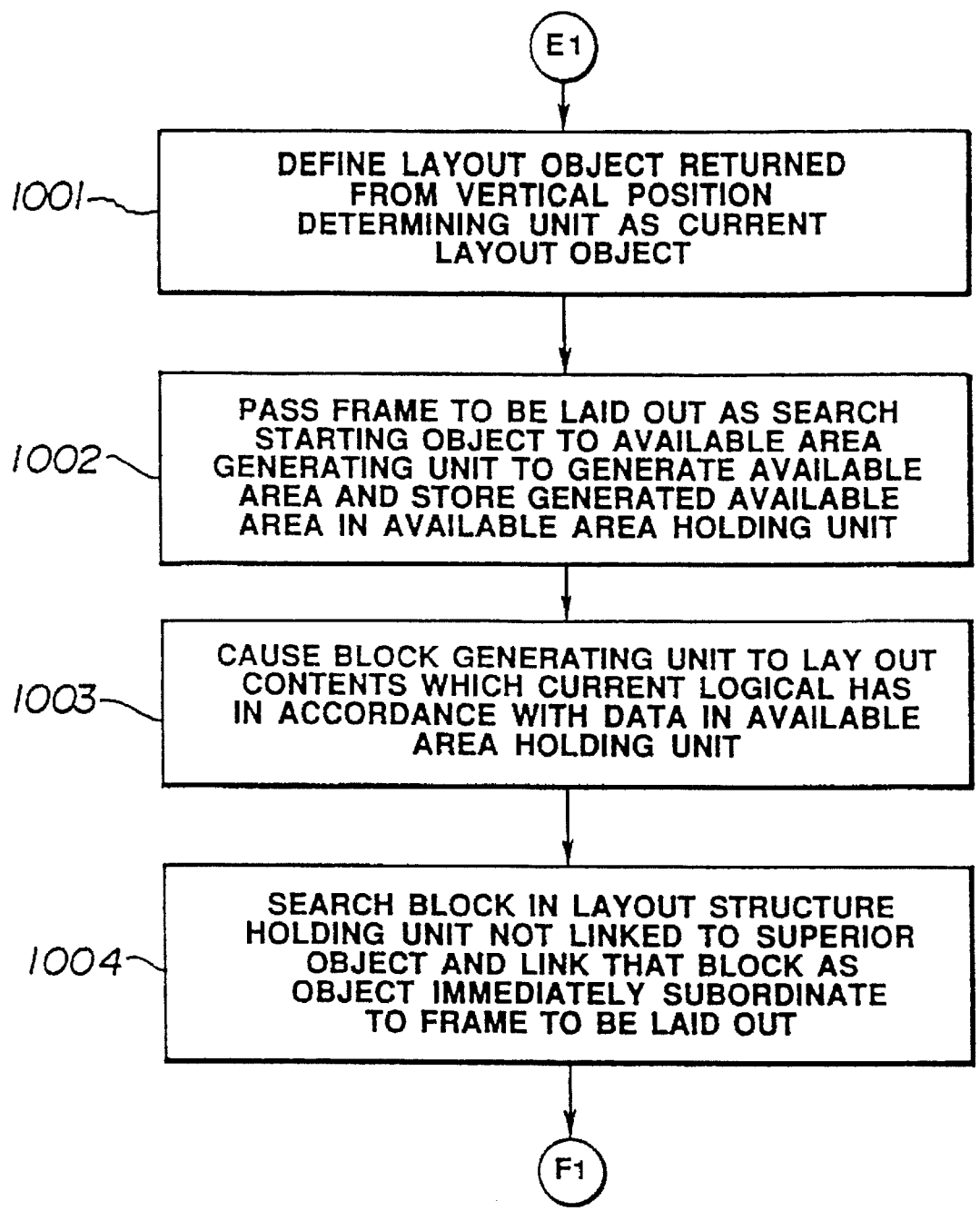

If a value indicative of success has returned at step 906, the layout process controlling unit 116 re-defines as a current layout the layout object which has returned at step 905 of FIG. 9 (the layout object returned from the vertical position determining unit 113), as shown in FIG. 10 (step 1001). It also passes the frame to be laid out as a search starting object to the available area generating unit 108 to cause same to generate an available area and store the generated available area in the available area holding unit 107 (1002). It also causes the block generating unit 109 to lay out the contents of a document, which the current logical object has, in accordance with data in the available area holding unit 107 (step 1003). In addition, the layout process controlling unit 116 searches a block in the layout structure holding unit 103 which block is not linked to a superior object and links that block as an object with the frame to be laid out as an immediately subordinate object (step 1004). Thereafter, the layout process controlling unit 116 returns to step 806 of FIG. 8 and executes the processing at step 806 seqq.

Generation of an available area by the available area generating unit 108 will be described with reference to the flowcharts FIGS. 11–14.

As described above, when the available area generating unit 108 is called, either a frame object corresponding to the column identified by the column structure identifying unit 110 or a frame object corresponding to a multi-column covering frame identified by the multi-column covering frame structure identifying unit 111 is passed as a search starting object to the available area generating unit 108.

Figure 11A:
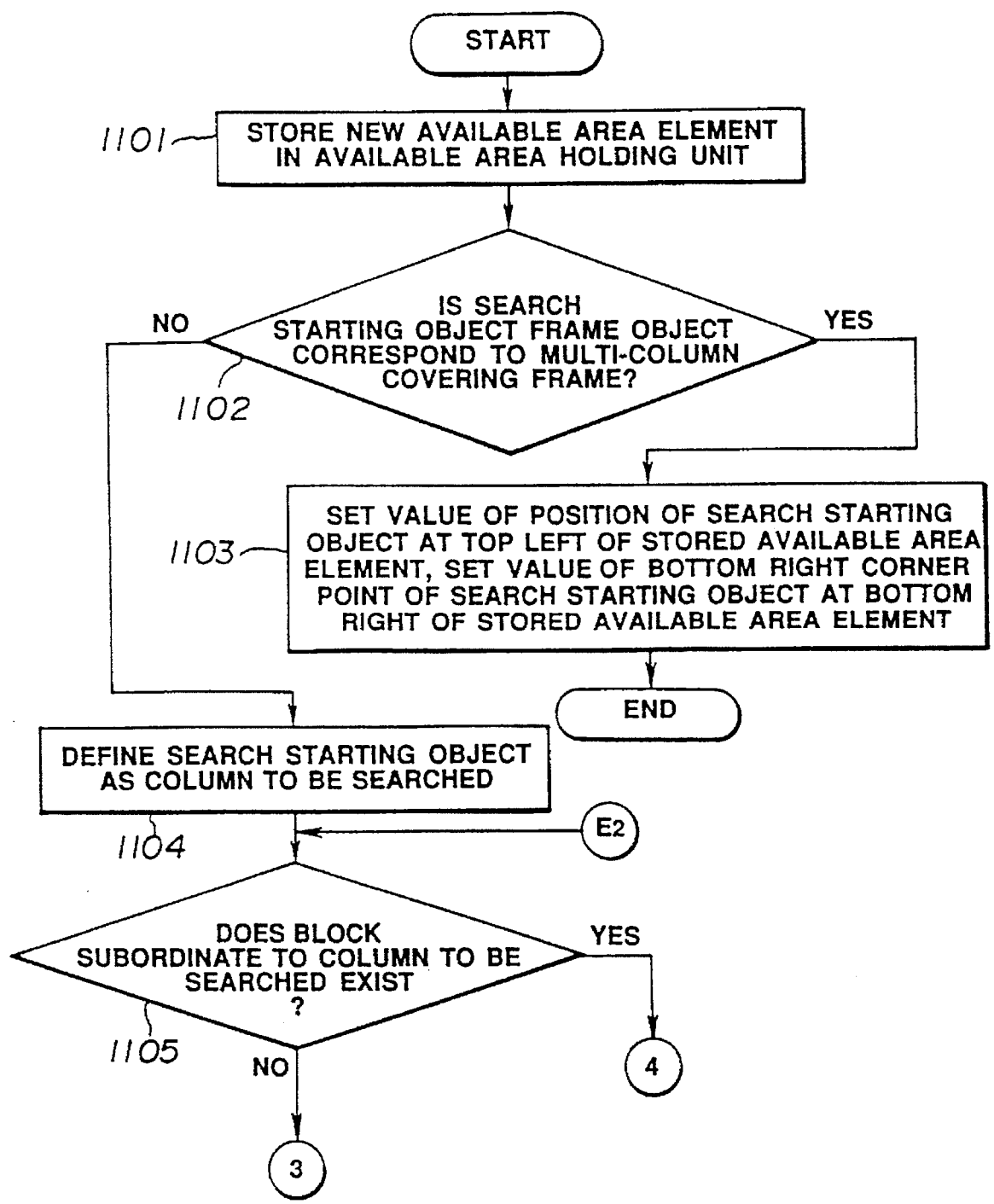
FIGS. 11A, 11B, 12A, 12B and 13–14 are flowcharts indicative of the operation of an available area generating unit in the present embodiment.
Figure 11B:
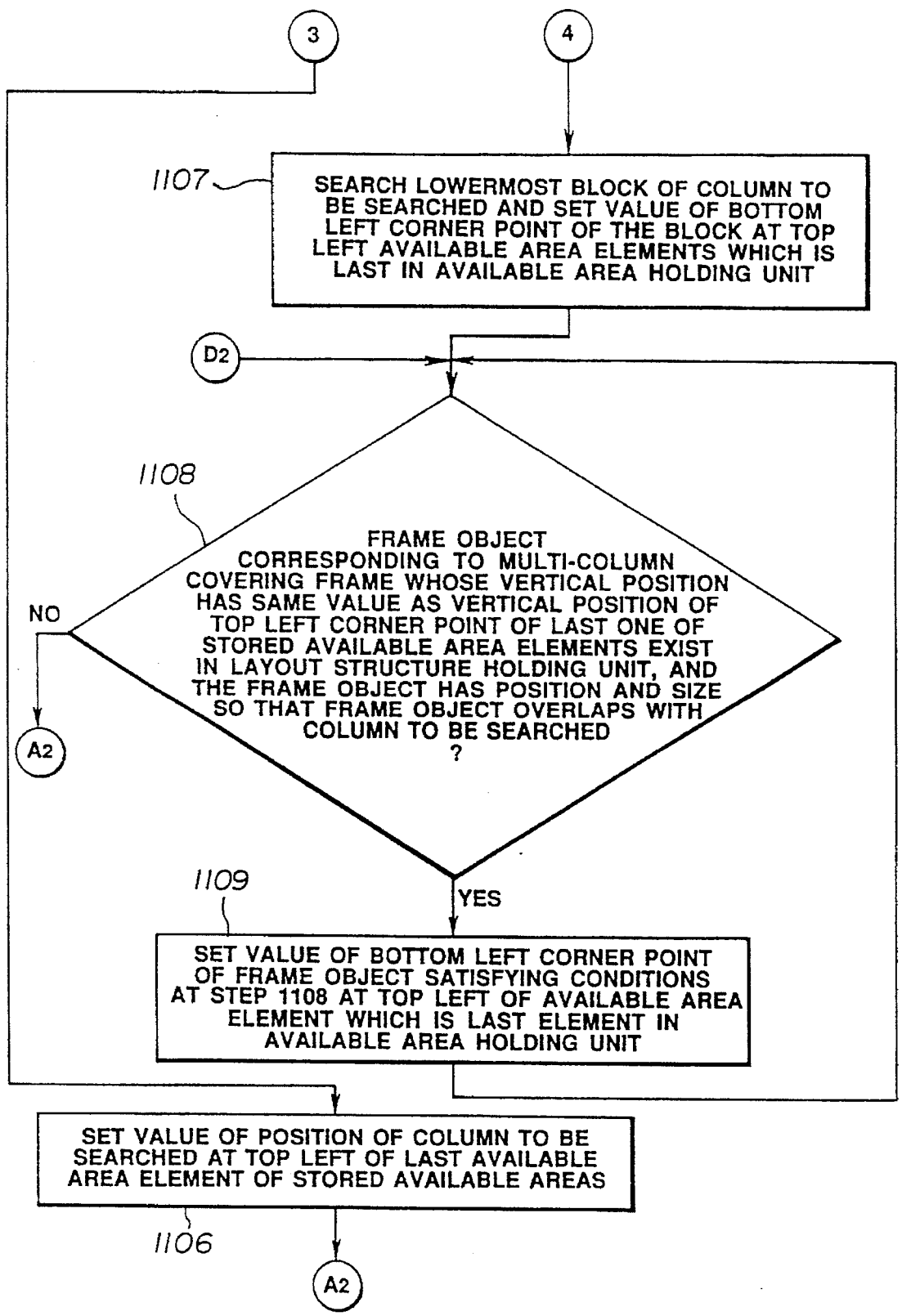

As shown in FIG. 11, the available area generating unit 108 stores a new available area element in the available area holding unit 107 (step 1101), and then determines whether the search starting object is a one corresponding to a multi-column covering frame (step 1102).

If the answer is "YES", it sets the top left corner point of the held available area element at the position of the search starting object and sets the bottom right corner point of the area at the bottom right corner point of the search starting object (step 1103) and then terminates the processing.

If the search starting object is not the object corresponding to the multi-column covering frame at step 1102, the available area generating unit 108 stores the search starting object as a column to be searched (step 1104) and determines whether there is a block below the column to be searched (step 1105).

If not, the available area generating unit 108 sets the position of the column to be searched to the top left corner point of the last available area element in the held available area (step 1106), and then executes the processing shown in FIG. 12 to be described later in more detail.

If there is a block at step 1105, the available area generating unit 108 searches the lowermost block of the column to be searched and sets the bottom left corner point of that block at the top left corner point of the last one of the held available area elements (step 1107). Then, the available area generating unit 108 checks whether there is in the layout structure holding unit 103 a frame object having the same vertical position as the vertical position of the top left corner point of the last one of the held available area elements, and corresponding to a multi-column covering frame and, if so, whether that frame object has a position and dimensions overlapping with those of the column to be searched (step 1108).

If the conditions at step 1108 are satisfied (if the answer is "YES" at step 1108), the available area generating unit 108 sets the bottom left corner point of the frame object satisfying the conditions at step 1108 to the top left corner point of the last one of the held available area elements (step 1109), and then the generating unit 108 returns to step 1108 and executes the processing at step 1108 seqq.

Figure 12A:
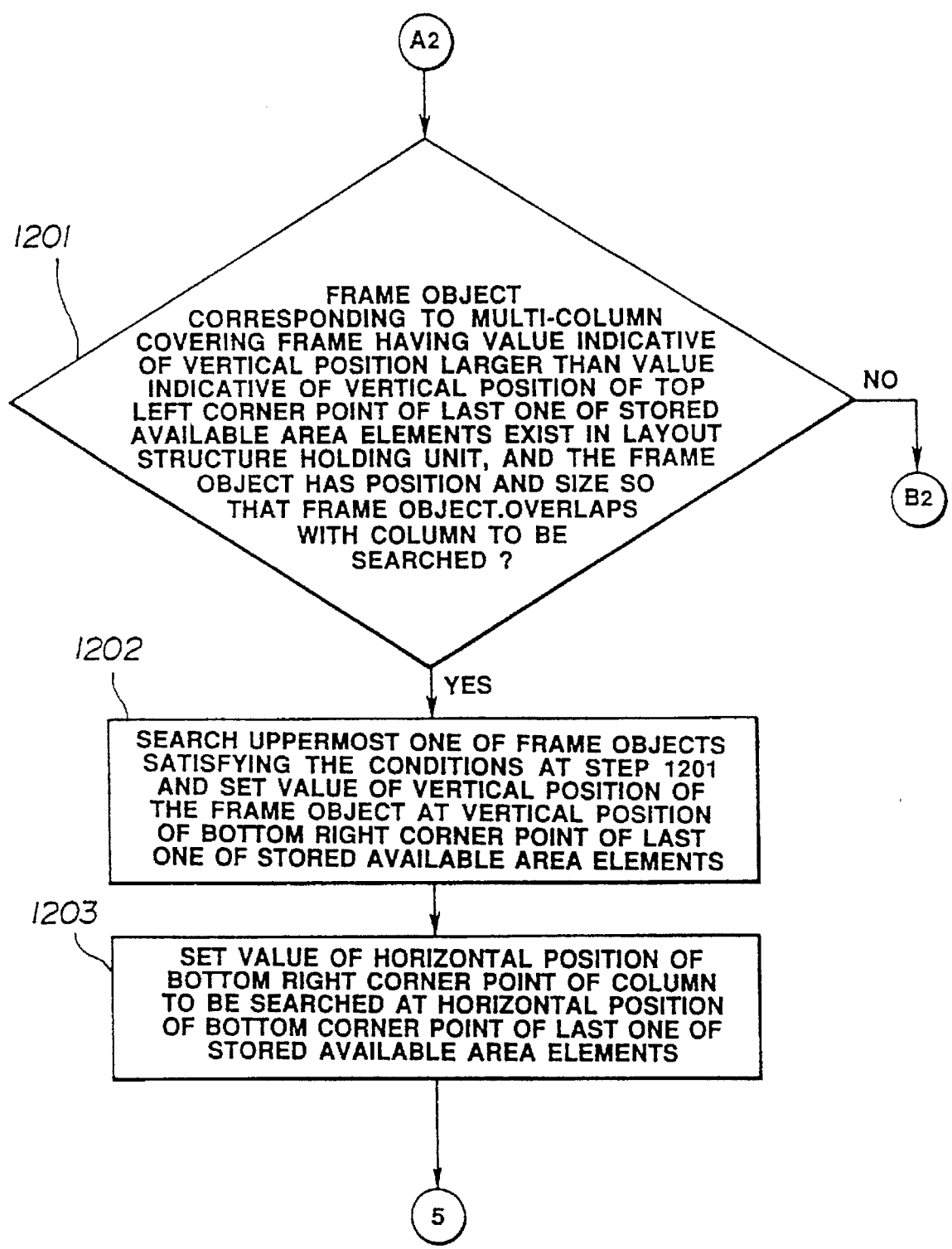
Figure 12B:
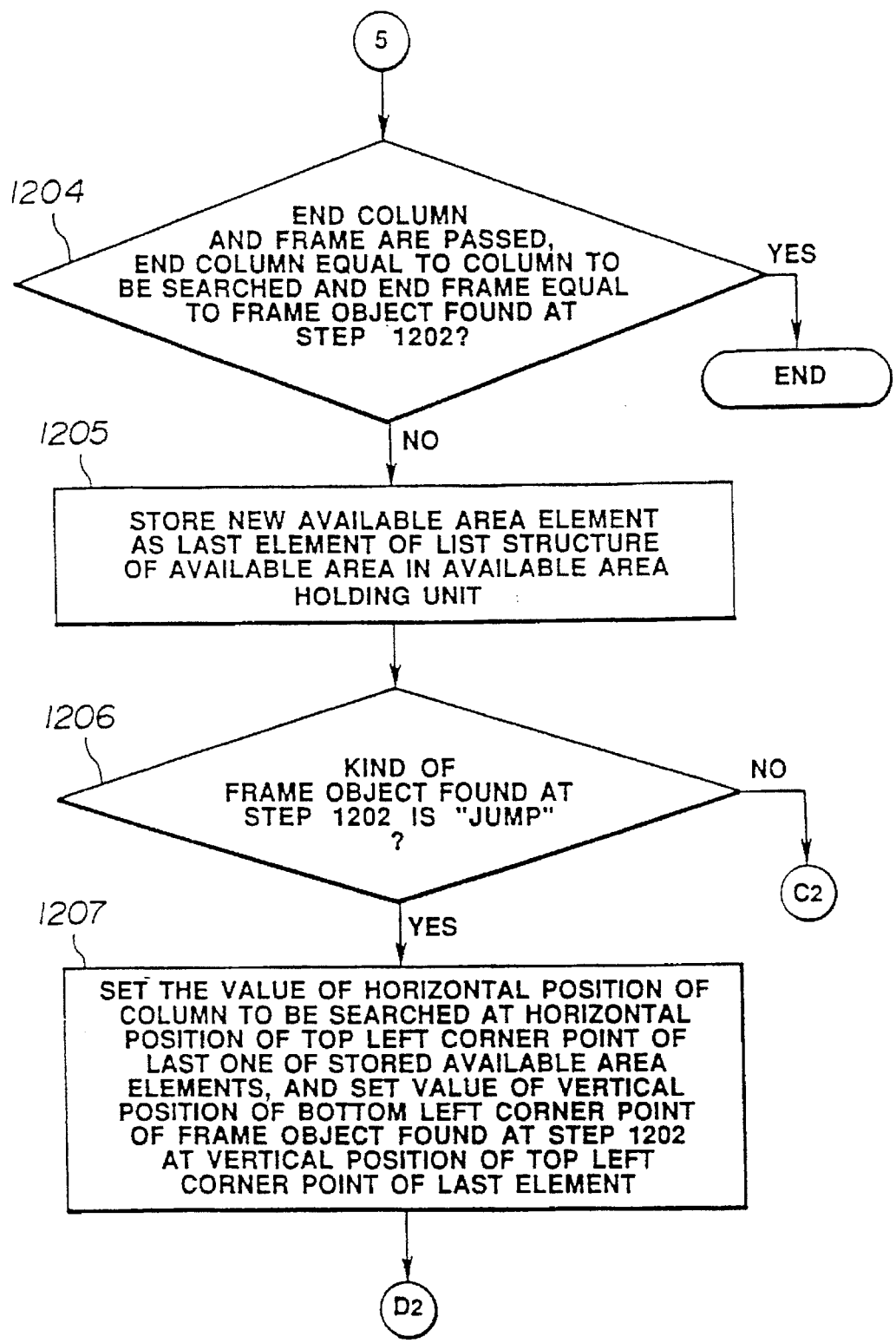

If the conditions at step 1108 are not satisfied, the available area generating unit 108 executes the processing shown in FIG. 12.

When the processing at step 1106 is completed, the processing performed when the answer is "NO" at step 1108 will be described with reference to FIG. 12.

As shown in FIG. 12, the available area generating unit 108 checks whether there is a frame object having a value indicative of a vertical position larger than a value indicative of the vertical position of the top left corner point of the last one of the held available area elements, the frame object also corresponding to a multi-column covering frame and having a position and dimensions overlapping with those of the column to be searched in the layout structure hold unit 103, (step 1201).

If the conditions at step 1201 are satisfied (if the answer is YES at step 1201), the available area generating unit 108 searches the uppermost one of the frame objects satisfying the conditions of step 1201, sets the vertical position of this frame object to the vertical position of the bottom right corner point of the last one of the held available area elements (step 1202), and sets the horizontal position of the bottom right corner point of the column to be searched at the horizontal position of the bottom right corner point of the last held available area element (step 1203).

In addition, the available area generating unit 108 determines whether the end column and end frame are passed and whether the end column is equal to the column to be searched, and whether the end frame is equal to the frame object found at step 1202 (step 1204).

The available area generating unit 108 terminates its processing when the conditions at step 1204 are satisfied. Otherwise, the available area generating unit stores a new available area element as the last element of the available area list structure in the available .area holding unit 107 (step 1205), and then determines whether the frame kind of the frame object found at step 1202 is "jump" (step 1206).

If so, the available area generating unit 108 sets the horizontal position of the column to be searched at the horizontal position of the top left corner point of the last element of the list structure of the held available area, and sets the vertical position of the bottom left corner point of the frame object found at step 1202 at the vertical position of the available area element (step 1207). Thereafter, it returns to step 1106 of FIG. 11 to execute the processing at step 1108 seqq.

If the conditions at step 1201 are not satisfied (if the answer is "NO" at step 1201), the available area generating unit 108 executes the processing shown in FIG. 13 to be described later in more detail. If the frame kind is not "jump" at step 1206 (if the answer is "NO"), the available area generating unit 108 executes the processing shown in FIG. 14 to be described later in more detail.

Figure 13:
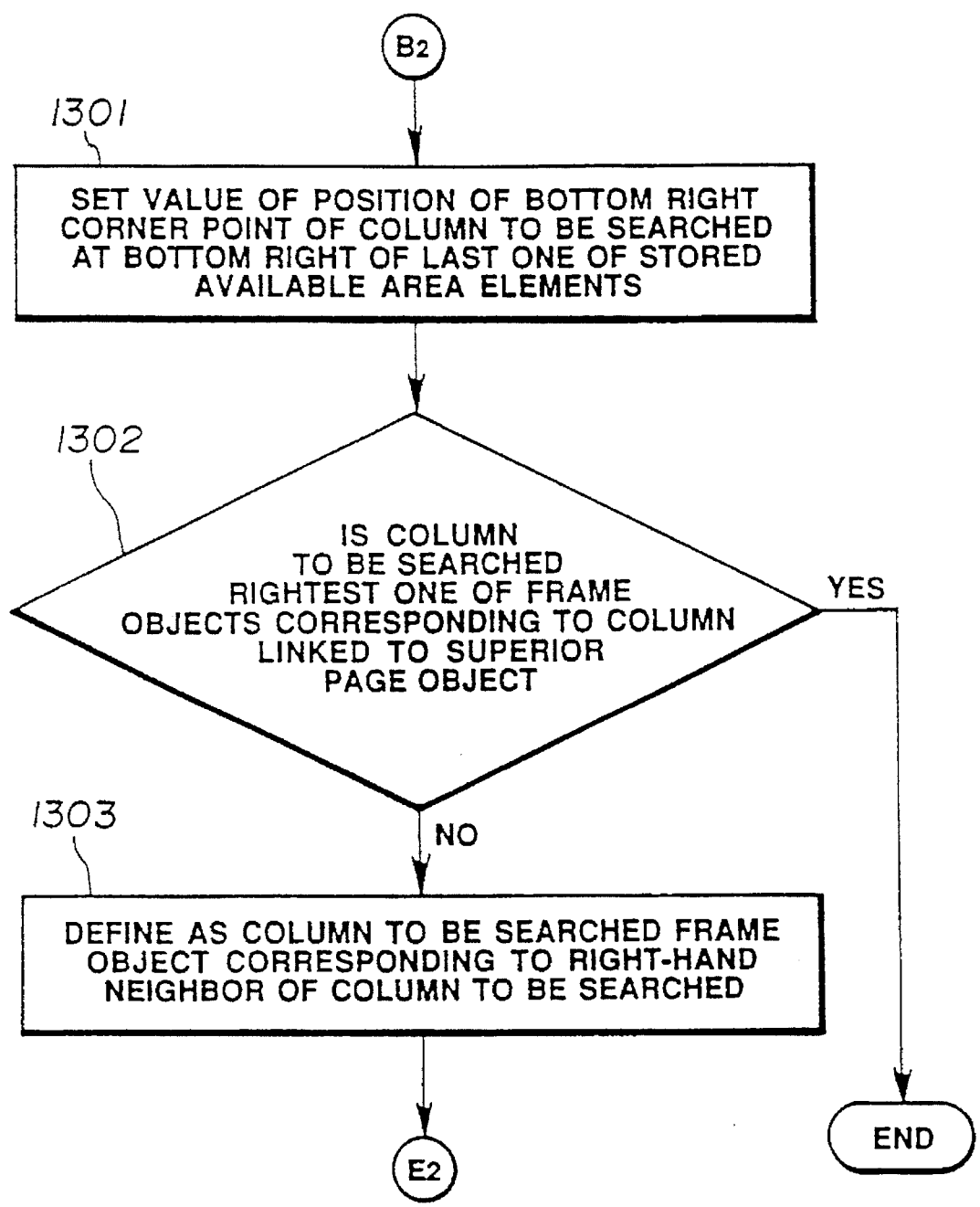

If the answer is "NO" at step 1201 of FIG. 12, the available area generating unit 108 sets the position of the point of the column to be searched at the position of the bottom right corner point of the last one of the held available area elements (step 1301), and determines whether the column to be searched is a frame object linked to the object which is of higher level than the column to be searched and is the furthest right of the frame objects corresponding to a column (step 1302), as shown in FIG. 13.

If the column to be searched is the rightist one, the available area generating unit 108 terminates its processing. If otherwise, it stores as the column to be searched a frame object corresponding to the right-hand neighbor one of the column to be searched (step 1303) and then returns to step 1105 of FIG. 11 and executes the processing at step 1105 seqq.

Figure 14:
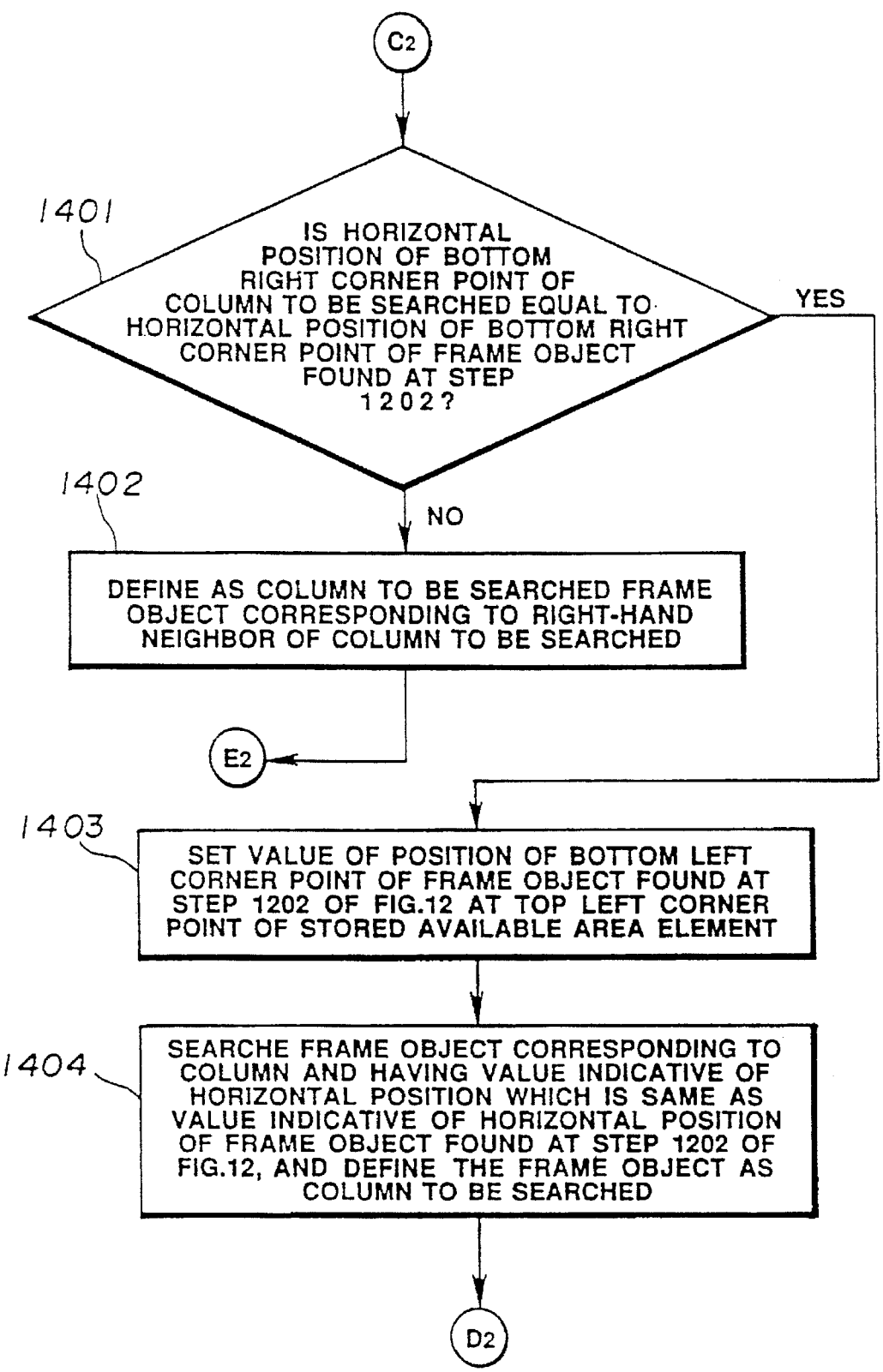

Subsequently, if the answer is "NO" at step 1206 of FIG. 12, the available area generating unit 108 determines whether the horizontal position of the bottom right corner point of the column to be searched is equal to the horizontal position of the bottom right corner point of the frame object found at step 1202, as shown in FIG. 14 (step 1401).

If not at step 1401, the available area generating unit 108 stores as a column to be searched a frame object corresponding to the right neighbor one of the column to be searched (step 1402), and then returns to step 1105 of FIG. 11 and executes the processing at step 1105 seqq.

If the answer is YES at step 1401, the available area generating unit 108 sets the position of the bottom left corner point of the frame object found at step 1202 of FIG. 12 at the top left corner point of the held available area element (step 1403). The available area generating unit 108 searches a frame object having the same horizontal position as the frame object found at step 1202 of FIG. 12, that frame object corresponding to the column, and stores that frame object as a column to be searched (step 1404). Thereafter, the generating unit 108 returns to step 1108 of FIG. 11 and executes the processing at step 1108 seqq.

The horizontal position determining process by the horizontal position determining unit 112 will be described with reference to the flowchart of FIG. 15.

Figure 15:
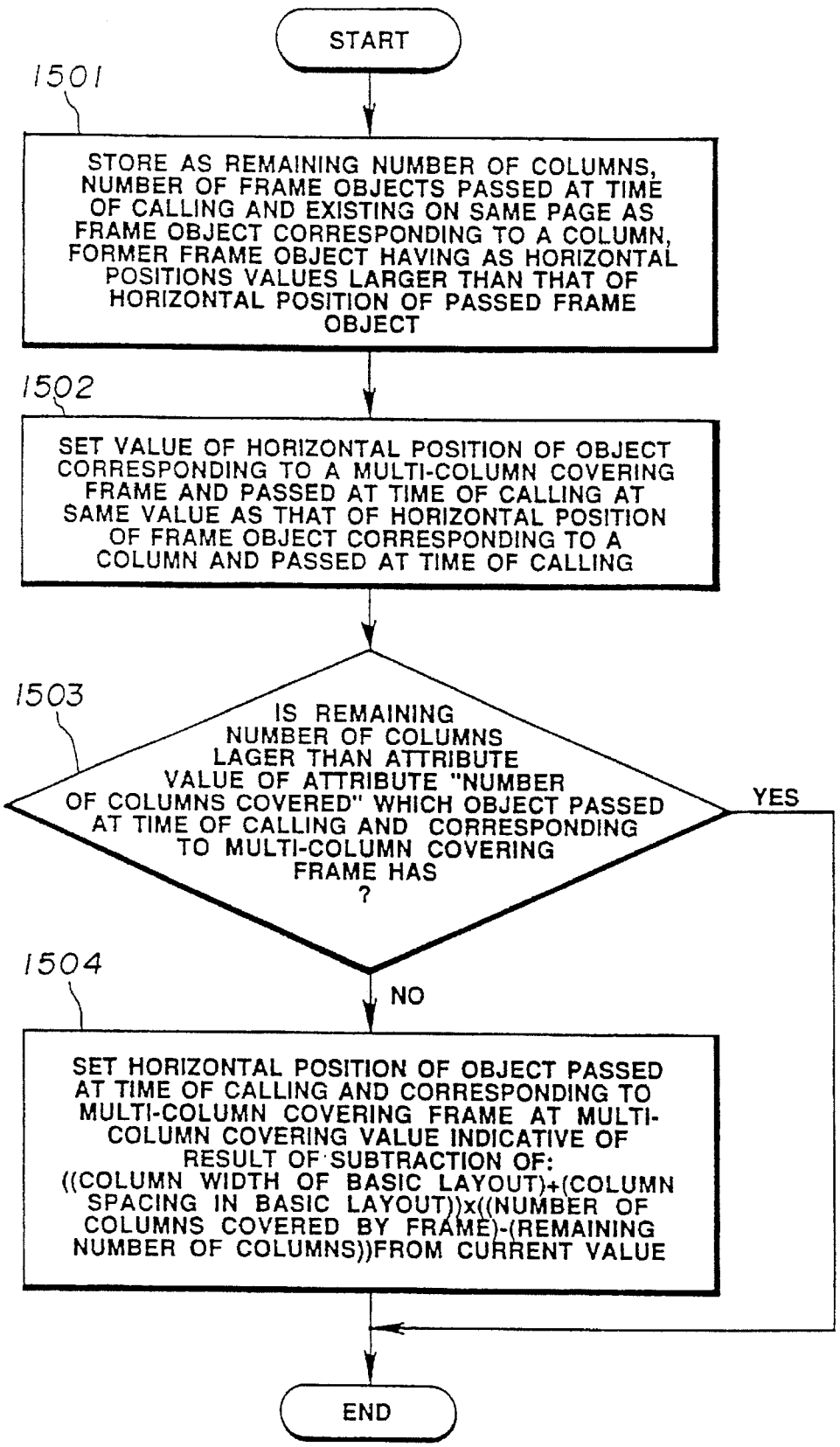
FIG. 15 is a flowchart indicative of the operation of a horizontal position determining unit in the present embodiment.

As shown in FIG. 15, the horizontal position determining unit 112 stores as the remaining number of columns the number of frame objects passed at the time of calling and existing on the same page as the frame object corresponding to a column, the former frame objects having as the horizontal position a value larger than the value of the horizontal position of the frame object passed at the time of calling (step 1501). The horizontal position determining unit 112 also sets the horizontal position of the object passed at the time of calling and corresponding to a frame at the same value as the horizontal position of a frame object passed at the time of calling and corresponding to a column (step 1502). The available area generating unit 108 then checks whether the remaining number of columns is larger than the value of the attribute "number of columns covered" which the object passed at the time of calling and corresponding to a multi-column covering frame has (step 1503).

If the conditions at step 1503 are satisfied (if the answer is YES at step 1503), the generating unit 108 terminates its processing. If the conditions at step 1503 are not satisfied (if the answer is NO at step 1503, the available area generating unit 108 sets the horizontal position of the object passed at the timing of calling and corresponding to a multi-column covering frame at a value obtained as the result of calculation of the following equation (7) (step 1504):

The "current value"−{[(the column width of a basic layout)+(column spacing in the basic layout)]×[(the number of columns covered in the frame)−(the remaining number of columns)]} . . . (7)
and the terminates its processing The vertical position determining process by the vertical position determining unit 113 will be described with reference to the flowcharts of FIGS. 16–19.

Figure 16A:
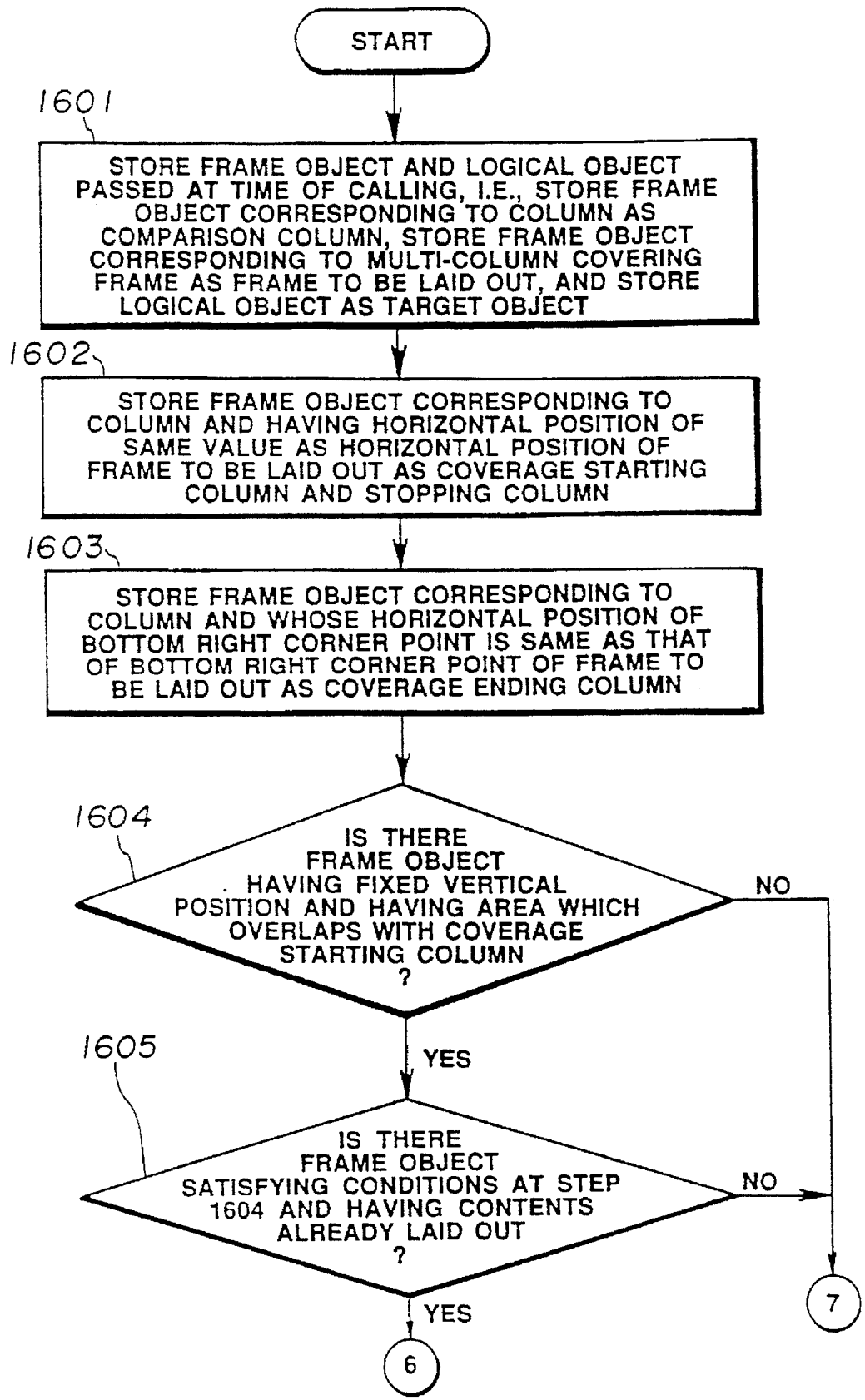
FIGS. 16A, 16B, 17A, 17B, 18A, 18B, 19A and 19B are flowcharts indicative of the operation of a vertical position determining unit in the present embodiment.
Figure 16B:
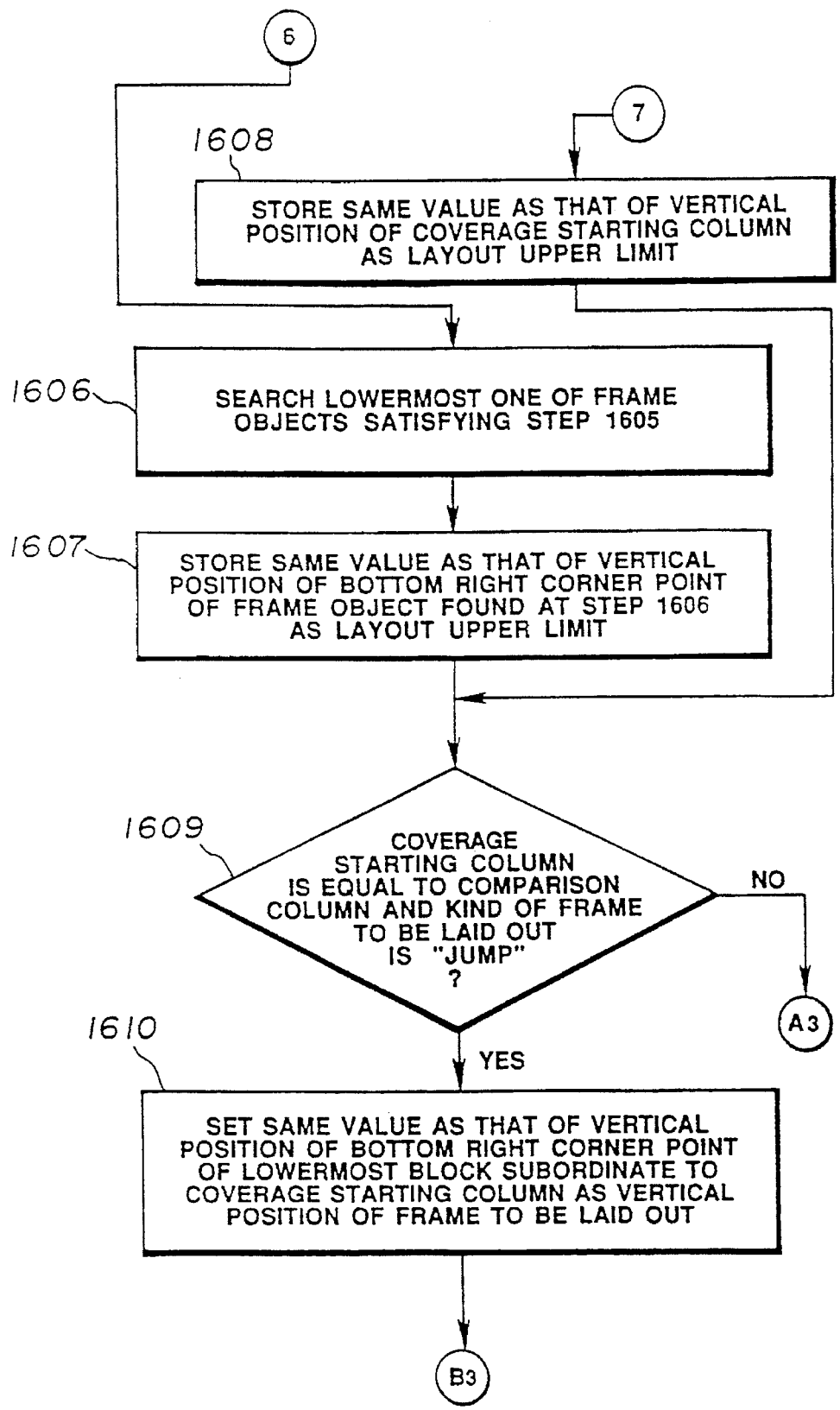

At first, as shown in FIG. 16, the vertical position determining unit 113 stores as a comparison column a frame object passed at the time of calling and corresponding to a column; as a frame to be laid out a frame object passed at the time of calling and corresponding to a multi-column frame; and as a target object a logical object passed at the time of calling (step 1601). It also stores as a coverage starting column and as a stopping column a frame object having the same horizontal position as the frame to be laid out and corresponding to a column (step 1602). It further stores a coverage ending column a frame object where the horizontal position of the bottom right corner point of the frame to be laid out and the horizontal position of the bottom right corner point of the frame to be laid out are the same, the frame object corresponding to a column (step 1603).

The vertical position determining unit 113 checks whether there is a frame object having an area overlapping with the coverage starting column in display or printing, the frame object having a secured vertical position (step 1604).

If the conditions at step 1604 are satisfied (if the answer is YES at step 1604), the vertical position determining unit 113 checks whether there is any one of the frame objects which satisfy the conditions at step 1604 and to which the contents of the document are already laid out (step 1605).

If the conditions at step 1605 are satisfied (if the answer is YES at step 1605), the vertical position determining unit 113 searches the lowermost one of the frame objects which satisfy the conditions at step 1605 (step 1606). It further stores as a layout upper limit the same value as that of the bottom right corner vertical position of the frame object found at step 1606 (step 1607).

If the conditions at steps 1604 and 1605 are not satisfied, the vertical position determining unit 113 stores as a layout upper limit the same value as that of the vertical position of the coverage starting column (step 1608).

After the processing at step 1607 or 1608, the vertical position determining unit 113 checks whether the coverage starting column and the comparison column are equal and the kind of the frame to be laid out is "jump" (step 1609).

If the conditions at step 1609 are not satisfied (if the answer is NO at step 1609), the vertical position determining unit 113 executes the processing shown in FIG. 17 to be described in more detail later. If the conditions at step 1609 are satisfied (if the answer is YES at step 1609), the vertical position determining unit 113 sets the same value as that of the vertical position of the bottom right corner point of the lowermost one of blocks below the coverage starting column at the vertical position of the frame to be laid out (step 1610). Thereafter, the vertical position determining unit 113 executes the processing shown in FIG. 19, to be described later in more detail.

The processing performed when the conditions at step 1609 are not satisfied will be described with reference to FIG. 17.

Figure 17A:
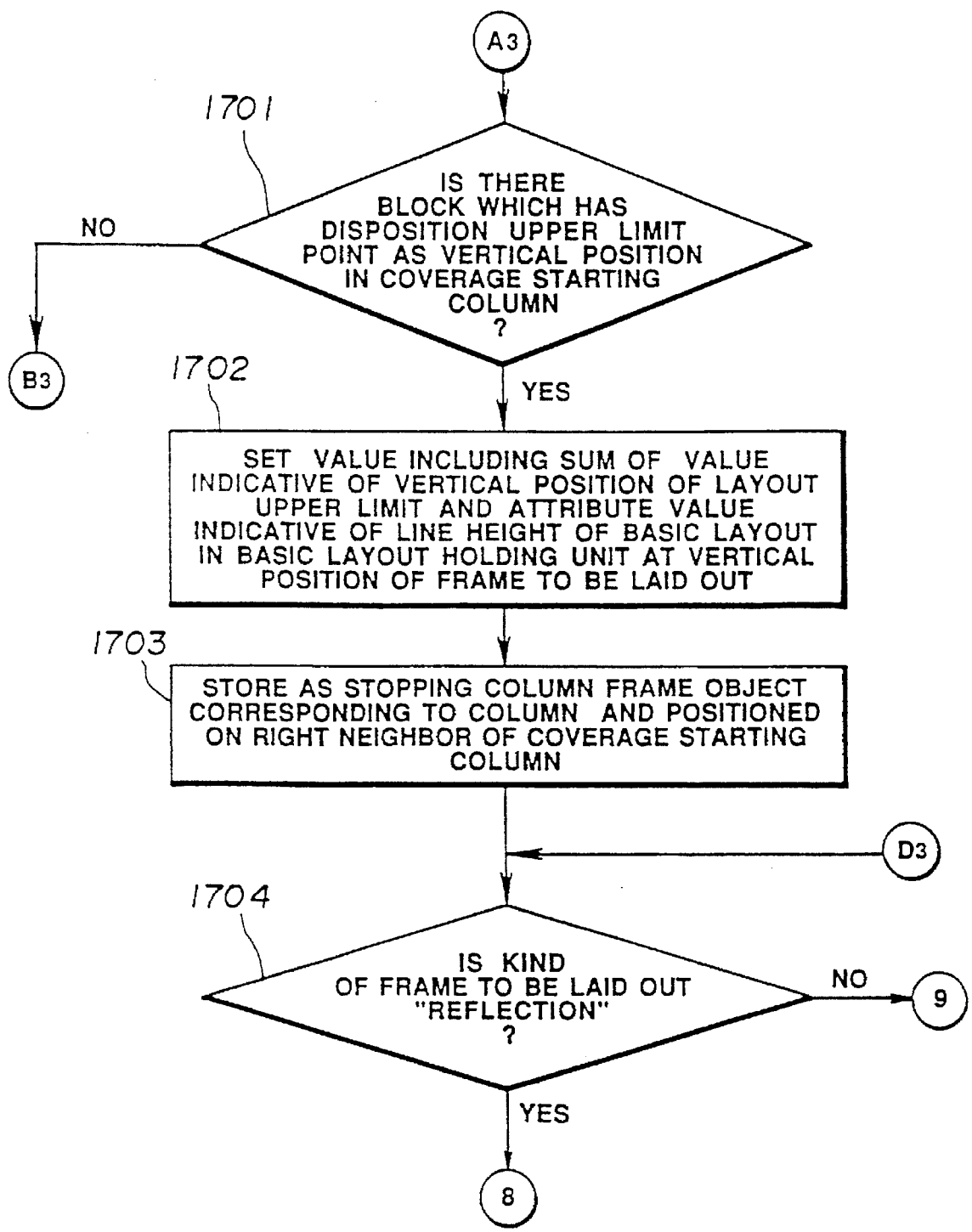
Figure 17B:
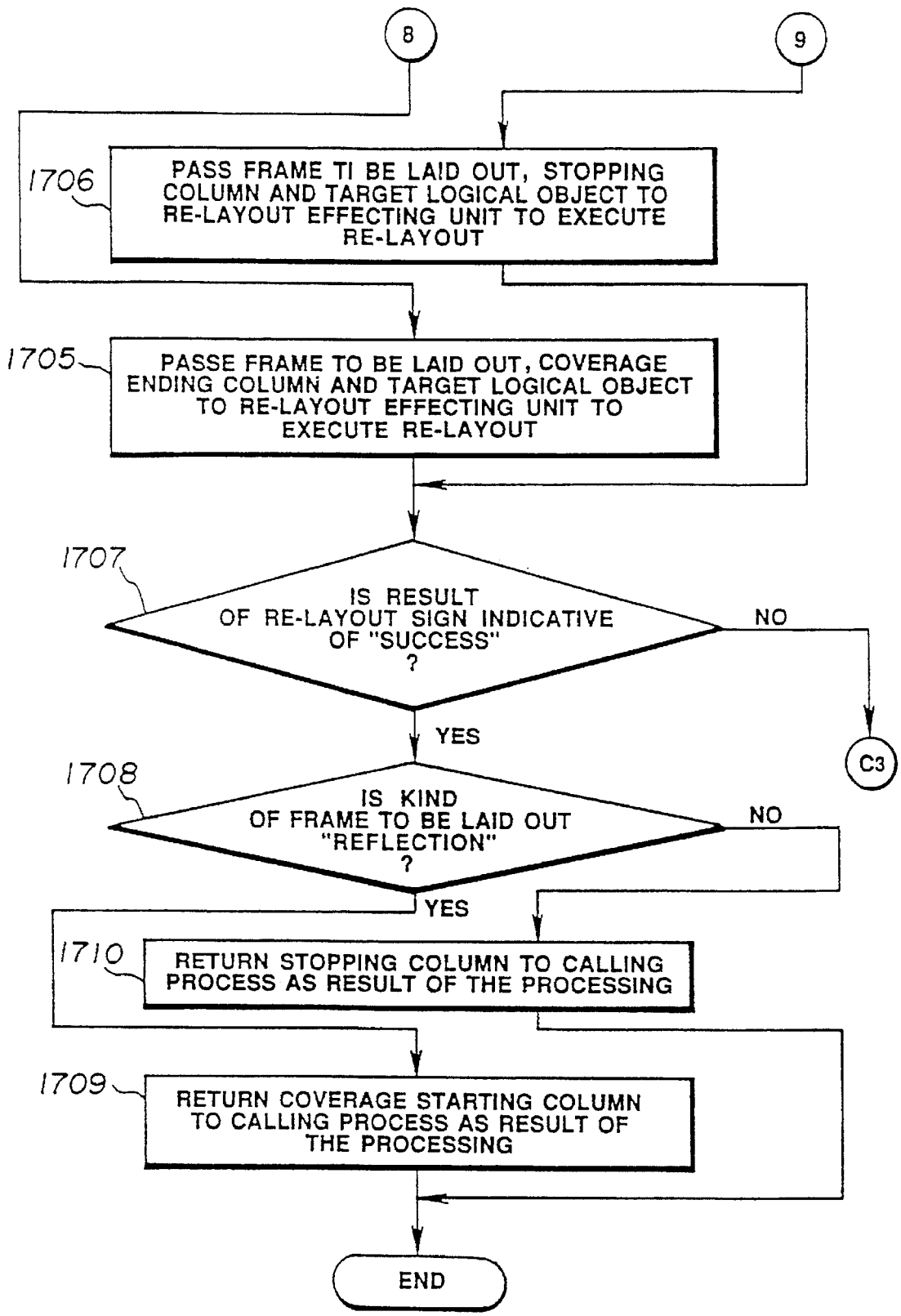

As shown in FIG. 17, the vertical position determining unit 113 first determines whether there is a block, which has a layout upper limit as a vertical position, in the coverage starting column (step 1701).

If there is no such block, the vertical position determining unit 113 executes the processing shown in FIG. 19 to be described later in more detail. If there is such block, it sets the sum of a value indicative of the vertical position of the layout upper limit and the attribute value of the line height in a basic layout in the basic layout holding unit 105 at the vertical position of the frame to be laid out (step 1702). It further stores as a stopping column a frame object having a display or printing area positioned on the right neighbor side of the coverage starting column, that frame object corresponding to a column (step 1703).

The vertical position determining unit 113 determines whether the kind of the frame to be laid out is "reflection" (step 1704). If so, the vertical position determining unit 113 passes the frame to be laid out, coverage ending column and target object to the re-layout effecting unit 114 to cause same to execute a re-layout process (step 1705). If the frame kind is not "reflection", the vertical position determining unit 113 passes the frame to be laid out, stopping column and target object to the re-layout effecting unit 114 to cause same to execute a re-layout process (step 1706).

When the steps 1705 and 1706 are completed, the vertical position determining unit 113 determines whether the result of the re-layout process is a sign indicative of "success"

(step 1707). If so, the vertical position determining unit 113 determines whether the kind of the frame to be laid out is "reflection" (step 1708). If so, the vertical position determining unit 113 returns the coverage starting column to the calling process as the result of the processing performed when the kind of the frame to be laid out is not "jump" (step 1709) and then terminates its processing. If the frame kind is not "reflection" at step 1708, the vertical position determining unit 113 returns the stopping column to the calling process as the result of the processing performed when the kind of the frame to be laid out is not "jump" (step 1710) and then terminates its processing.

Figure 18:
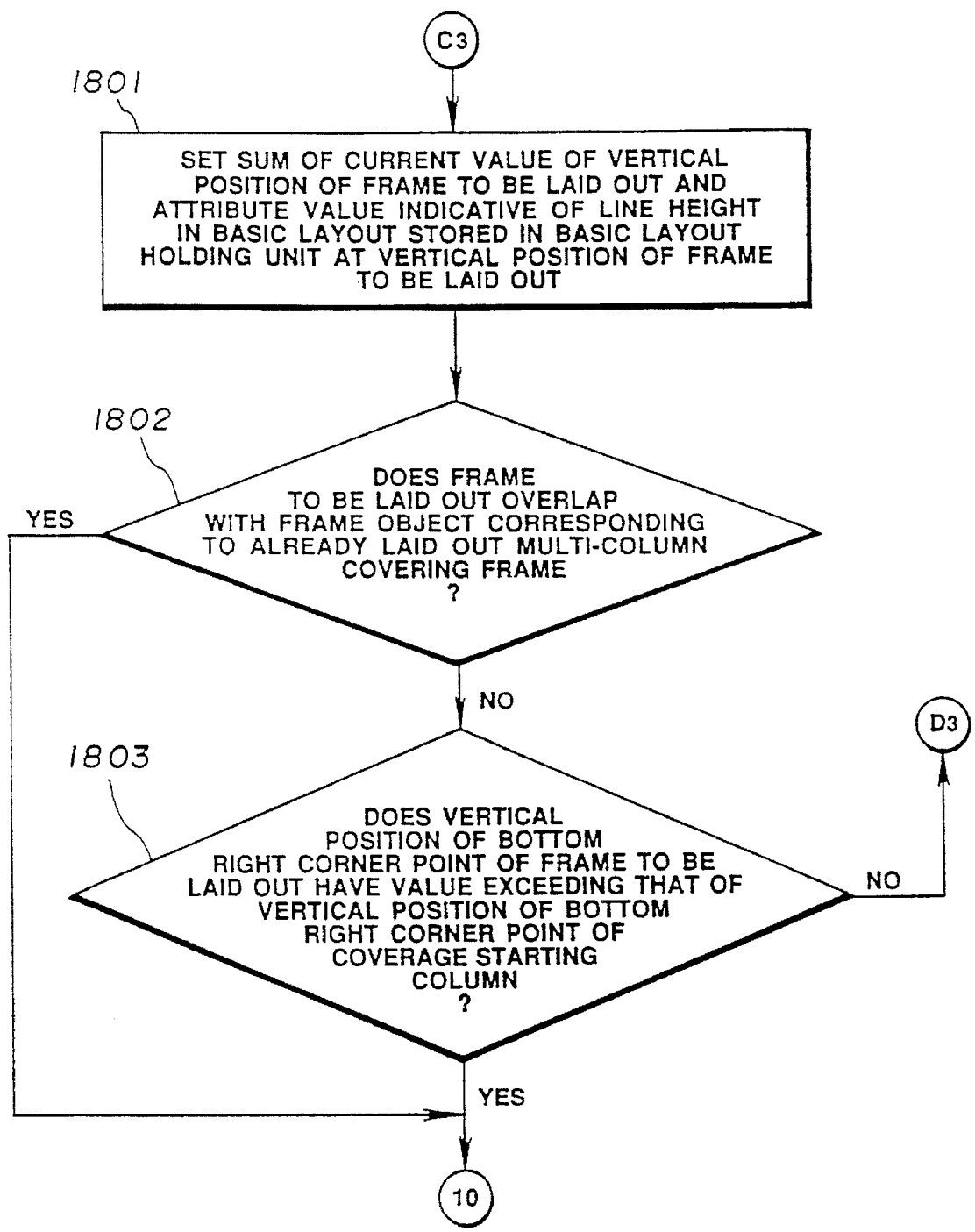
Figure 18B:
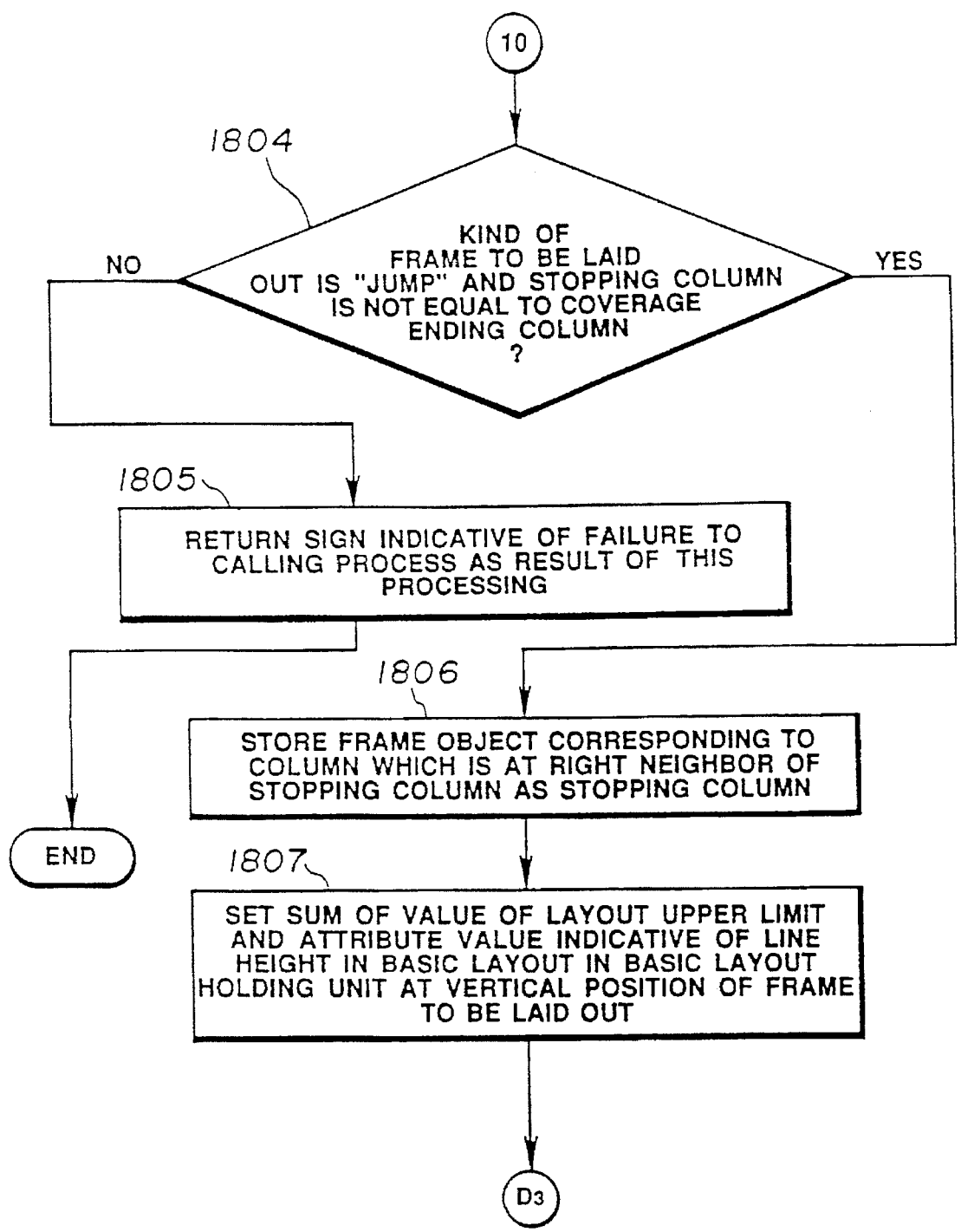

If the result of the re-layout is not a sign indicative of "success" at step 1707 (if the answer is NO at step 1707", the vertical position determining unit 113 performs the processing shown in FIG. 18.

The processing performed when the answer is NO at step 1707 will be described with reference to FIG. 18.

As shown in FIG. 18, the vertical position determining unit 113 sets the sum of its current value and an attribute value indicative of the line height in a basic layout in the basic layout holding unit 105 at the vertical position of the frame to be laid out (step 1801). It then determines whether the frame to be laid out overlaps with a frame object corresponding to the already laid out multi-column covering frame in display or printing area (step 1802). If not, it determines whether the vertical position of the bottom right corner point of the frame to be laid out has a value exceeding that of the vertical position of the bottom right corner point of the coverage starting column (step 1803).

If the answer is YES at steps 1802 and 1803, the vertical position determining unit 113 checks whether the kind of the frame to be laid out is "jump" and the stopping column is equal to the coverage ending column (step 1804).

If the conditions at step 1804 are not satisfied (if the answer is NO at step 1804), the vertical position determining unit 113 returns a sign indicative of "failure" to the calling process as the result of processing performed when the result of the re-layout is not a sign indicative of "success" (step 1805) and the terminates its processing.

If the conditions at step 1804 are satisfied (if the answer is NO at step 1804), the vertical position determining unit 113 stores as a stopping column a frame object having a displaying or printing area which is positioned on the right neighbor side of the stopping column, the frame object corresponding to a column (step 1806). The vertical position determining unit 113 also sets the vertical position of the frame to be laid out at a value including the sum of the value of the layout upper limit and an attribute value indicative of the line height in a basic layout in the basic layout holding unit 105 (step 1807). Thereafter, the vertical position determining unit 113 returns to step 1704 of FIG. 17 and executes the processing at step 1704 seqq.

The processing performed when the step 1610 of FIG. 16 is terminated will be described with reference to FIG. 19.

Figure 19A:
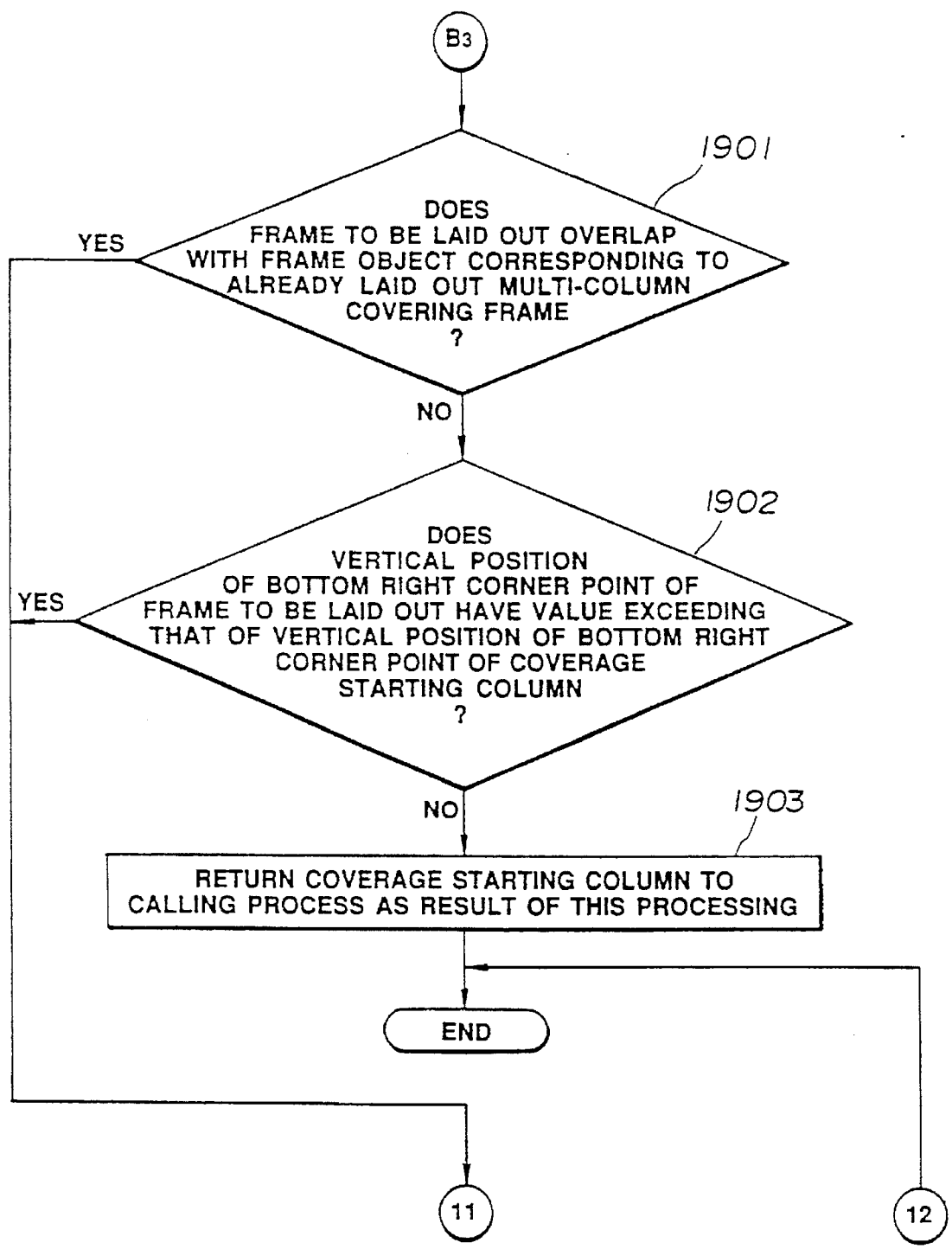
Figure 19B:
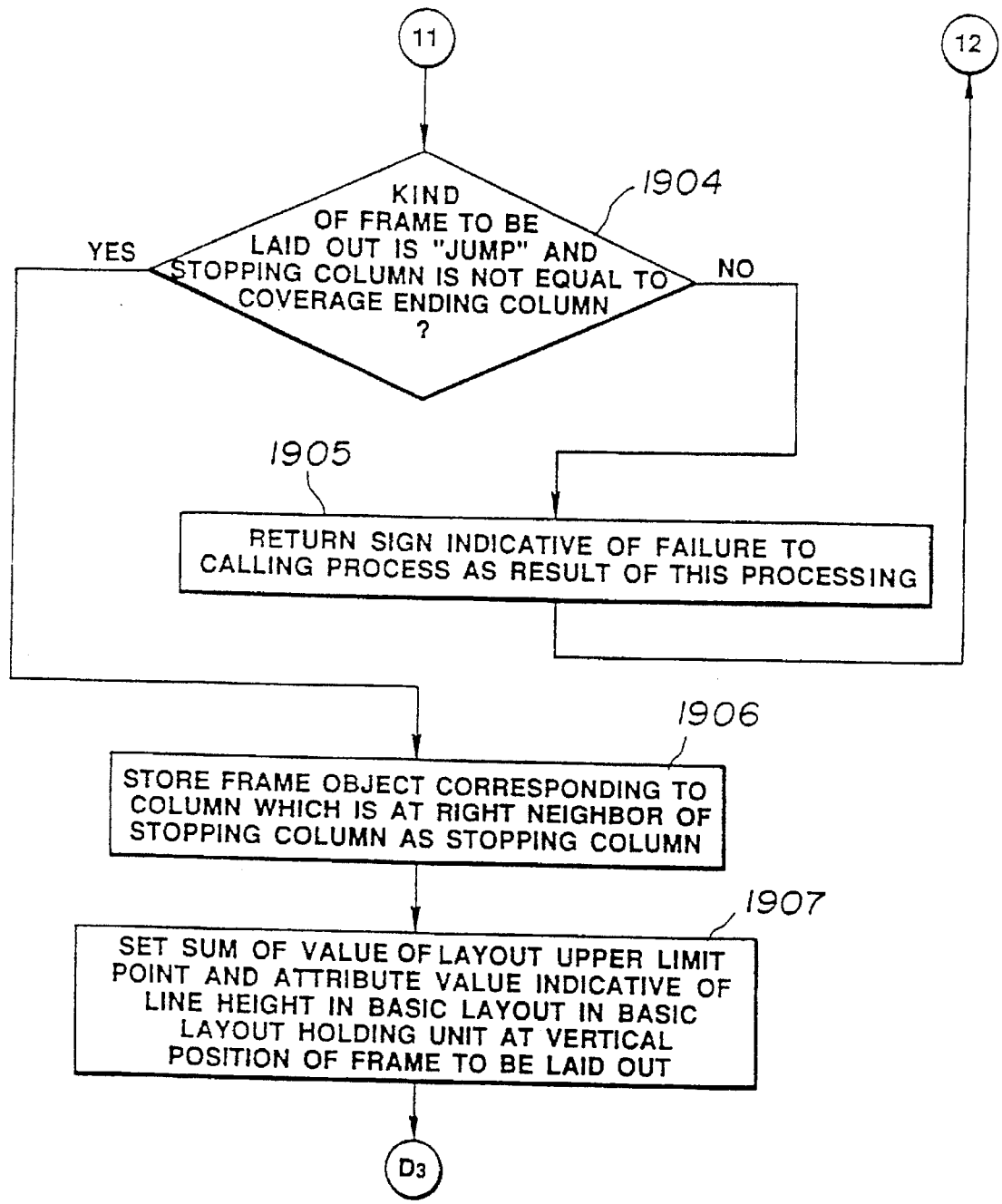

As shown in FIG. 19, the vertical position determining unit 113 determines whether the frame to be laid out overlaps with a frame object corresponding to the already laid out multi-column covering frame in displaying or printing area (step 1901).

If not at step 1901, the vertical position determining unit 113 determines whether the vertical position of the bottom right corner point of the frame to be laid out has a value exceeding that of the vertical position of the bottom right corner point of the coverage starting column (step 1902). If the conditions at step 1902 are not satisfied (if the answer is NO at step 1902), the vertical position determining unit 113 returns the coverage starting column to the calling process as the result of its processing (step 1903) and then terminates its processing.

If the answer is YES at steps 1901 and 1902, the vertical position determining unit 113 checks whether the kind of the frame to be laid out is "jump" and whether the stopping column is equal to the coverage ending column (step 1904). If the conditions at step 1904 are not satisfied (if the answer is NO at step 1904), it returns a sign indicative "failure" to the calling process as the result of its processing (step 1905) and then terminates its processing.

If the conditions at step 1904 are satisfied, the vertical position determining unit 113 stores as a stopping column a frame object having a displaying or printing area positioned on the right neighbor side of the stopping column, that frame object corresponding to a column (step 1906). It also sets the sum of the value of the layout upper limit and an attribute value indicative of a line height in a basic layout in the basic layout holding unit 105 at the vertical position of the frame to be laid out (step 1907). Thereafter, the vertical position determining unit 113 returns to the step 1704 of FIG. 17 and executes the processing at step 1704 seqq.

Next, a re-layout process executed by the re-layout affecting unit 114 will be described with reference to the flow-charts of FIGS. 20–22.

Figure 20A:
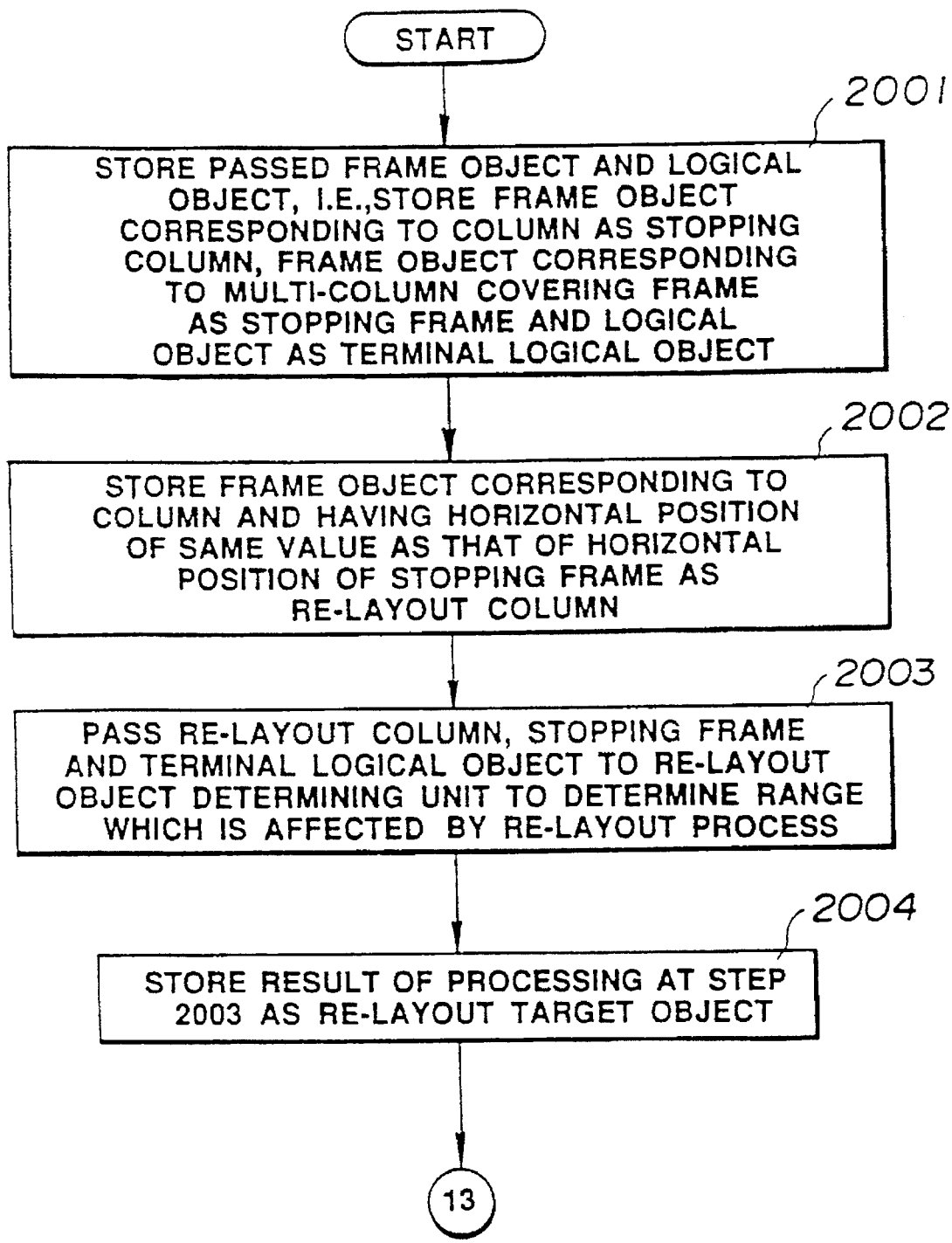
FIGS. 20A, 20B, 21A, 21B, 22A and 22B are flowcharts indicative of the operation of a re-layout affecting unit in the present embodiment.
Figure 20B:
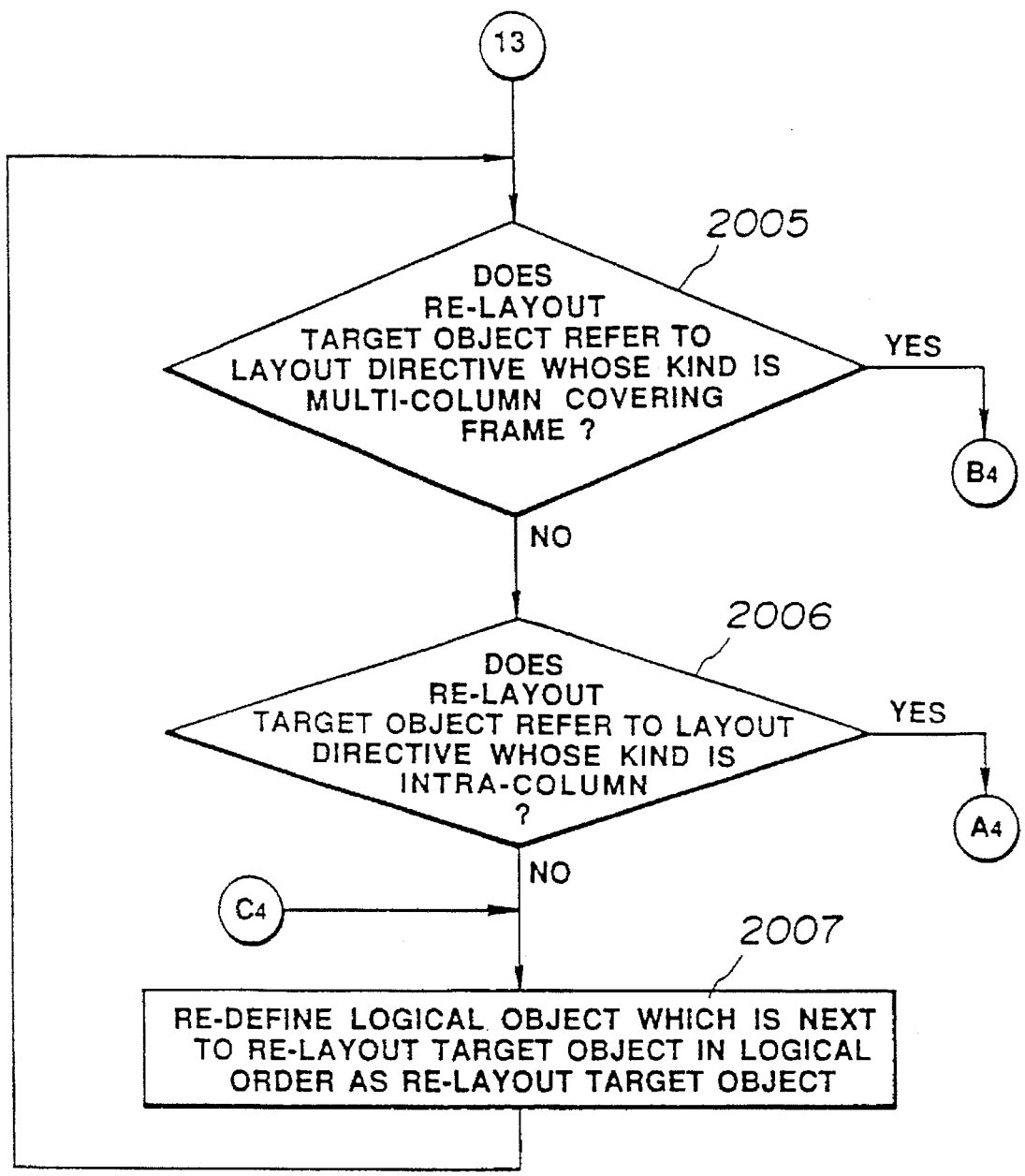

As shown in FIG. 20, the re-layout effecting unit 114 stores as a stopping column a passed frame object corresponding to a column; as a stopping frame a passed frame object corresponding to a multi-column covering frame; and as a terminal logical object a passed logical object (step 2001). It also stores as a re-layout column a frame object having a horizontal position of the same value as the horizontal position of the stopping frame, the frame object corresponding to a column (step 2002). In addition, it passes the re-layout column and the terminal logical object to the re-layout object determining unit 115 to determine a range which is effected by the re-layout process (step 2003). It also stores the result of the processing at step 2003 as a re-layout target object (step 2004).

The re-layout affecting unit 114 determines whether the re-layout target object has referred to a layout directive whose kind is a "multi-column covering frame" (step 2005). If not, it also determines whether the re-layout target object has referred to a layout directive whose kind is "intra-column" (step 2006). If not at step 2006, the re-layout affecting unit 114 defines a logical object which is next to the re-layout target object in the logical order as a re-layout target object (step 2007). Thereafter, the re-layout effecting unit 114 returns to step 2005 and executes the processing at step 2005 seqq.

If the re-layout target object has referred to the layout directive at step 2005, the re-layout affecting unit 114 executes the processing shown in FIG. 22 to be described later in more detail while if the re-layout target object has referred to the layout directive at step 2006, it executes the processing shown in FIG. 21.

The processing performed when the re-layout target object has referred to the layout directive at step 2006 will be described with reference to FIG. 21.

Figure 21A:
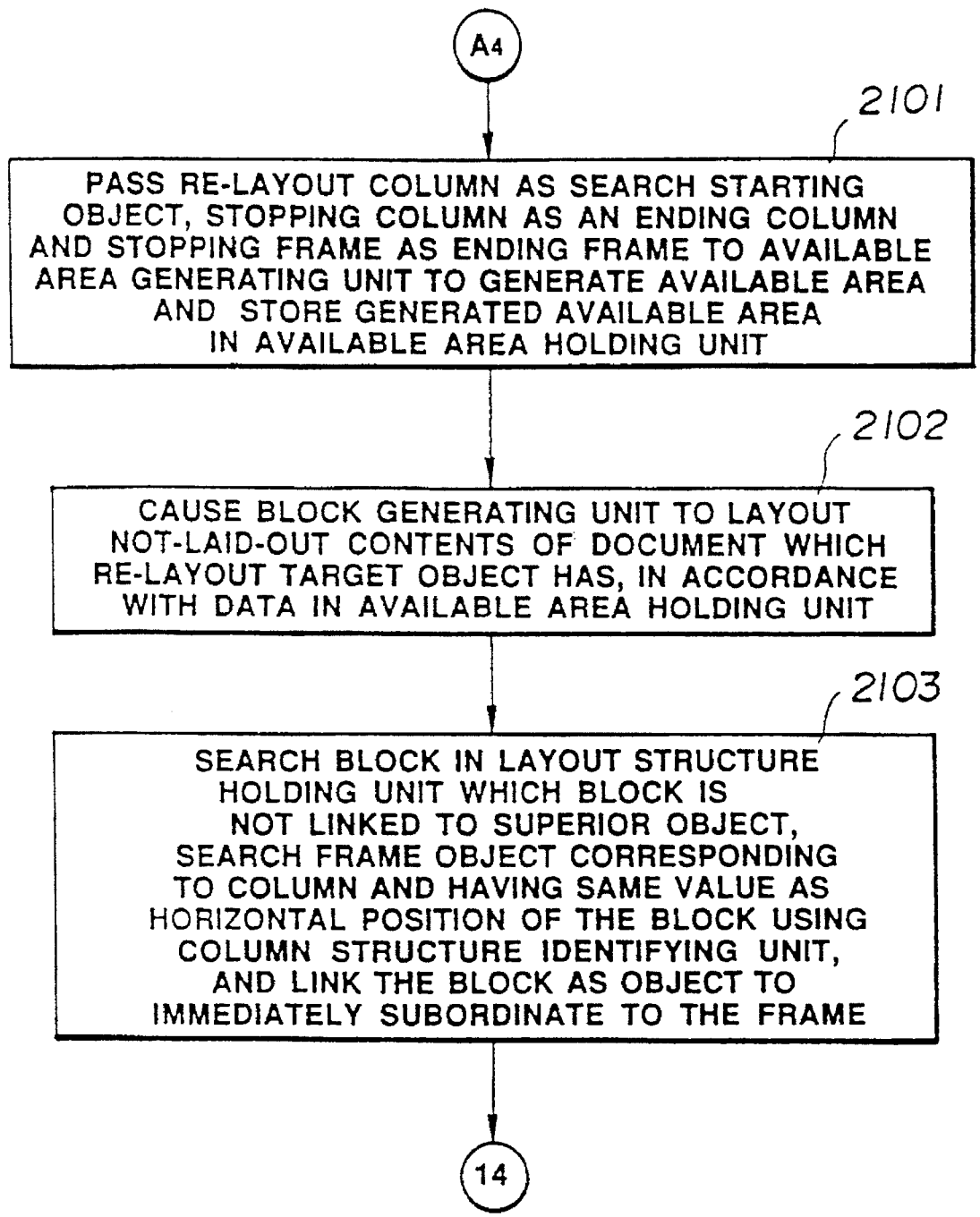
Figure 21B:
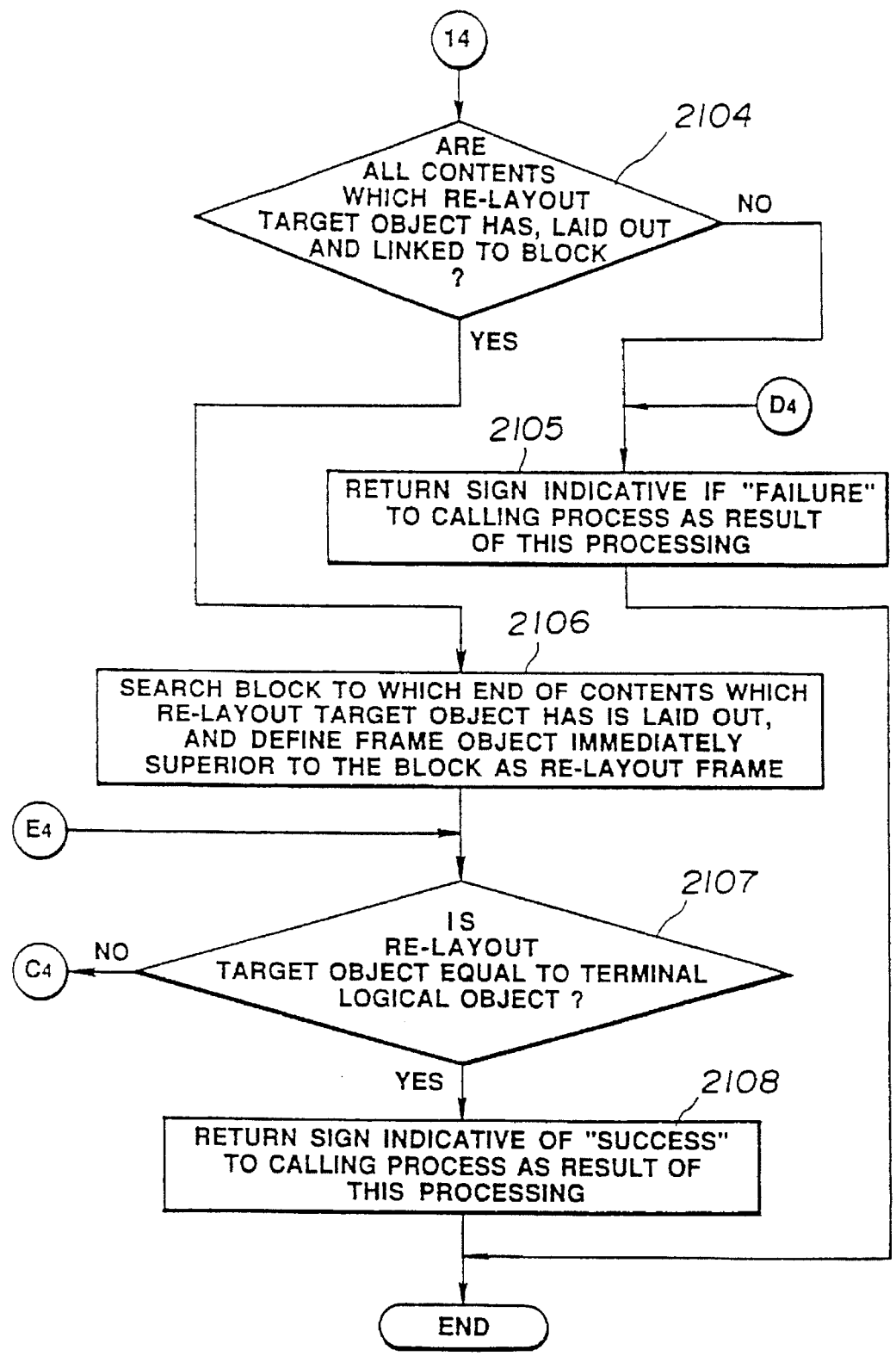

As shown in FIG. 21, the re-layout effecting unit 114 passes to the available area generating unit 108 the re-layout column as a search starting object; the stopping column as an ending column; and the stopping frame as an ending frame to cause same to generate an available area and to store the generated available area in the available area holding unit 107 (step 2101). It also causes the block generating unit 109 to lay out the contents of the document, which the re-layout target object has and not yet laid out, in accordance with data in the available area holding unit 107 (step 2102). It also searches a block in the layout structure holding unit 103 and not linked to a superior object and searches a frame object having the same value as the horizontal position of that block, the frame object corresponding to a column, using the column structure identifying unit 110, and links that block, which is not linked to the superior object, with the frame as an object immediately subordinate to that frame (2103).

The re-layout effecting unit 114 then determines whether all the contents of the document which the re-layout target object has are laid out and linked to a block (step 2104). If not, the re-layout effecting unit 114 returns a sign indicative of "failure" to the calling process as the result of "processing performed when the re-layout target object has referred to a layout directive whose kind is "intra-column" (step 2105) and then terminates its processing. If all the contents which the re-layout target object has are linked, the re-layout effecting unit 114 searches a block to which the last of the contents which the re-layout target object has are laid out and defines a frame object linked directly superior to that block as a re-layout frame (step 2106). Thereafter, it determines whether the re-layout target object is equal to the terminal logical object (step 107).

If the answer is "YES", the re-layout effecting unit 114 returns a sign indicative of "success" to the calling process as a result of the processing performed when the re-layout target object has referred to a layout directive whose kind is "intra-column" (step 2108) and then terminates its processing. If not, the re-layout effecting unit 114 returns to step 2007 of FIG. 20 and executes the processing at step 2007 seqq.

The processing performed when the re-layout target object has referred to the layout directive at step 2005 of FIG. 20 will be described with reference to FIG. 22.

Figure 22A:
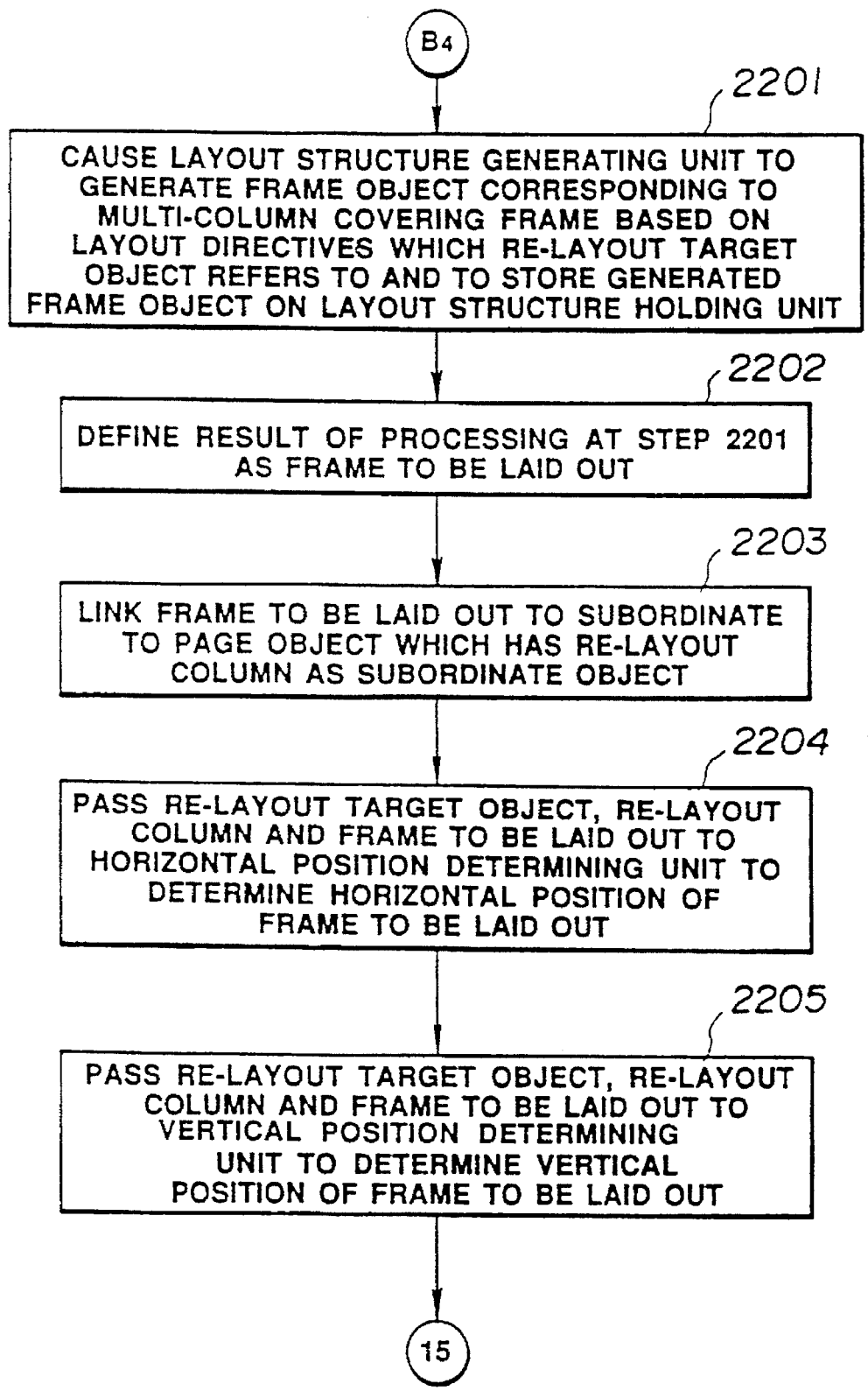
Figure 22B:
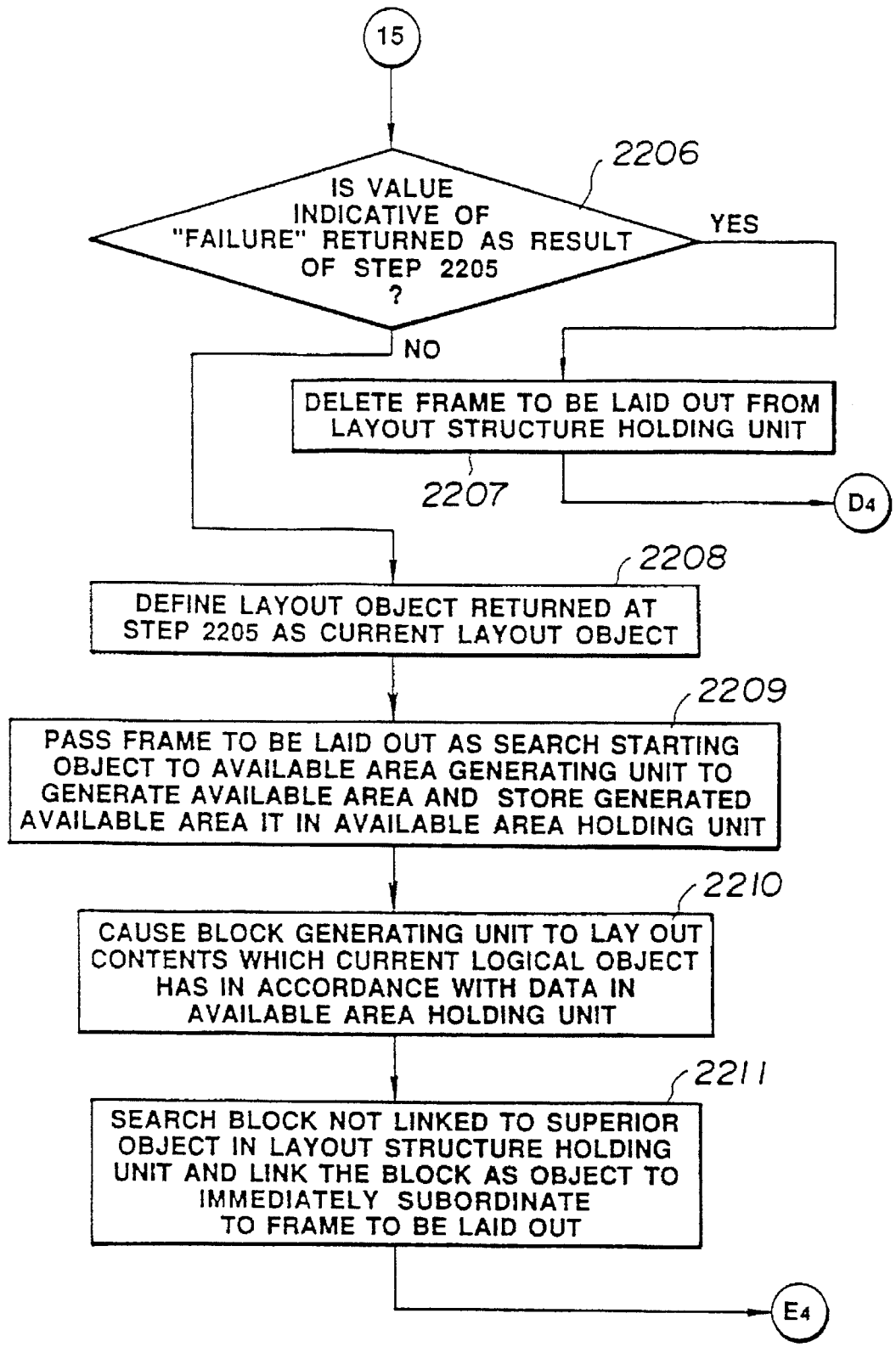

As shown in FIG. 22, the re-layout effecting unit 114 causes the layout structure generating unit 106 to generate a frame object corresponding to a multi-covering frame on the basis of the layout directive which the re-layout target object refers and causes the generating unit 106 to store the resulting frame object in the layout structure holding unit 104 (step 2201). The re-layout effecting unit 114 also stores the result at step 2201 as a frame to be laid out (step 2202). It also links the frame to be laid out with the page object which has the re-layout column as a subordinate object (step 2203). It also passes the re-layout target object, the re-layout column and the frame to be laid out to the horizontal position determining unit 112 to cause same to determine the horizontal position of the layout structure of the frame to be laid out (step 2204). It further passes the re-layout target object, the re-layout column and the frame to be laid out to the vertical position determining unit 113 to cause same to determine the vertical position of the layout structure of the frame to be laid out (step 2205).

The re-layout effecting unit 114 determines whether a value indicative of failure has returned as the results of the processing at step 2205 (step 2206). If the answer is "YES", it deletes the frame to be laid out from the layout structure holding unit 103 (step 2207). Thereafter, it returns to step 2105 of FIG. 21 and executes the processing at step 2105 seqq. If the value does not indicate failure at step 2206, it stores as a current layout object the layout object which is the return value of step 2205 (step 2208).

The re-layout effecting unit 114 passes the frame to be laid out as a search starting object to the available area generating unit 108 to cause same to generate an available area, and to store the generated available area in the available area holding unit 107 (step 2209). It also causes the block generating unit 109 to layout the contents of the document, which the re-layout target object has, in accordance with data in the available area holding unit 107 (step 2210).

Subsequently, the re-layout effecting unit 114 searches a block which is not linked to a superior object in the layout structure holding unit 103 and links that block as an object present immediately subordinate with the frame to be laid out (step 2211). Thereafter, the re-layout effecting unit 114 returns to step 2107 of FIG. 21 and executes the processing at step 2107 seqq.

Thereafter, the re-layout object determining process by the re-layout object determining unit 115 will be described with reference to the flowcharts of FIGS. 23 and 24.

Figure 23A:
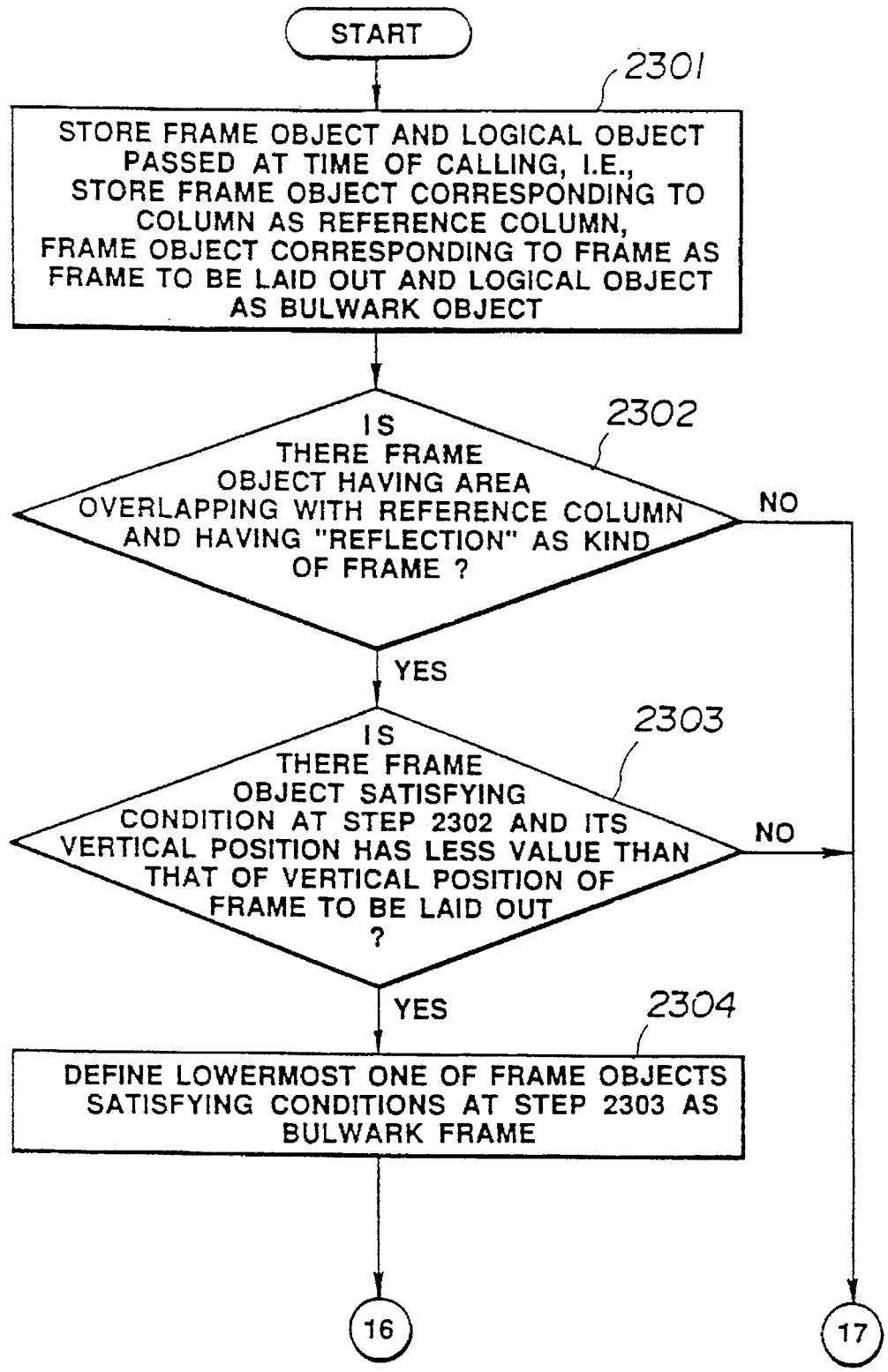
FIGS. 23A, 23B, 24A and 24B are flowcharts indicative of the operation of a re-layout object determining unit in the present embodiment.
Figure 23B:
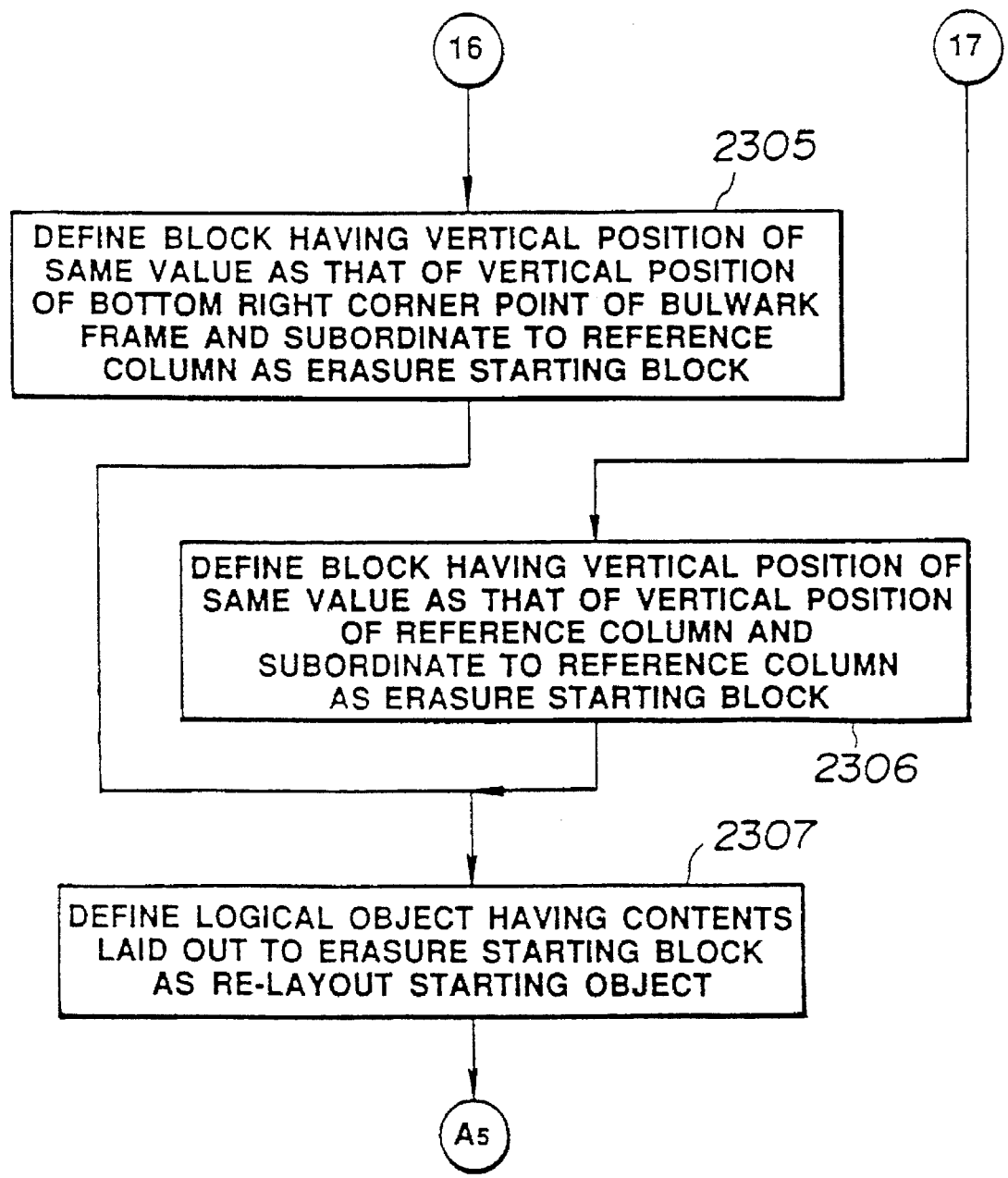

As shown in FIG. 23, the re-layout object determining unit 115 stores as a reference column a frame object passed at the time of calling and corresponding to a column; also as a frame to be laid out a frame object passed at the time of calling and corresponding to a frame; and also as a bulwark object a logical object passed at the time of calling (step 2301).

The re-layout object determining unit 115 checks whether there is a frame object having an area overlapping with a reference column in display or printing, the frame object having a frame kind of "reflection" (step 2302).

If the conditions at step 2302 are satisfied (if the answer is "YES" at step 2302), it checks whether there is a one of frame objects satisfying the conditions at step 2302 and positioned above the frame to be laid out (step 2303).

If the answer is "YES" at step 2303, it stores as a bulwark frame the lowermost one of the frame objects which satisfy the conditions at step 2303 (step 2304). It also stores as an erasure starting block a block having a vertical position of the same value as the vertical position of the right-hand lower corner point of the bulwark frame, the block being subordinate to the reference column (step 2305).

If the answer is "NO" at steps 2302 and 2303, the re-layout object determining unit 115 shores as an erasure starting block a block which has a vertical position of the same value as the vertical position of the reference column, the block being subordinate to the reference column (step 2306).

When the steps 2305 and 2306 are completed, the re-layout object determining unit 115 stores a logic object which has the contents of the document laid out to the erasure stating block as the re-layout starting object (step 2307). Thereafter, the re-layout object determining unit 115 executes the processing shown in FIG. 24, which will be described below.

Figure 24A:
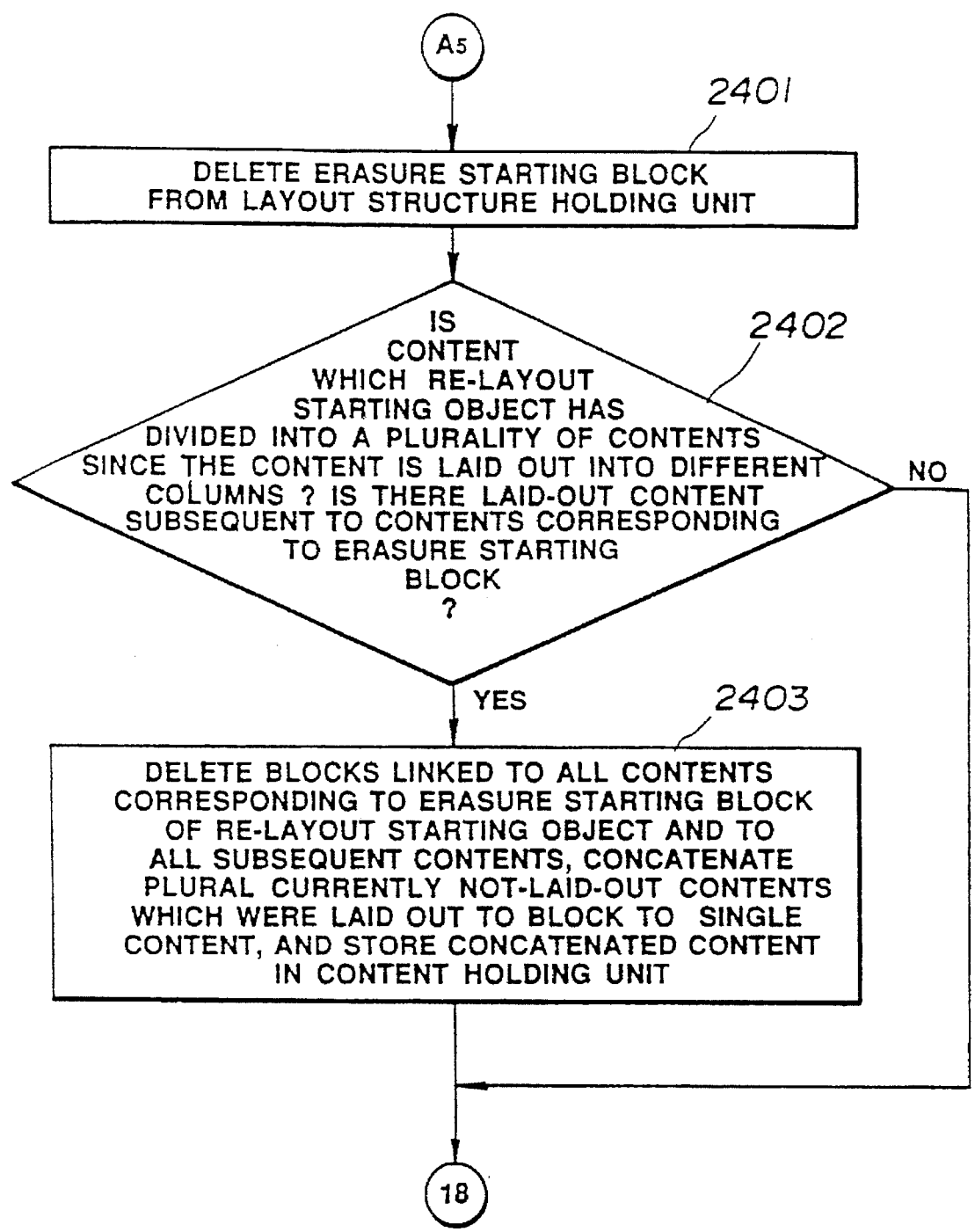
Figure 24B:
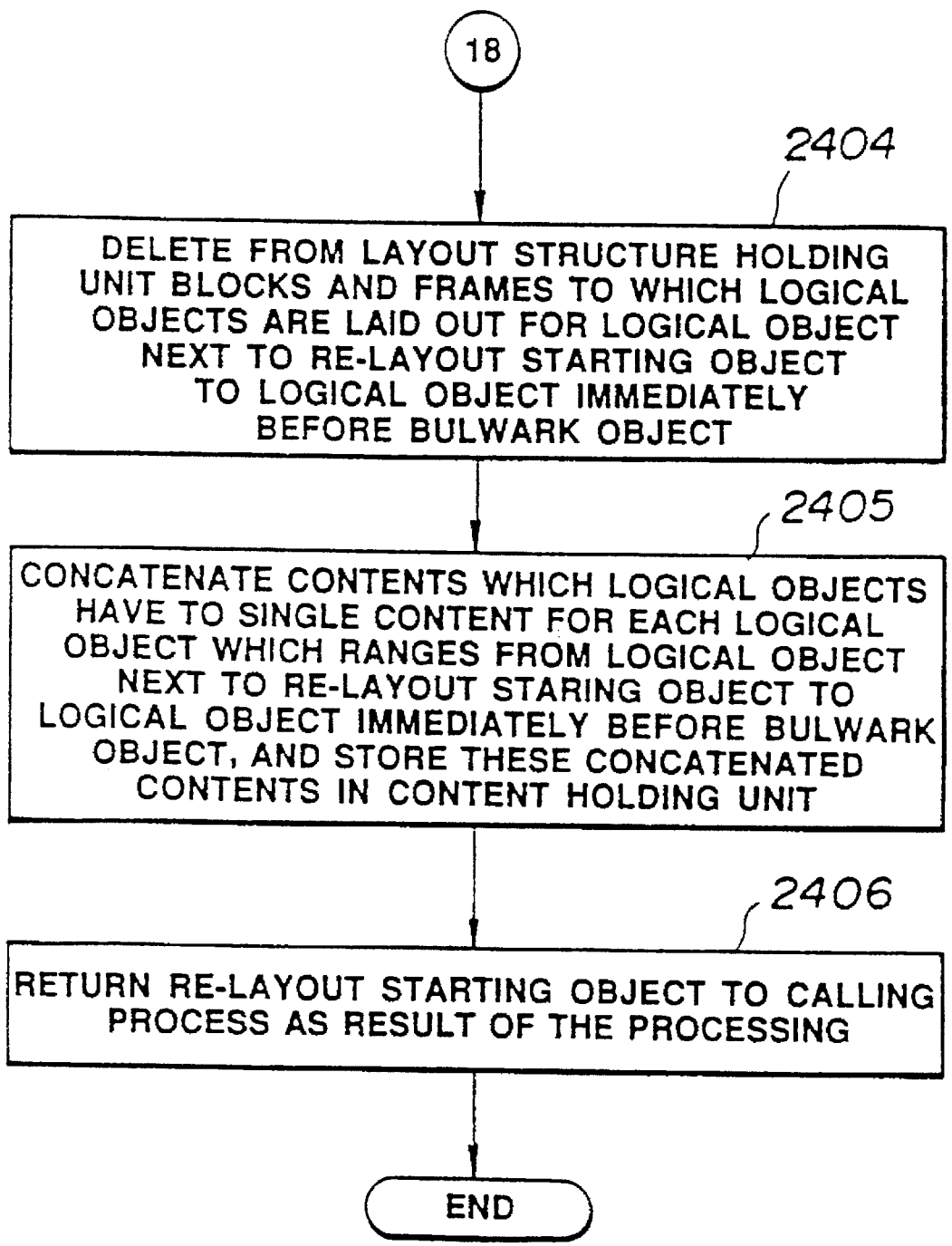

As shown in FIG. 24, the re-layout object determining unit 115 deletes the erasure starting block from the layout structure holding unit 103 (step 2401). It also determines whether the contents of the document which the re-layout starting object has, are divided a plurality of groups of contents and whether there are any laid-out contents of the document among its contents corresponding to the erasure starting block and its contents subsequent to the contents corresponding to the erasure starting block (step 2402).

What is meant by the processing at step 2402 is to determine whether there are the erasure starting block and/or subsequent blocks to erase them.

Assume, for example, that on a page of three columns 1, 2 and 3 the contents of the document which the re-layout starting object has are divided and laid out to the overall columns 1 and 2 and a part of the column 3, a block linked below the column 2 is an erasure starting block. The erasure starting block is deleted at shed 2401. In that case, the contents of the document laid out to the erasure starting block are not laid out at the beginning of step 2402 and hence are an object to be re-laid out. The contents of the document remains laid out to the block subordinate to the column 3. That the contents of the document laid out to the column 2 become an object to be re-laid out means that the contents of the document laid out to the column 3 also are required to be an object to be laid out. The re-layout effecting unit 115 determines whether there are any laid-out contents of the document and corresponding to, or following the erasure starting block.

If the answer is "YES" at step 2402, the re-layout object determining unit 115 deletes blocks linked to all the contents of the document corresponding to and following the erasure starting block of the re-layout starting object, unites a plurality groups of contents of the document which are not laid out at present and stores the result in the content holding unit 101 (step 2403). It also deletes from the layout structure holding unit 103 the blocks and frames to which the logical objects ranging from the logical object next to the re-layout starting object to the logical object directly before the bulwark object are laid out (step 2404).

The re-layout object determining unit 115 concatenates for each logical object the contents of the document which the logical objects ranging from the logical objects next to the re-layout starting object to the logical object directly before the bulwark object has and stores them in the content holding unit 101 (step 2405). As the result of this processing, the re-layout object determining unit 115 returns the re-layout starting object to the calling process (step 2406). Thereafter, it terminates its processing. If there are no contents laid out as step 2402, the re-layout object determining unit passes to step 2404.

The layout by this embodiment will be described using five examples with reference to FIGS. 25–55.

In this embodiment, it is defined as "a heading frame starts" or "a diagram frame starts" that the left-hand vertical side of a heading frame or diagram frame as a multi-column covering frame is determined such that it coincides with the left-hand vertical side of a rectangular area corresponding to a column.

A first example will be described. Assume in the first example that in a logical structure of FIG. 25 the contents of an article 1 are for six lines; the contents of the text of an article 2 are for 23 lines; and the contents of the text of an article 3 are for 7 lines. Assume further that the headings of the articles are directed so as to be laid out to a 2-column covering reflective frame having a height for 2 lines by layout directives. The page includes columns 1, 2 and 3, each having a height for 15 lines, as shown in FIG. 26.

Figure 25:
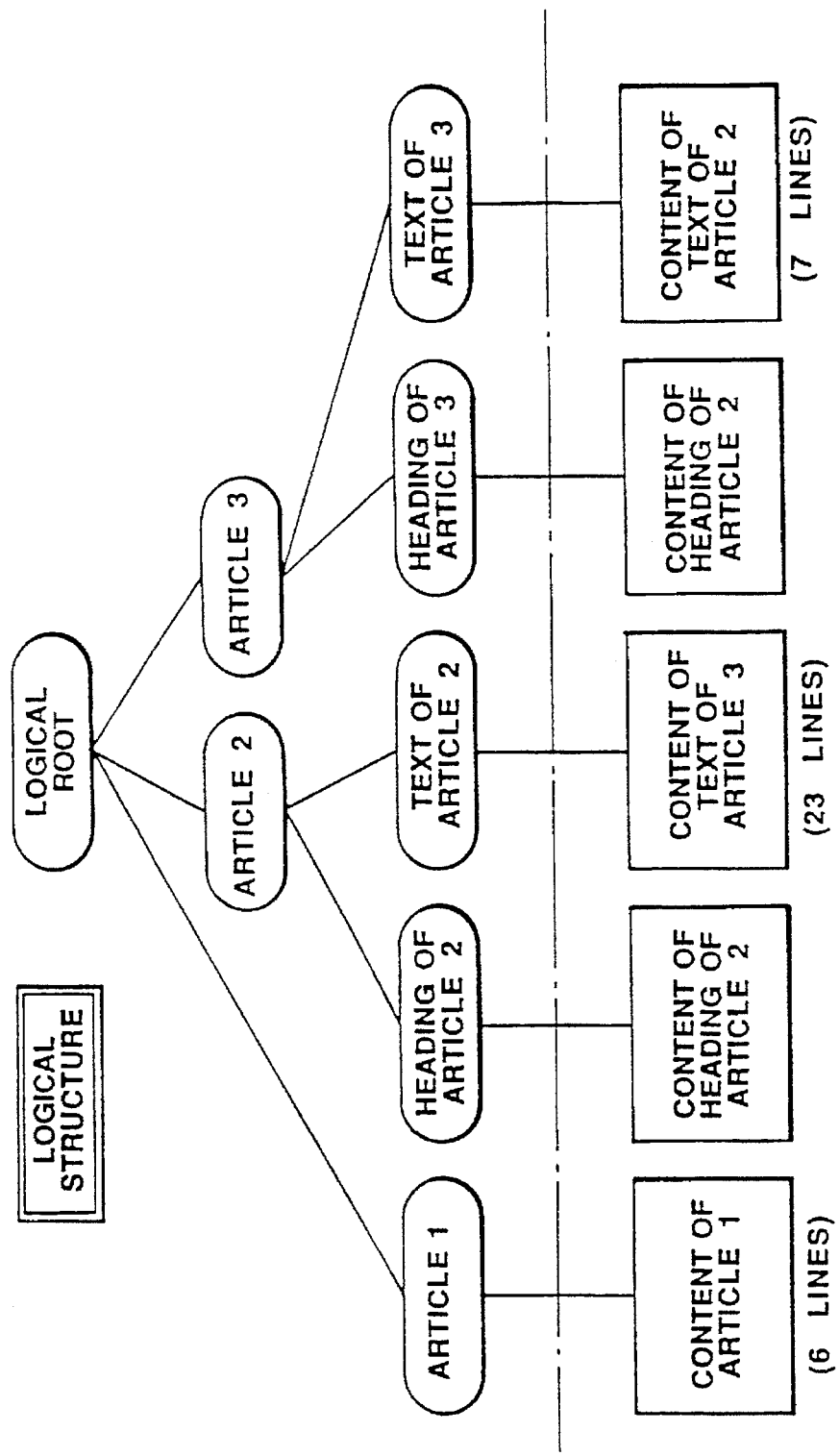
Figure 26:
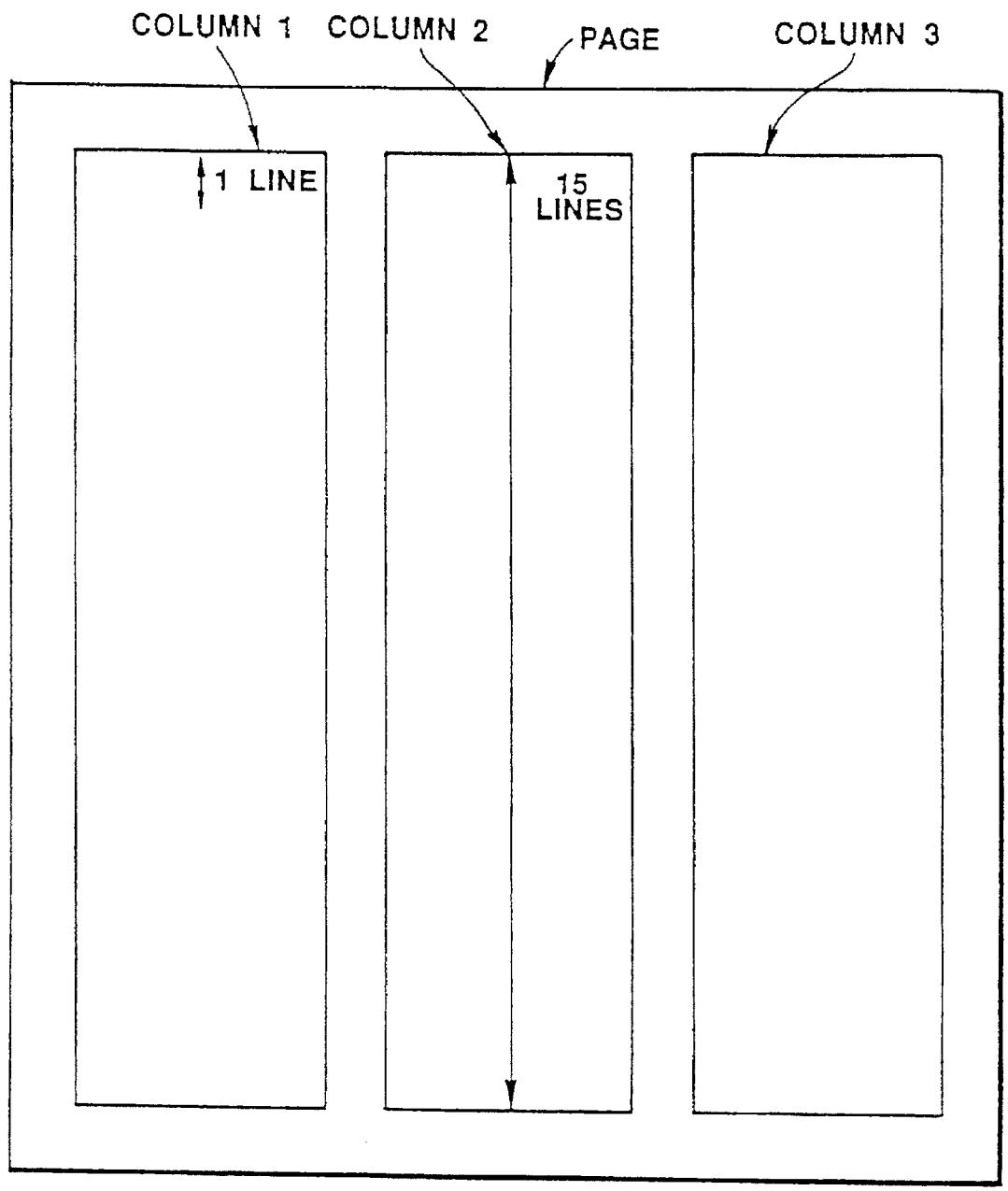
Figure 27:
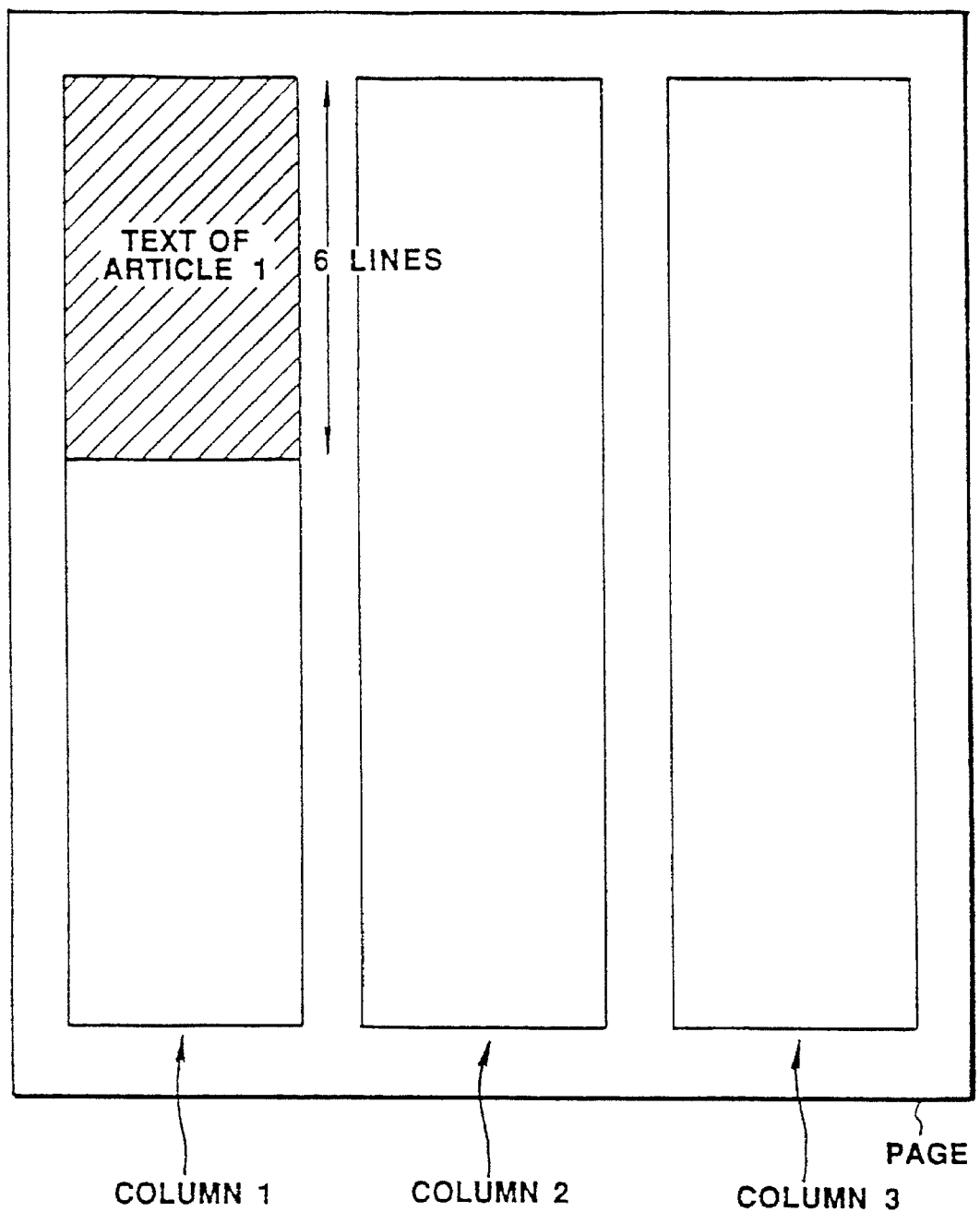
Figure 28:
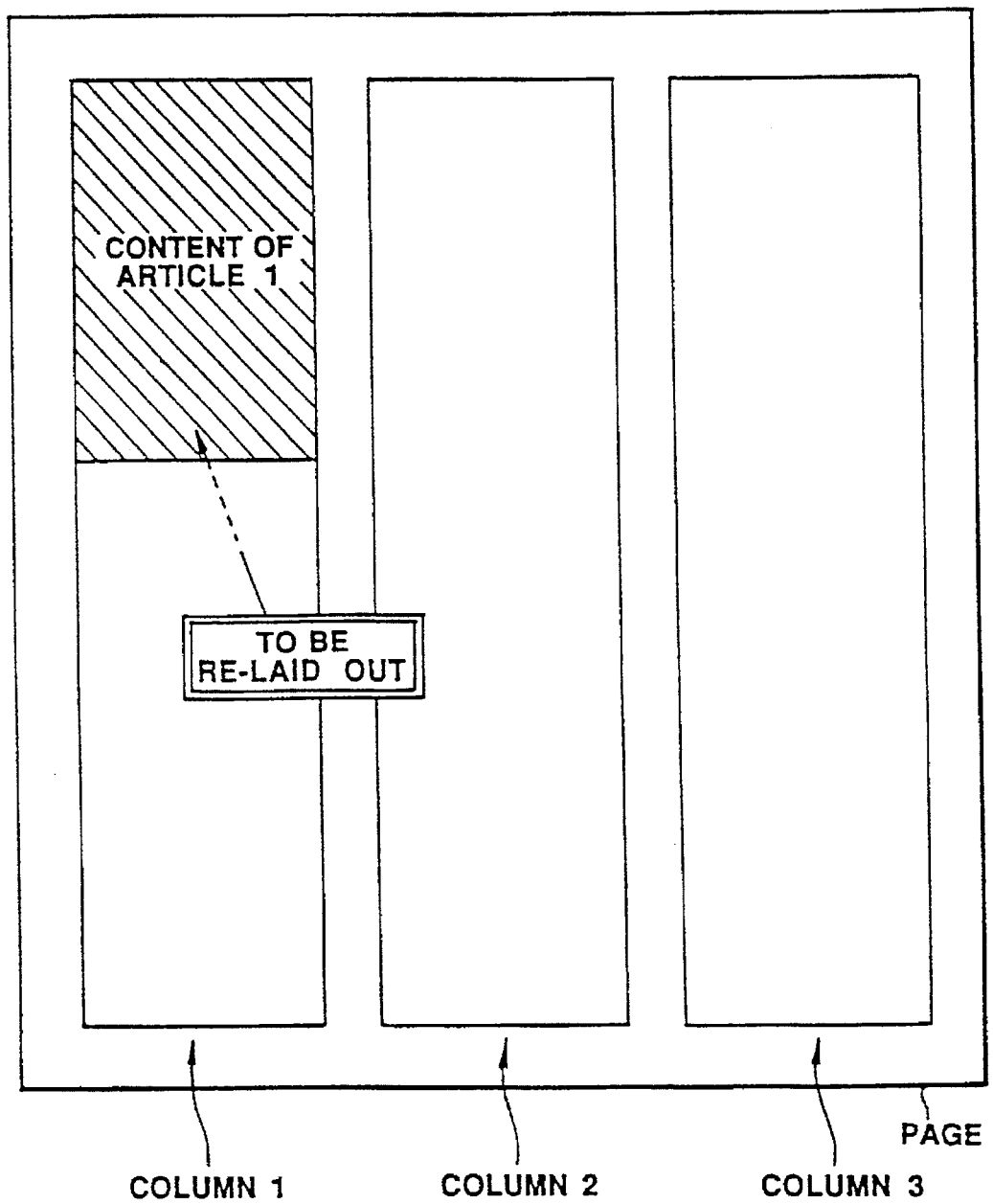
Figure 29:
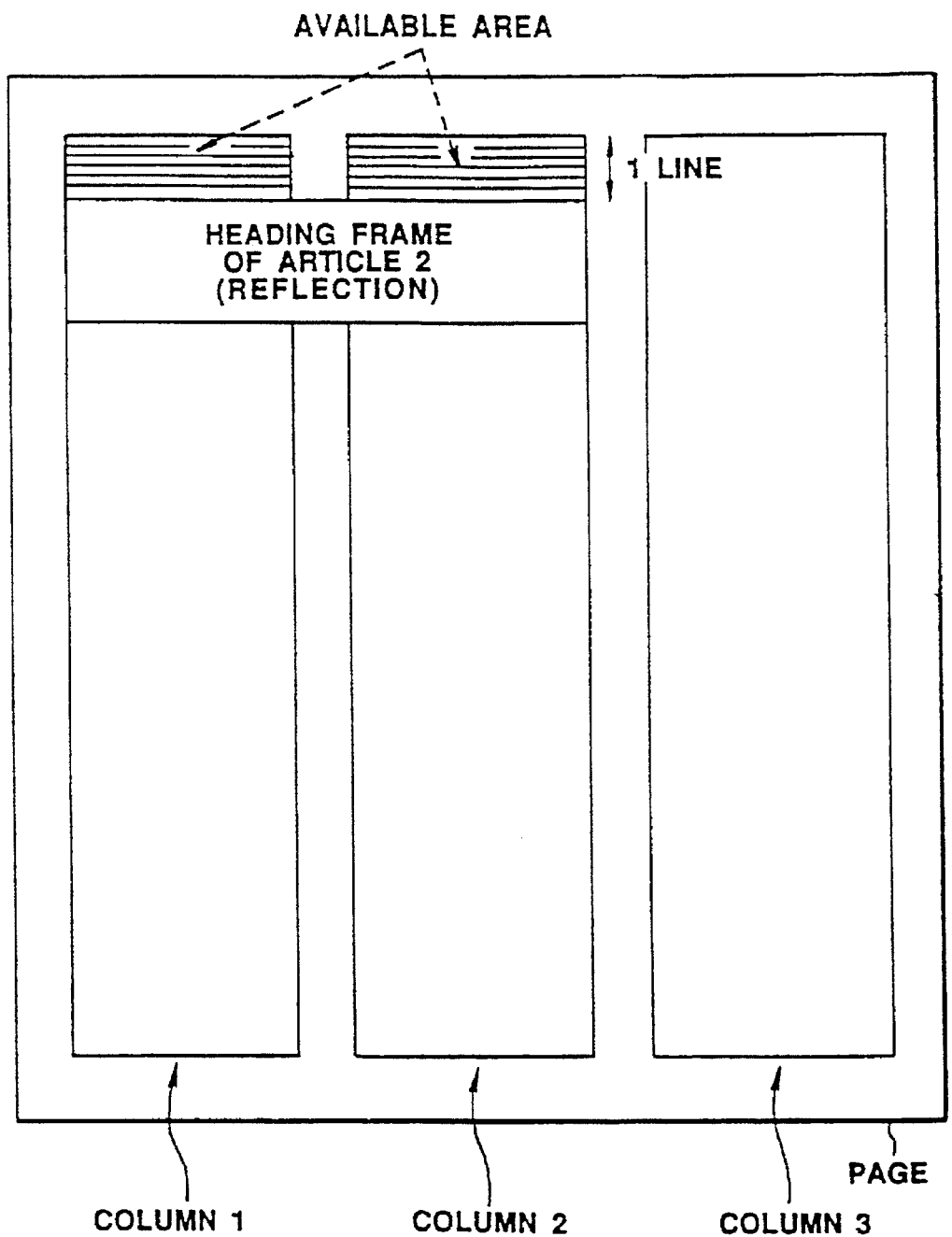

When layout for the logical structure shown in FIG. 25 is effected, first, the article 1 is laid out to the column 1, as shown in FIG. 27. Next, a heading of article 2 is to be laid out. This causes a frame to which the heading of the article 2 is laid out is first generated. The column to which the end of the contents is laid out at this time is the column 1, so that the horizontal position of the heading frame of the article 2 is determined such that "the heading frame starts" with the column 1. The heading frame of the article 2 covers the columns 1 and 2 and is laid out so as to start with the first line. Thus the article 1 already laid out becomes a re-layout object, as shown in FIG. 28. As shown in FIG. 29, the heading frame of the article 2 is put so as to start with the second line, and an available area (shown hatched horizontally in FIG. 29) for laying out the article 1 to the column portions 1 and 2 above the heading frame of the article 2 is ensured.

Figure 30:
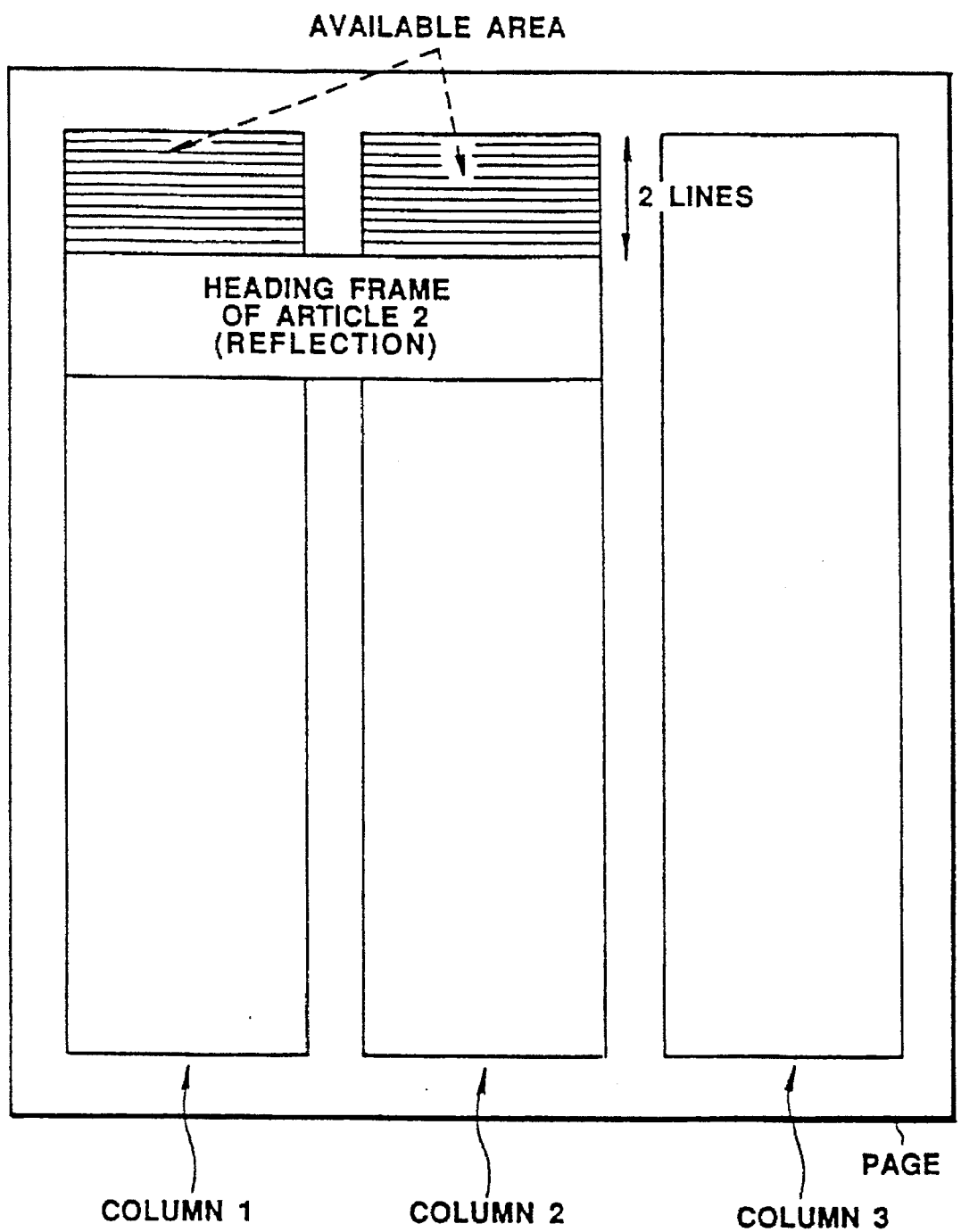
Figure 31:
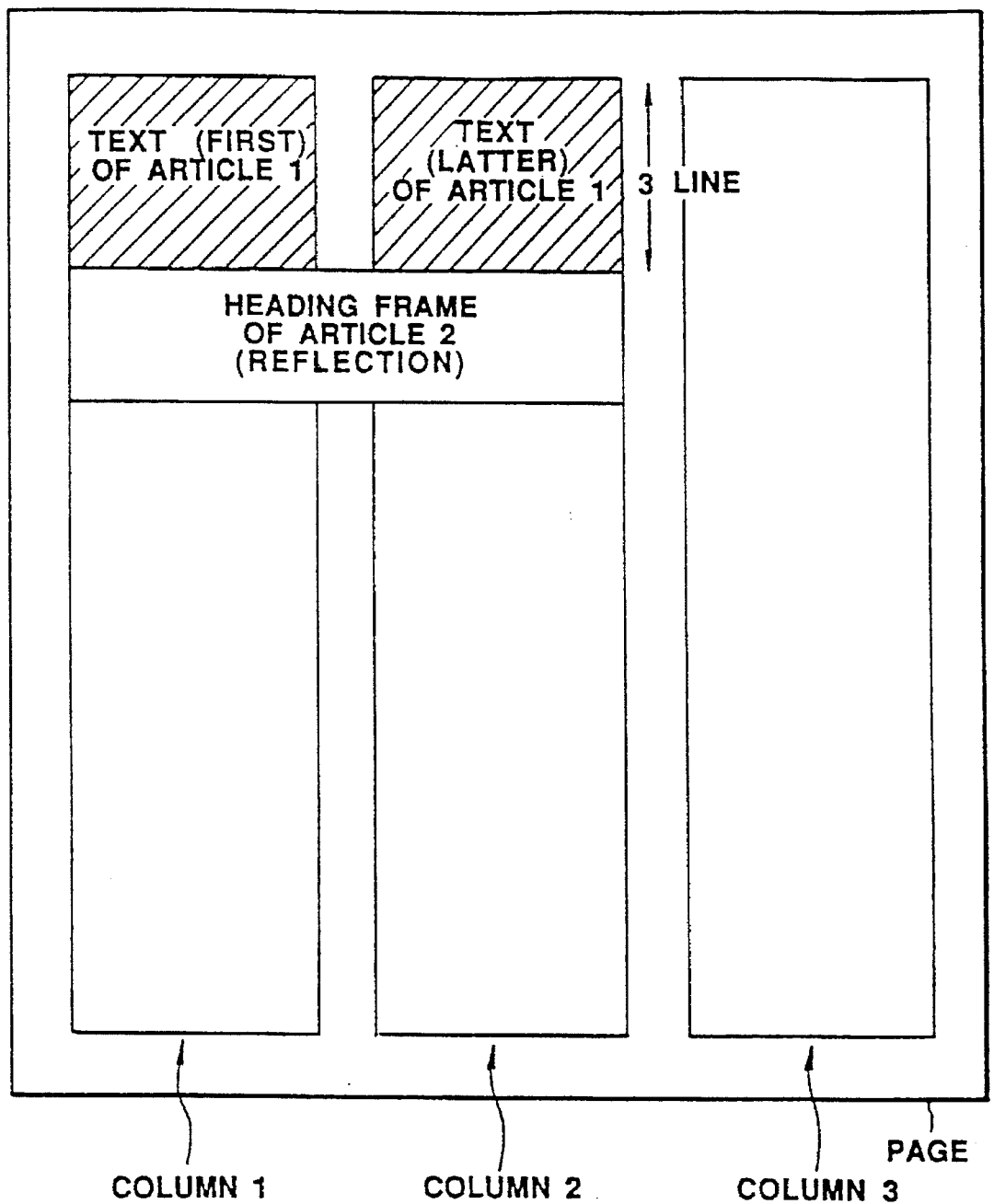

Since only the contents of an article for two lines can be laid out to the available area, however, the layout of the contents (for six lines) of the article 1 fails. Thus, as shown in FIG. 30, the position of the heading frame of the article 2 is shifted down for one line so as to start with the third line such that a new available area for layout of the text in the article 1 is ensured in the columns 1 and 2. Also in this case, however, the layout of the article 1 fails, so that the position of the heading frame of the article 2 is further shifted down for one line so as to start with the fourth line. Since the contents of the article for six lines can be laid out to the available area at this time, the layout of the text of the article 1 succeeds. Thus, the vertical position of the heading of the article 2 is determined. This state is shown in FIG. 31.

Figure 32:
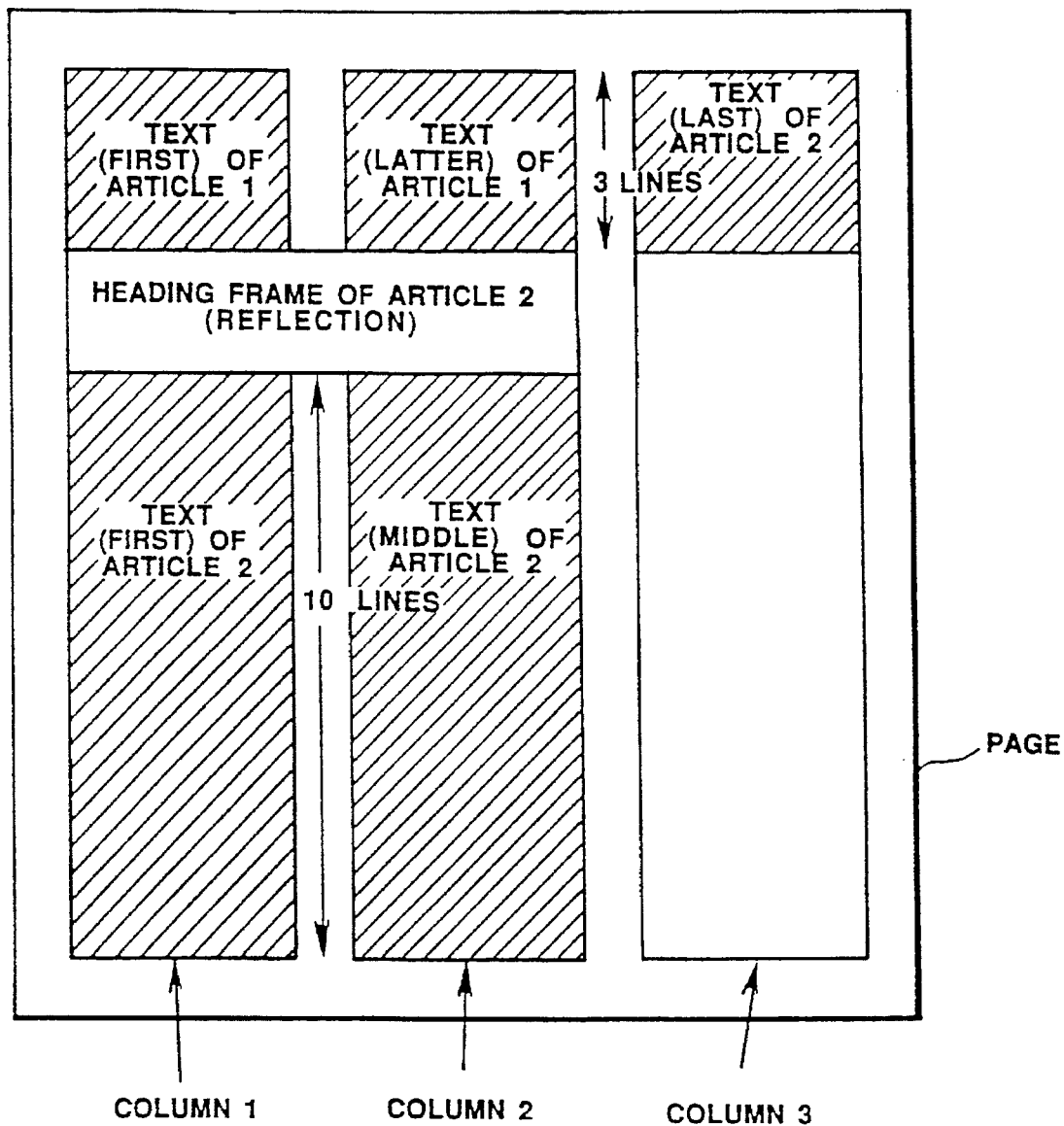
Figure 33:
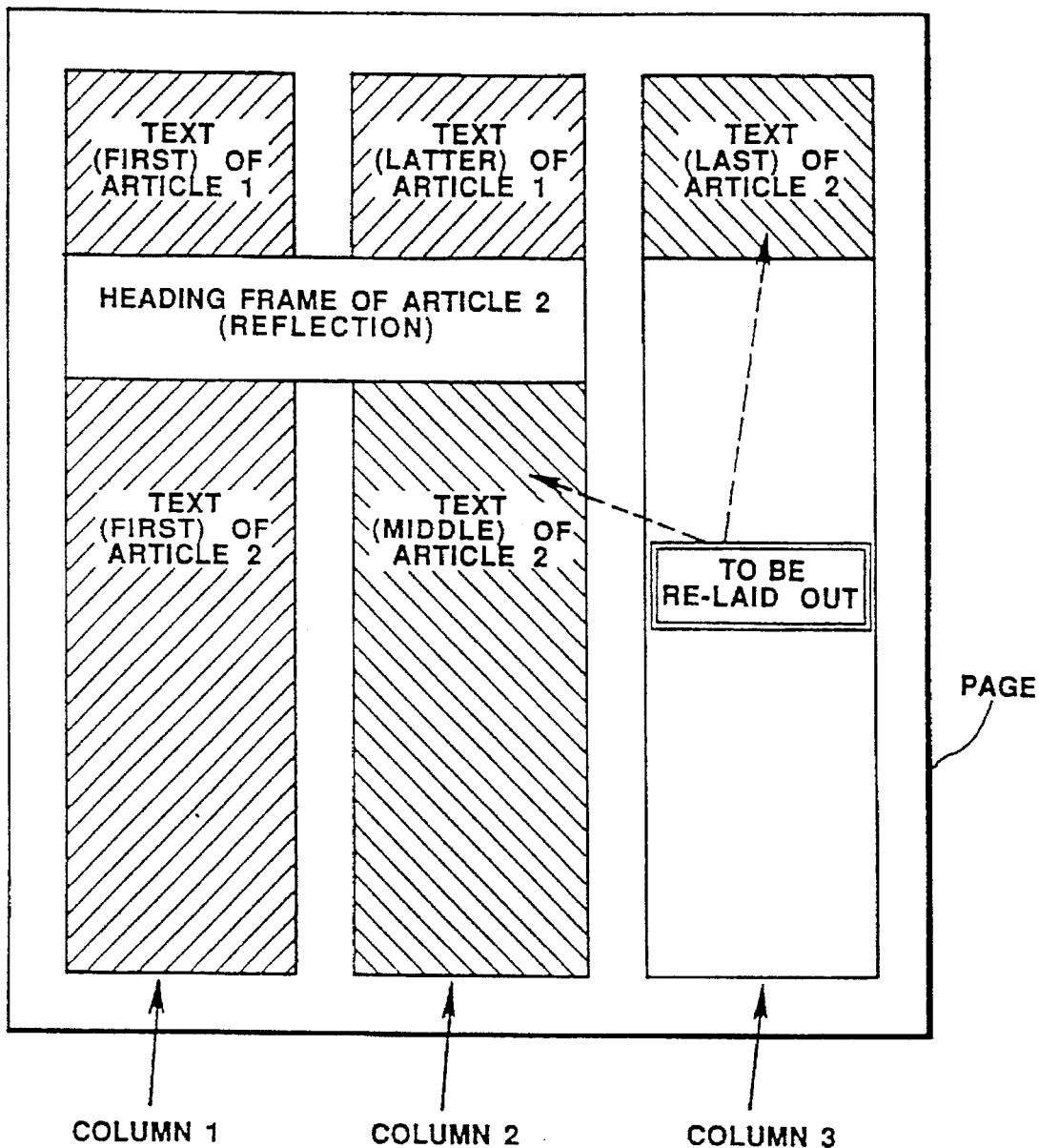

As shown in FIG. 32, the text of the article 2 is then laid out to the columns 1, 2 and 3.

Subsequently, the heading of the article 3 becomes a current logical object, i.e., object to be laid out. First, a frame to which the heading of the article 3 is laid out is generated. Since the column to which the last of the contents is laid out at this time is the column 3 as shown in FIG. 32, the horizontal position of the heading frame of the article 3 is determined such that the heading frame starts with the column 2. Since the heading frame of the article 3 is laid out below the heading frame of the article 2 so as to cover columns 2 and 3, the two ones (hatched rightwardly declined in FIG. 33 and laid out to columns 2 and 3) of three text portions of the article 2 laid out to the columns 1, 2 and 3, as shown in FIG. 33, are to be again laid out. Then, blocks to which the two portions are laid out are deleted and the portions ar concatenated.

Figure 34:
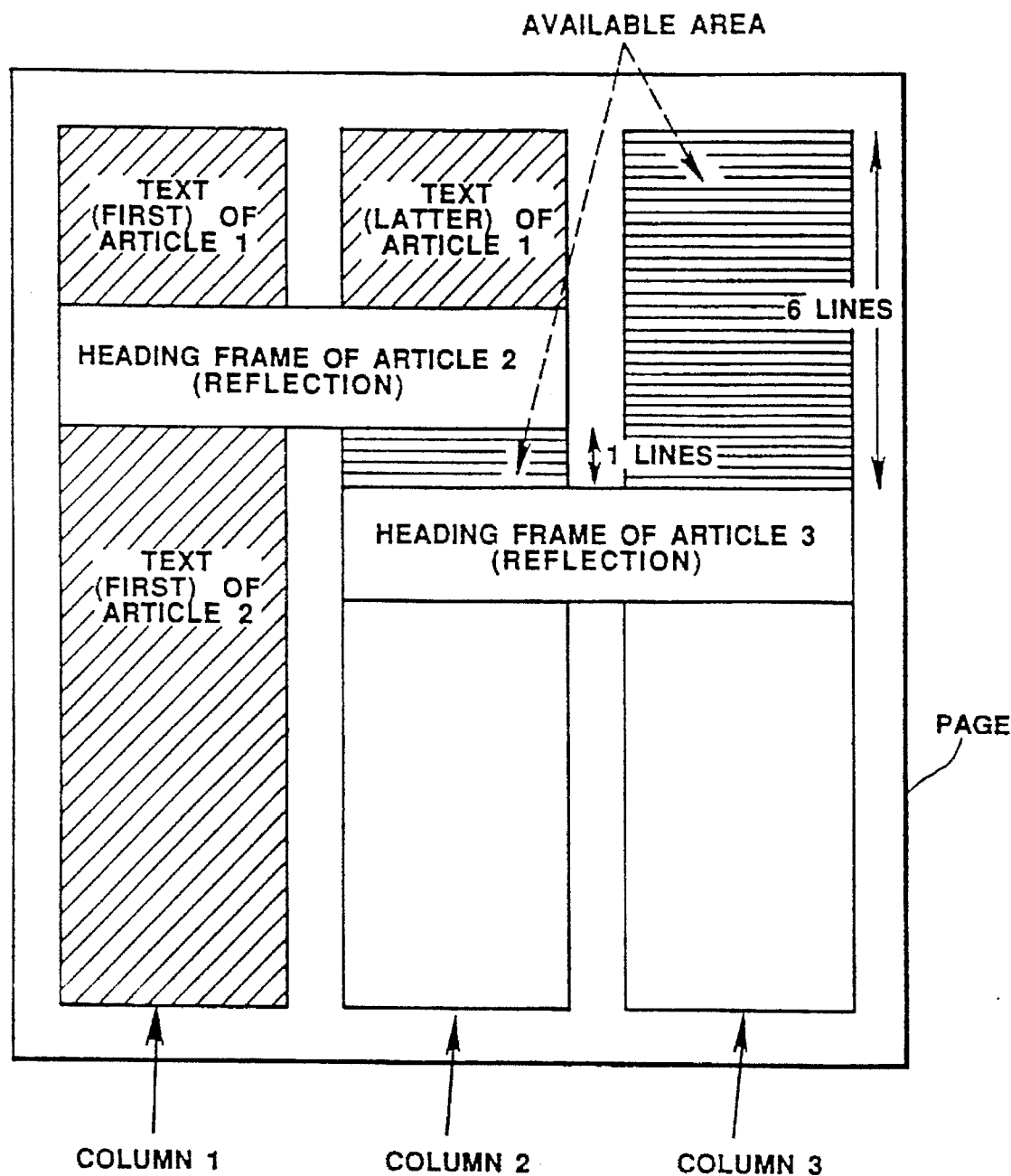
Figure 35:
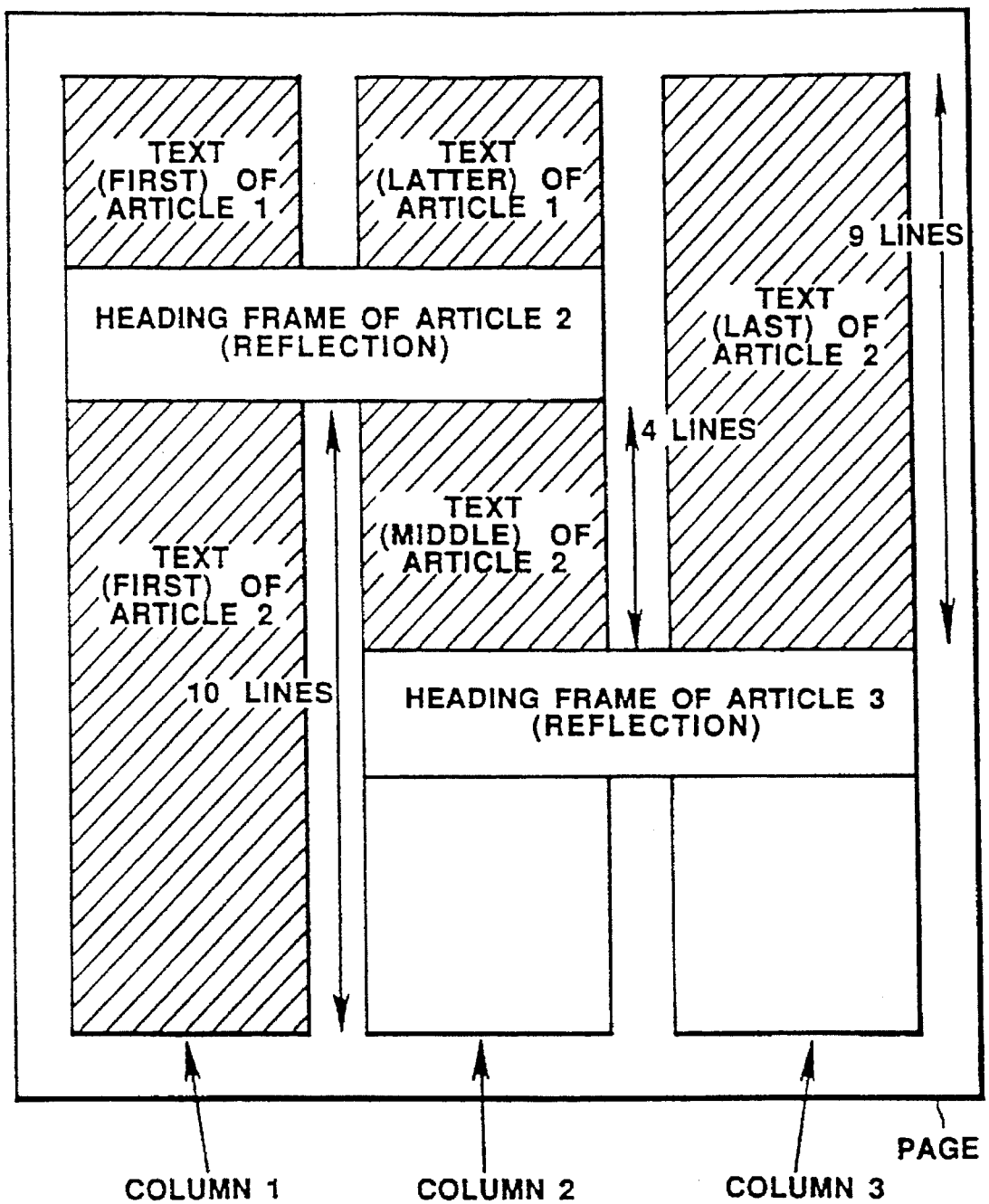

Since the heading frame of the article 2 is put so as to cover the fourth and fifth lines, the heading frame of the article 3 is put so as to start with the seventh line, as shown in FIG. 34. An available area (shown horizontally hatched in FIG. 34) to which a not-laid-out text portion of the article 2 is laid out is ensured in the columns 2 and 3 above the heading frame of the article 3.

However, only the contents of an article for seven lines can be laid out in that available area. The not-laid-out text of the article 2 is for 13 lines, so that the layout of those contents fails. As in the layout of the heading frame of the article 2, the vertical position of the heading frame of the article 3 is shifted down one line by one line until the layout of the not-laid-out contents of the text of the article 2 succeeds. When the heading frame of the article 3 is put so as to start with the tenth line, the contents of the article for 13 lines at this time can be laid out to the available area. Thus, layout of the not-laid-out text of the article 2 succeeds. Thus, the vertical position of the heading of the article 3 is determined.

Figure 36:
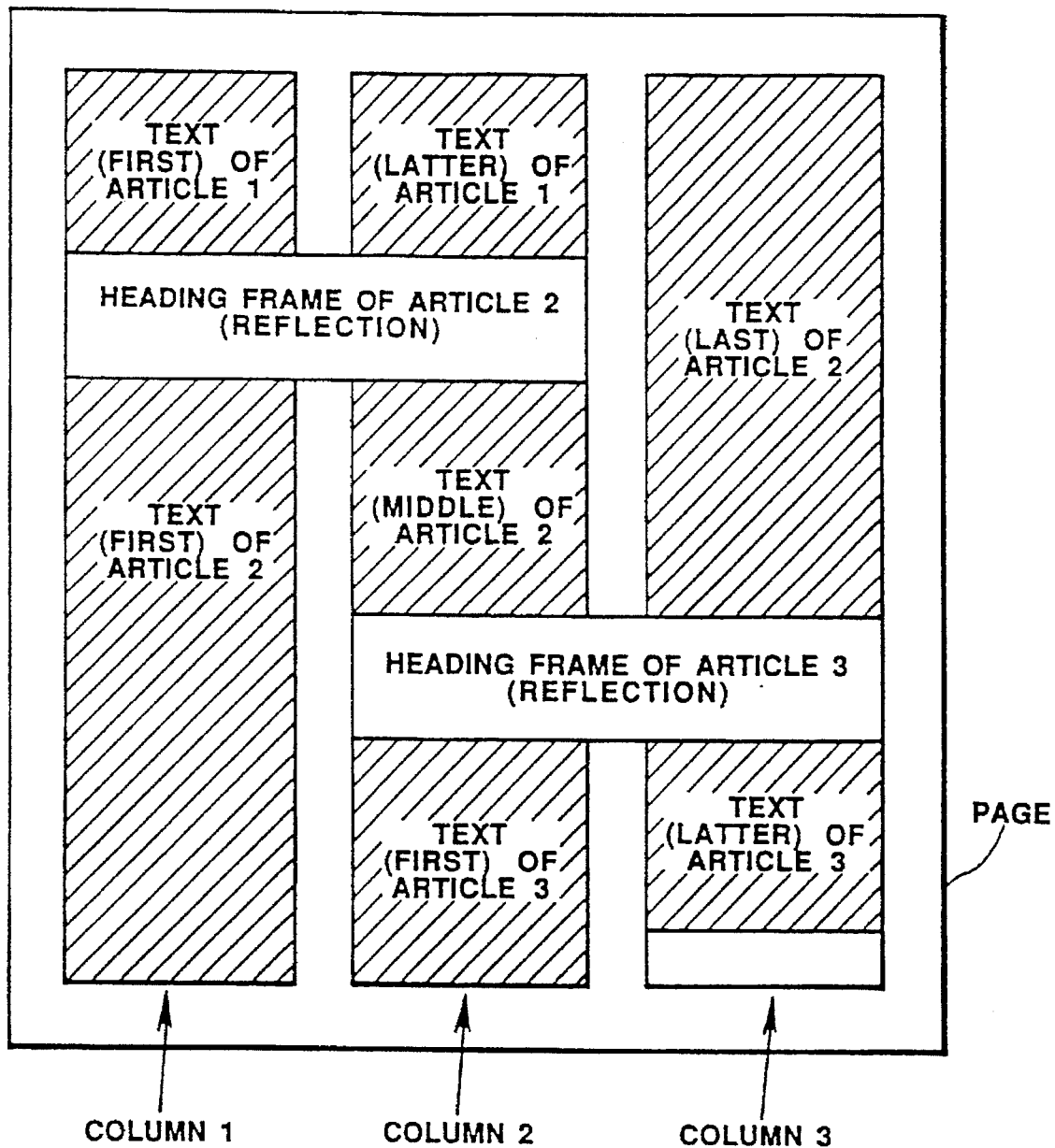

Last, as shown in FIG. 36, the text of the article 3 is laid out to the columns 2 and 3 and hence the layout of the overall article is completed.

As described above, according to the present invention, the disposition of the articles in which multi-column covering frames overlap alternately in columns can be automatically generated, which is impossible with a conventional document layout.

A second example will next be described. Assume in the second example that for the restrictions on the heading the contents of the text of the article 1 are for 17 lines; the contents of the text of the article 2 are for 5 lines; and the contents of the text of the article 3 are for 12 lines, in the logical structure shown in FIG. 25, and that the heading of the article 2 is directed that it is laid out to a reflective frame covering two columns; and the heading of the article 3 is a reflective frame covering three columns, each of the frames having the same height for two lines. The structure of a page is the same as that in the first example (see FIG. 26).

Figure 37:
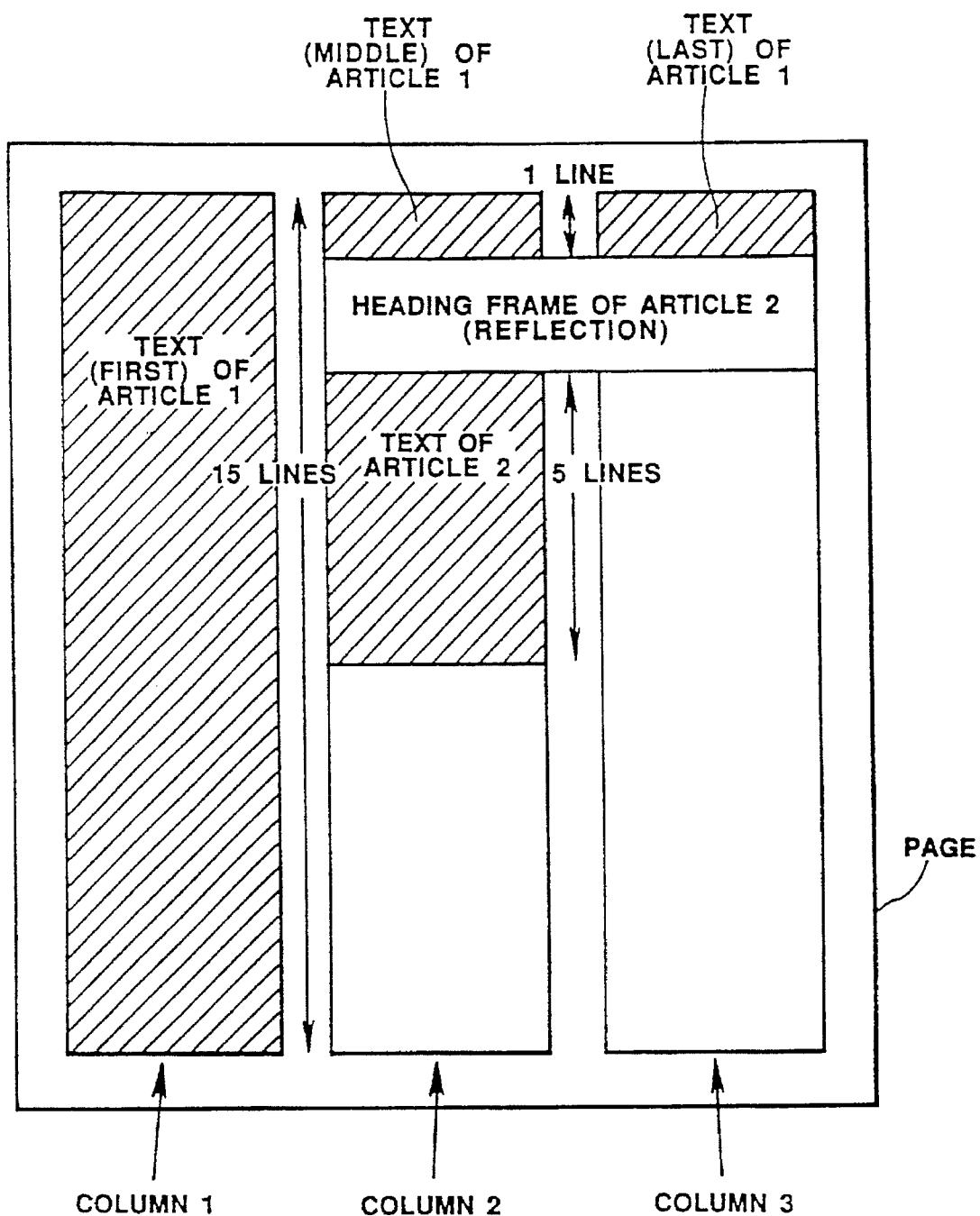

FIG. 37 shows the layout of articles in which the text of the article 1 is first laid out and the text of the article 2 is then laid out.

Figure 38:
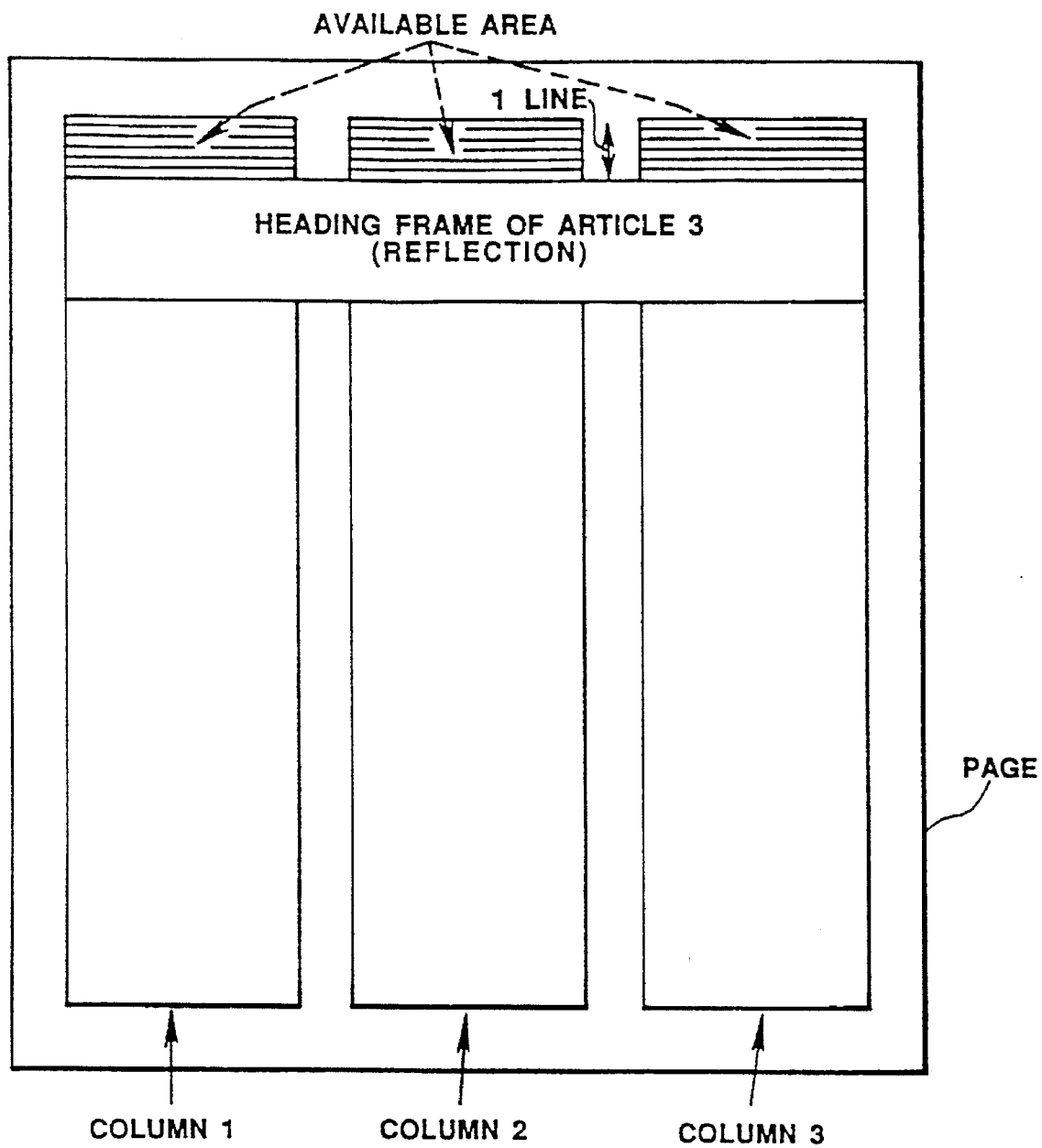

The heading of the article 3 is then laid out. To this end, a frame to which the heading of the article 3 is laid out is first generated. A column to which the end of the contents is laid out at this time is the column 2, so that the horizontal position of the heading frame of the article 3 is determined such that "the heading frame starts" with the column 1. Since the heading frame of the article 3 is laid out so as to start with the first line and to cover the columns 1 and 2, anything which has been laid out so far is to be again laid out. Thus, as shown in FIG. 38, the heading frame of the article 3 is put so as to start with the second line, so that an available area (shown horizontally hatched in FIG. 38) is ensured in the columns 1, 2 and 3 above the heading frame of the article 3.

Since the object to be again laid out cannot be laid out completely in the available area, however, the vertical position of the heading frame of the article 3 is shifted down one line by one line to thereby lay out the object.

Figure 39:
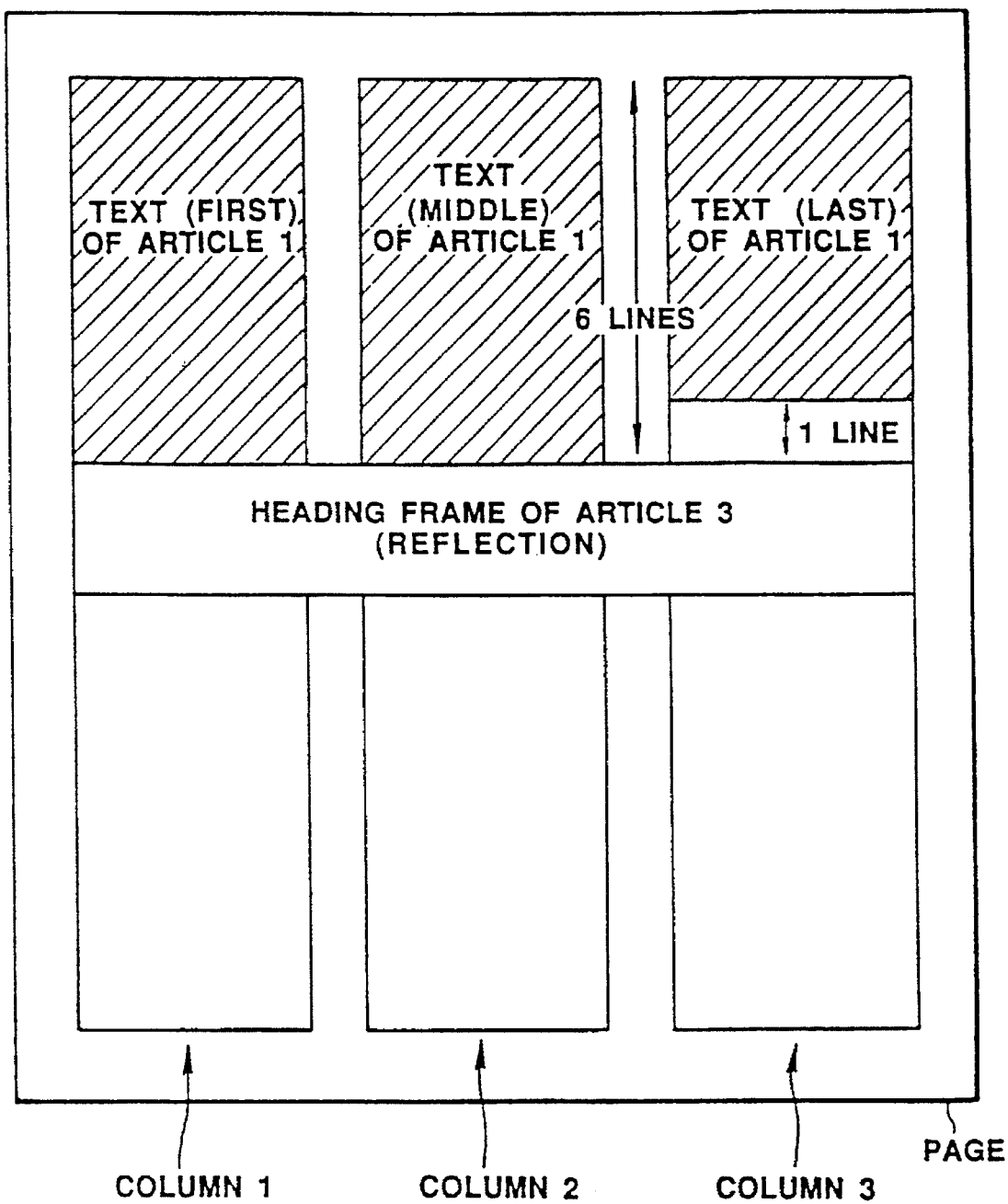

FIG. 39 shows the state of layout in which the heading frame of the article 3 is put so as to start with the seventh line and the text of the article 1 is again laid out. Since re-layout of the article 1 is effected successfully at this time, the heading of the article 2 is to be again laid out.

Figure 40:
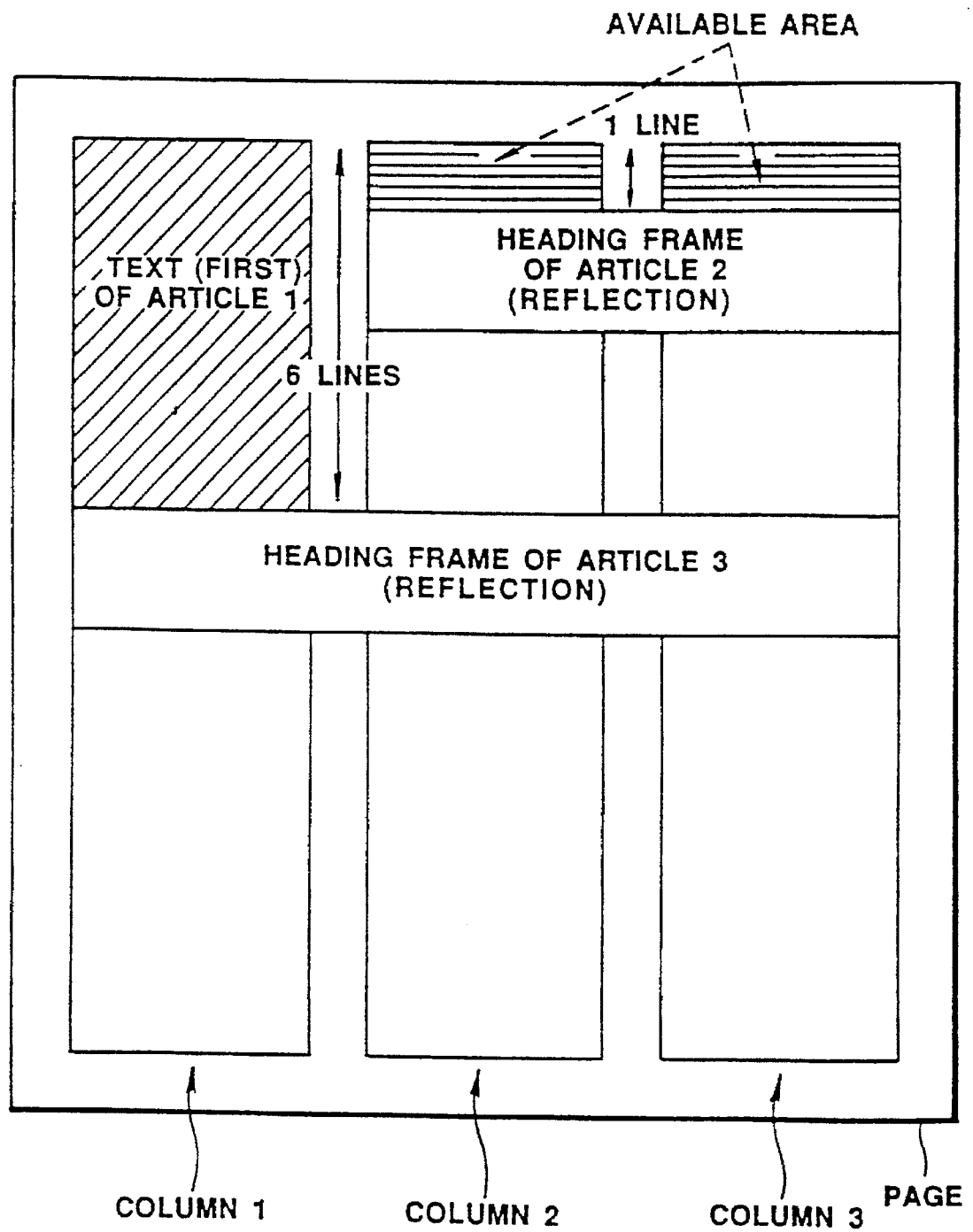

A column to which the last contents of the article are laid out is the column 3, so that the horizontal position of the heading frame of the article 2 is determined such that "the heading frame starts" with the column 2. Following the re-layout of the heading frame of the article 2, the latter half of the contents of the article 1 laid out to the column 2 is to be again laid out. To this end, the heading frame of the article 2 is put so as to start with the second line, as shown in FIG. 40, an available area (shown horizontally hatched in FIG. 40) in which the contents of the article 1 are laid out to the columns 2 and 3 above the heading frame of the article 2 is ensured.

Figure 41:
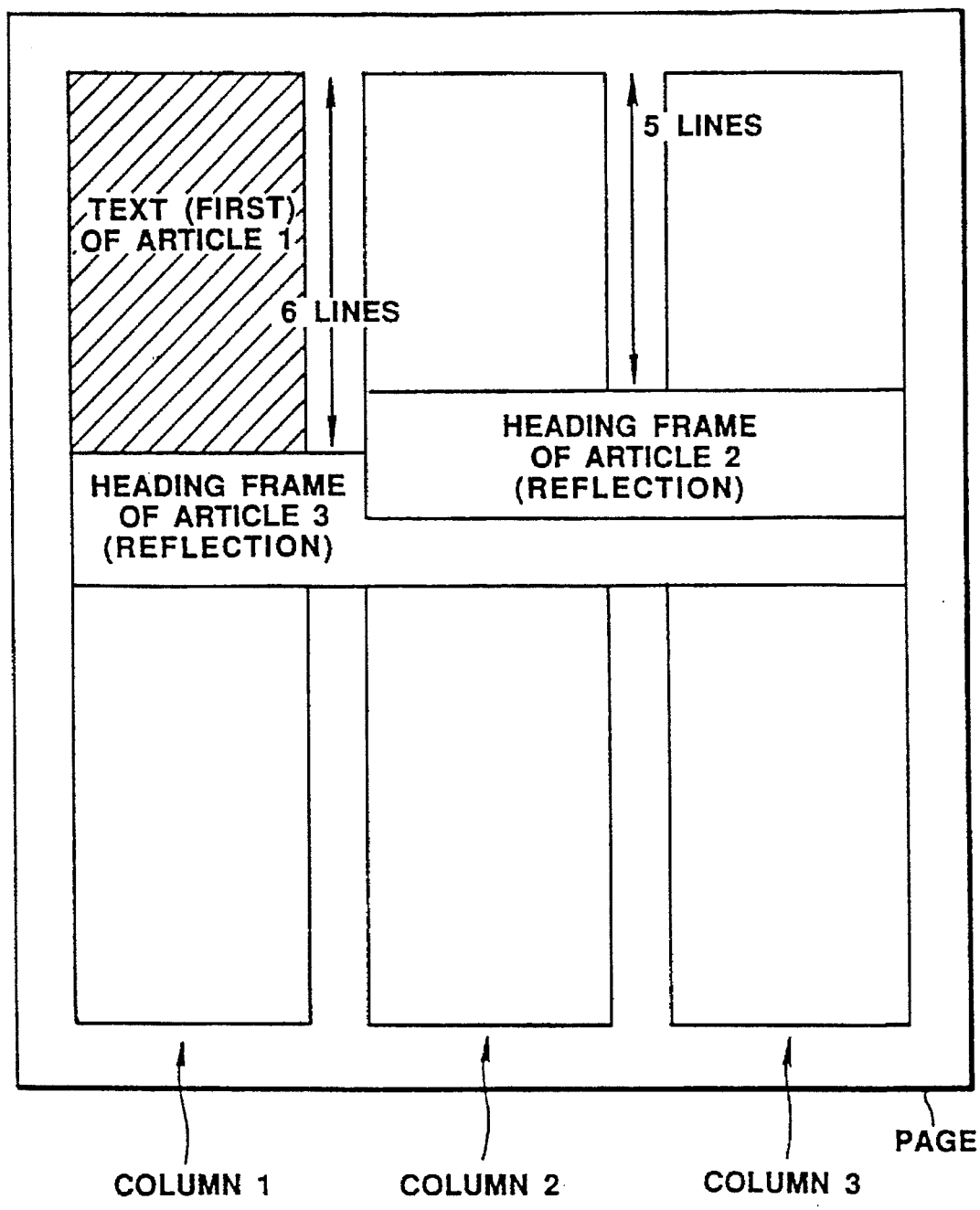

In this case, since all the not-laid-out text of the article 1 cannot be laid out, the vertical position of the heading frame of the article 2 is shifted down one line by one line. As shown in FIG. 41, when the heading frame of the article 2 is shifted down so as to start with the six line, the heading frames of the articles 2 and 3 would overlap, so that re-layout of the heading frame of the article 2 would fail.

Figure 42:
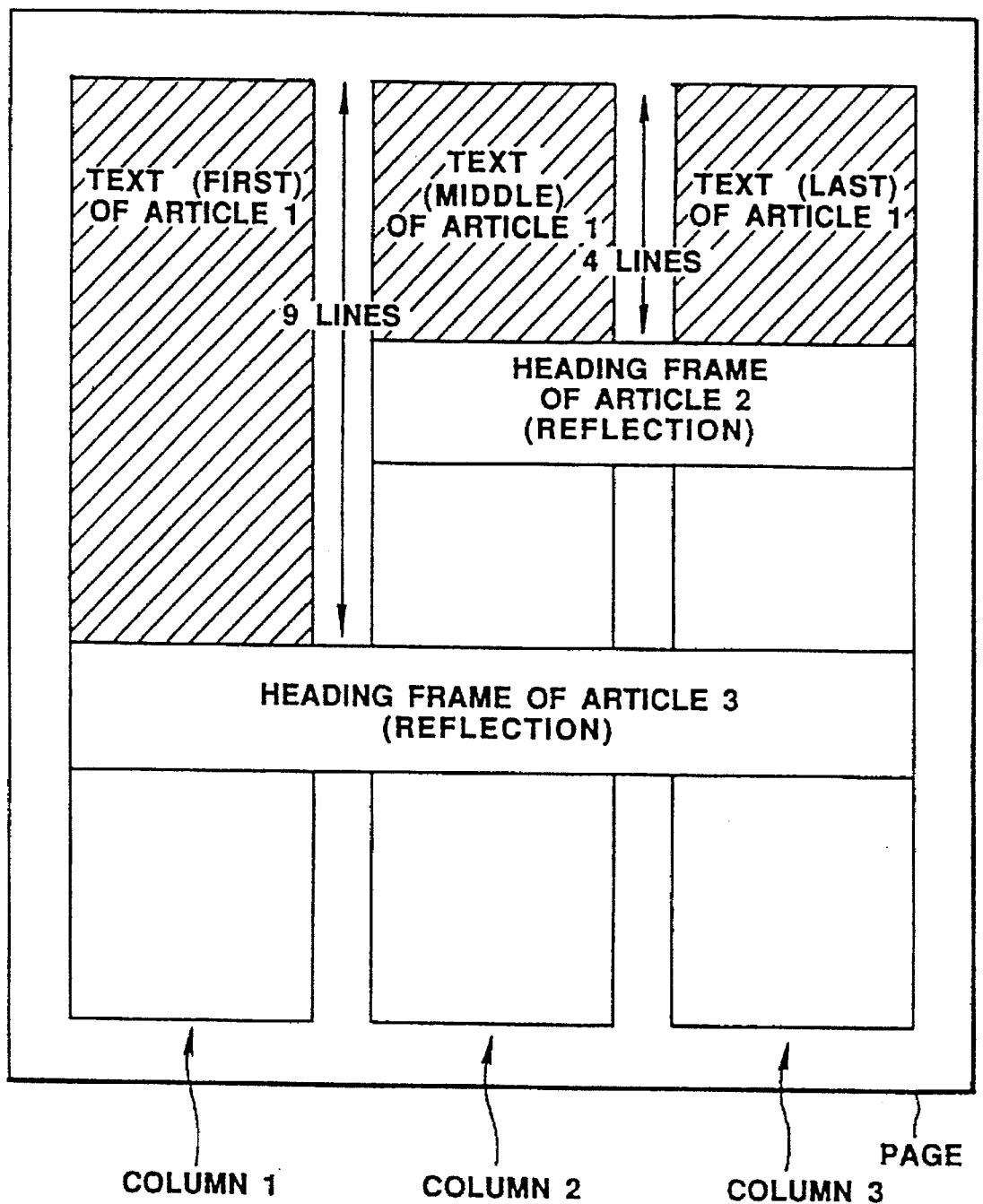

Thus, disposition of the heading frame of the article 3, starting with the sixth line, is a failure, so that the vertical position of the heading frame of the article 3 is shifted down by one line and the object to be again laid out is laid out. FIG. 42 shows the state of layout in which such processing is repeated such that the heading frame of the article 3 is put so as to start with the tenth line to thereby lay out the heading of the article 2 again.

Figure 43:
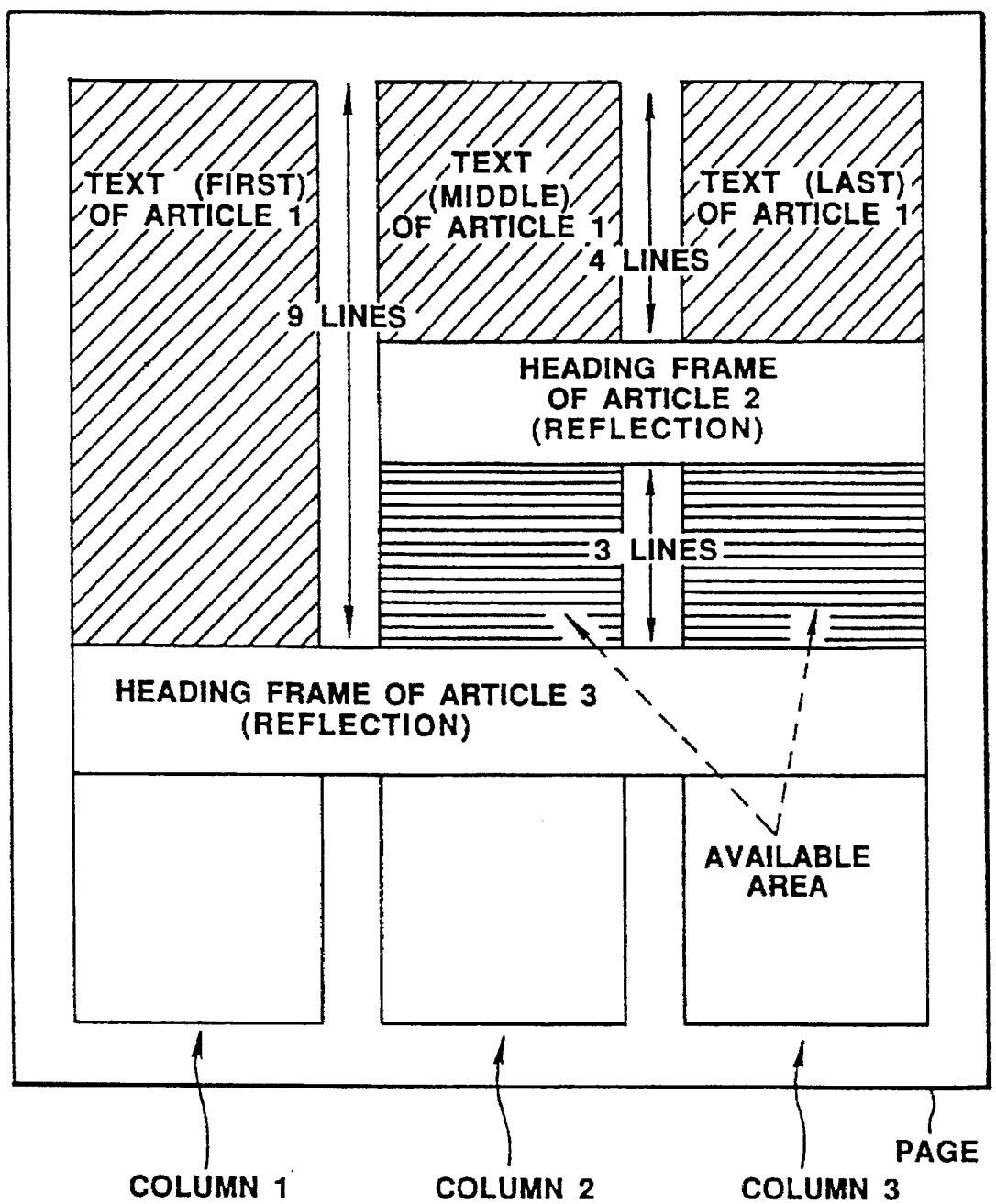

In this case, when the heading frame of the article 2 is put so as to start with the fifth line, the layout of the not-laid-out contents of the article 1 is effected successfully and the re-layout of the heading frame of the article 2 is effected successfully. Subsequently, the re-layout of the contents of the text of the article 2 is effected. Here, a horizontally hatched portion shown in FIG. 43 is ensured as an available area, which is for six lines, so that re-layout of the text of the article 2 is effected successfully. At this time, re-layout involving the vertical disposition of the heading frame of the article 3 has succeeded, so that the vertical position of the heading frame of the article 3 is fixed and the layout of the heading of the article is terminated. Last, the text of the article 3 is laid out to the columns 1, 2 and 3 to thereby complete the layout of the overall article. FIG. 44 shows the layout of the article appearing when the layout of the overall article is completed.

The third example will be described next. Assume in the third example that in the logical structure of FIG. 25 the contents of the text of the article 1 are for 16 lines; the contents of the text of the article 2 are for 12 lines; and the contents of the text of the article 3 are for 16 lines. As layout directives for headings of the articles, it is assumed that the heading of the article 2 is to be laid out to a reflective frame covering two columns and having a height for one line; and the heading of the article 3 is a reflective frame covering four columns and having a height for two lines. For the page structure, a page includes four columns 1, 2, 3 and 4, each having a height for 15 lines.

Figure 45:
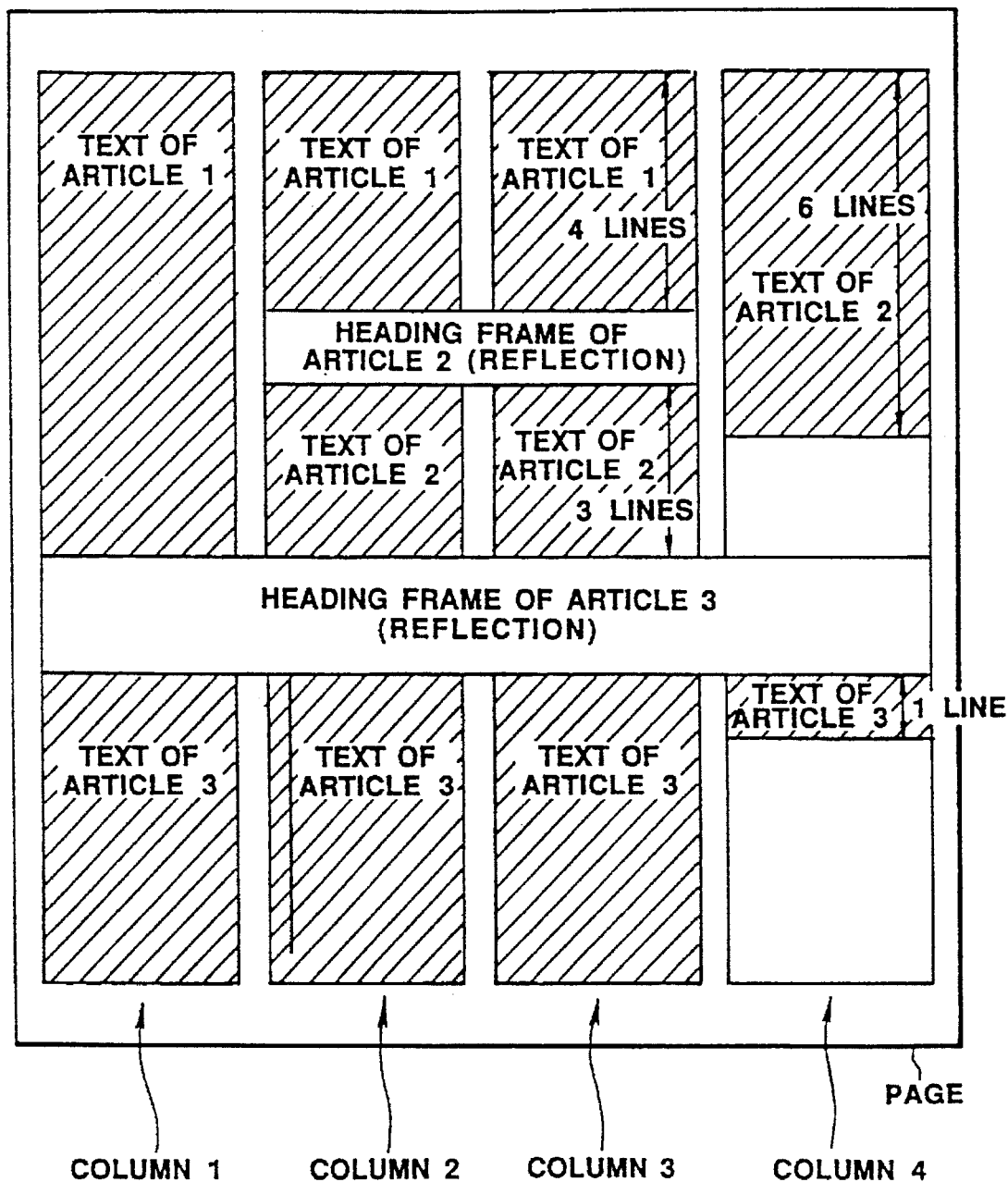
Figure 46:
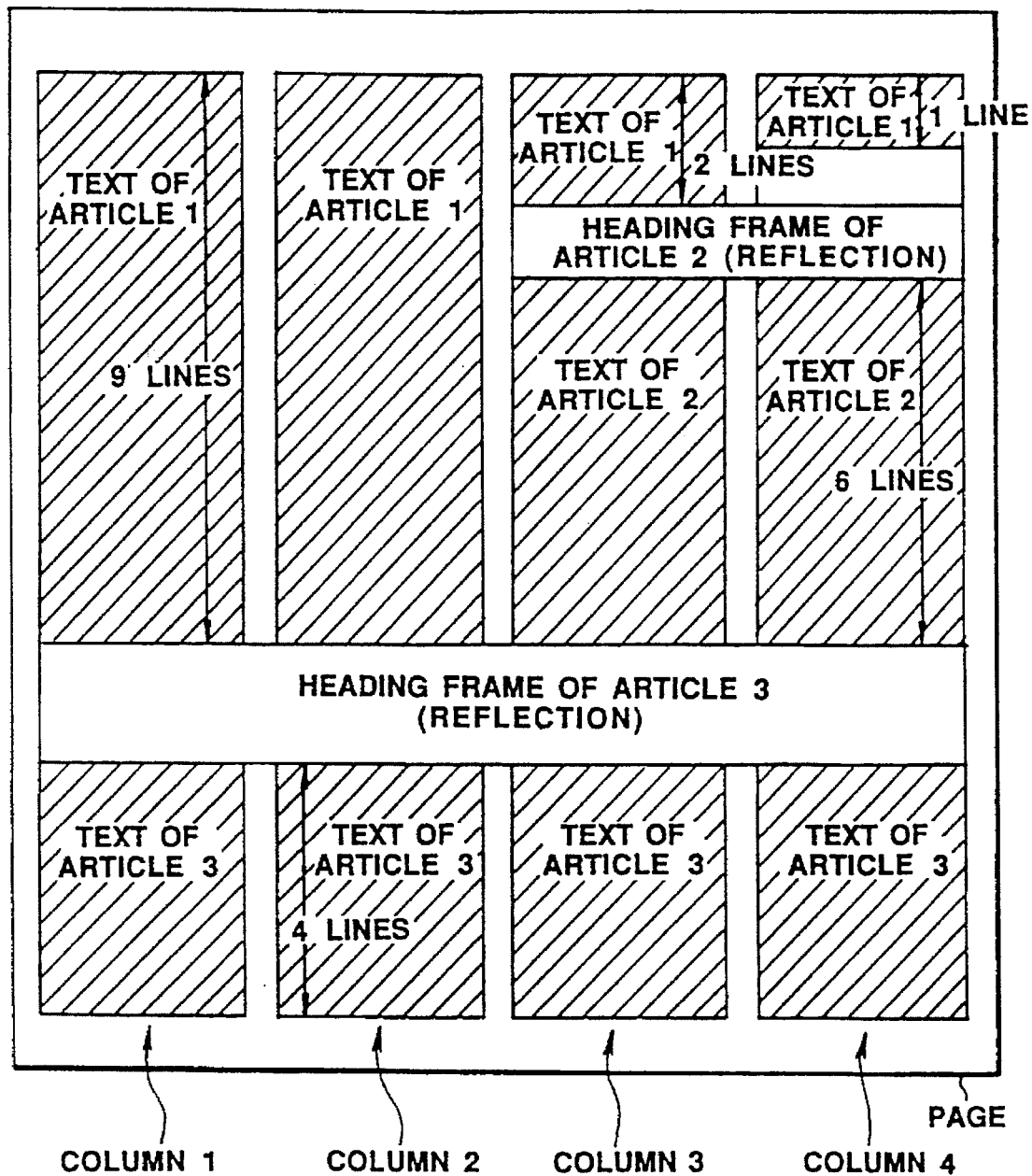
Figure 46:
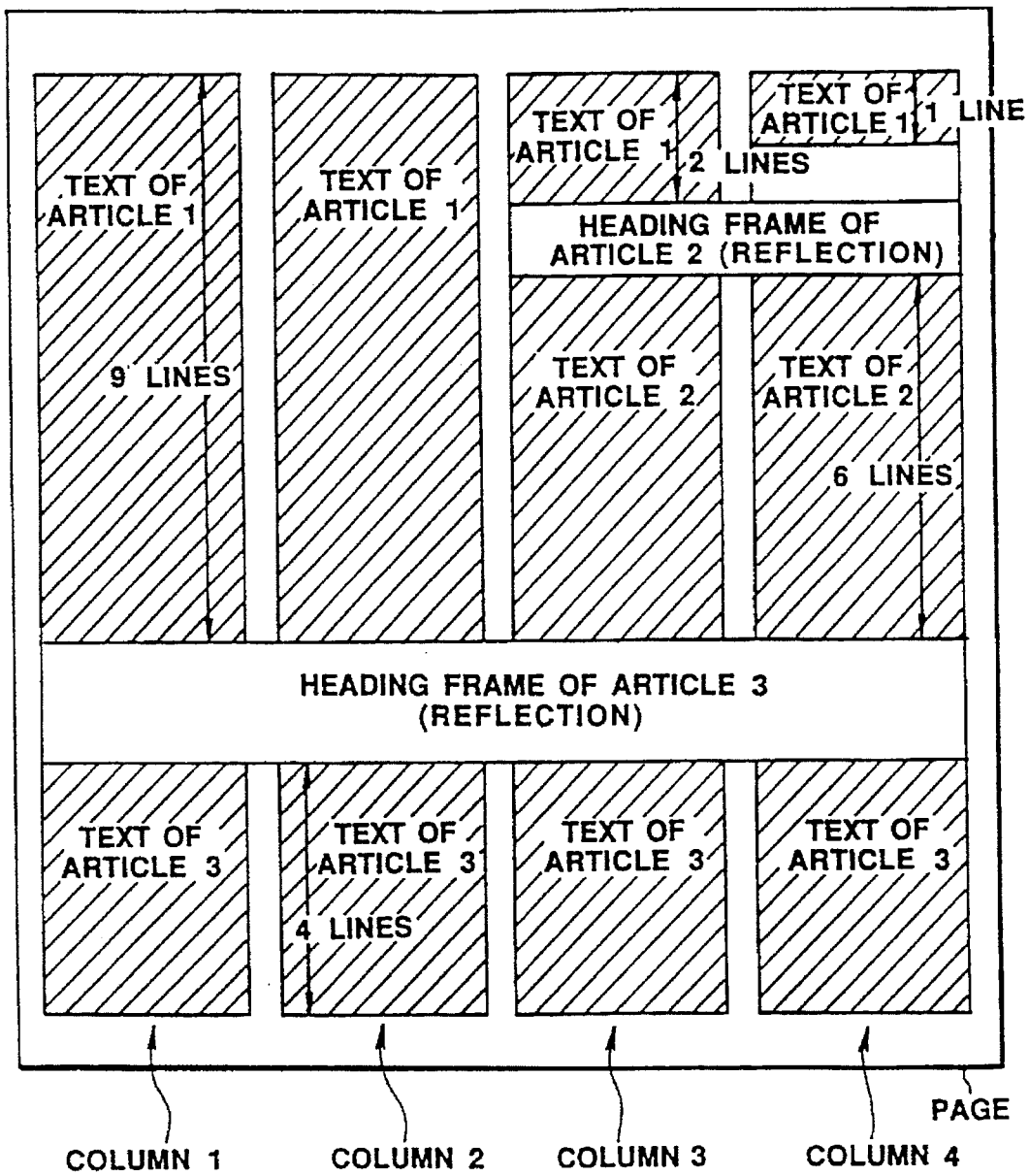

Layout into a logical structure in the premise, mentioned above, in accordance with the respective algorithms, as mentioned above, brings about the result of layout shown in FIG. 45. Re-layout by increasing the contents of the text of the article 1 by 21 lines results in the layout shown in FIG. 46.

As will be seen in the second and third examples, according to the present invention, a document can be laid out automatically in accordance with the quantity of contents of the document even if there coexists a frame covering all the columns and a frame covering some of the columns in a page.

A fourth example will be described. Assume in the fourth example that in the logical structure of FIG. 47 the contents of a first paragraph of an article 1 are laid out to 15 lines; the contents of a second paragraph of the article 1 to 10 lines; and a diagram of the article 1 is laid out to a jumped frame which covers two columns with a height for four lines. The structure of the page is the same as that in the first example (see FIG. 26). Assume that the end of the contents of the first paragraph of the article 1 is "(see the diagram)".

Figure 47:
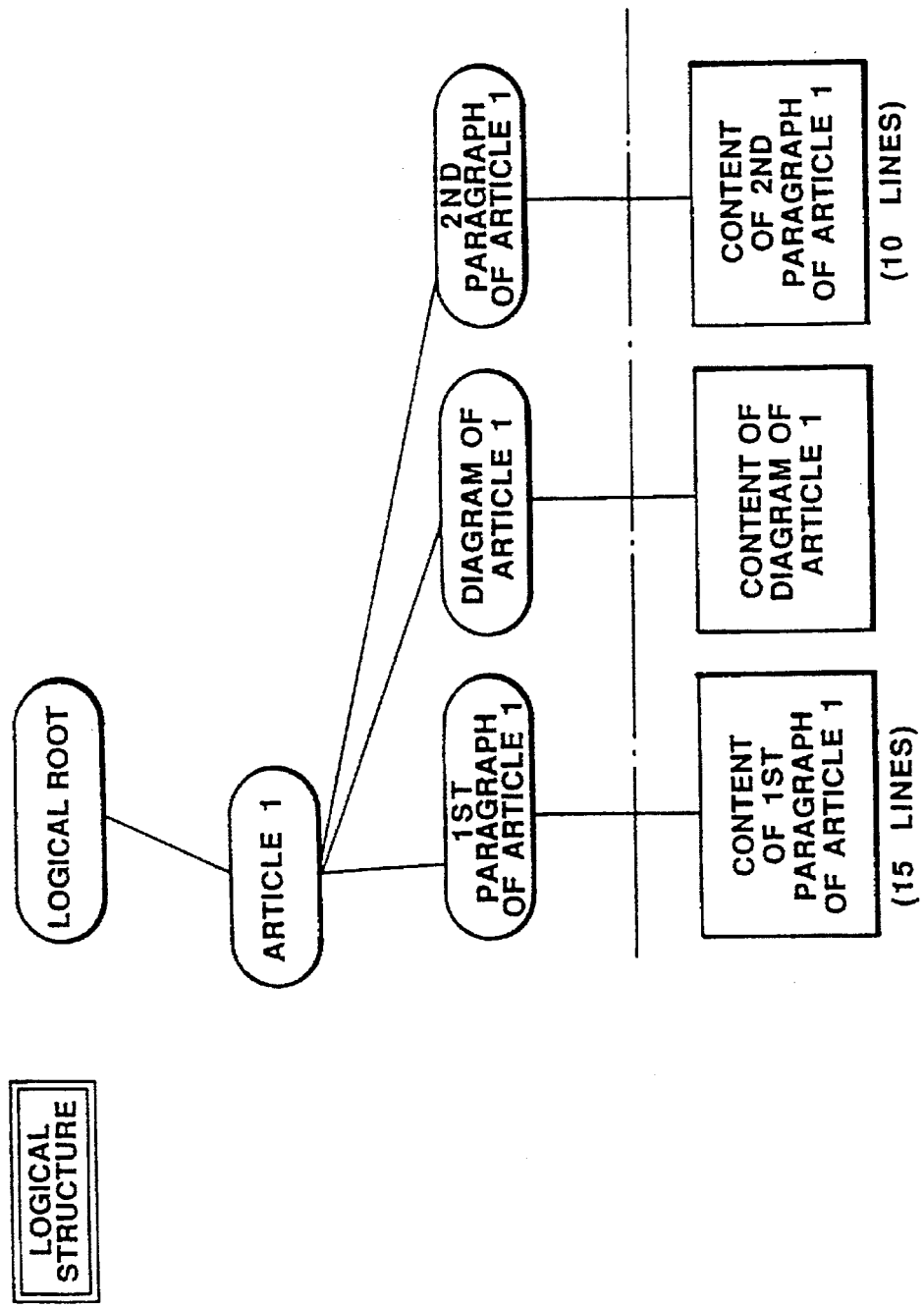
Figure 48:
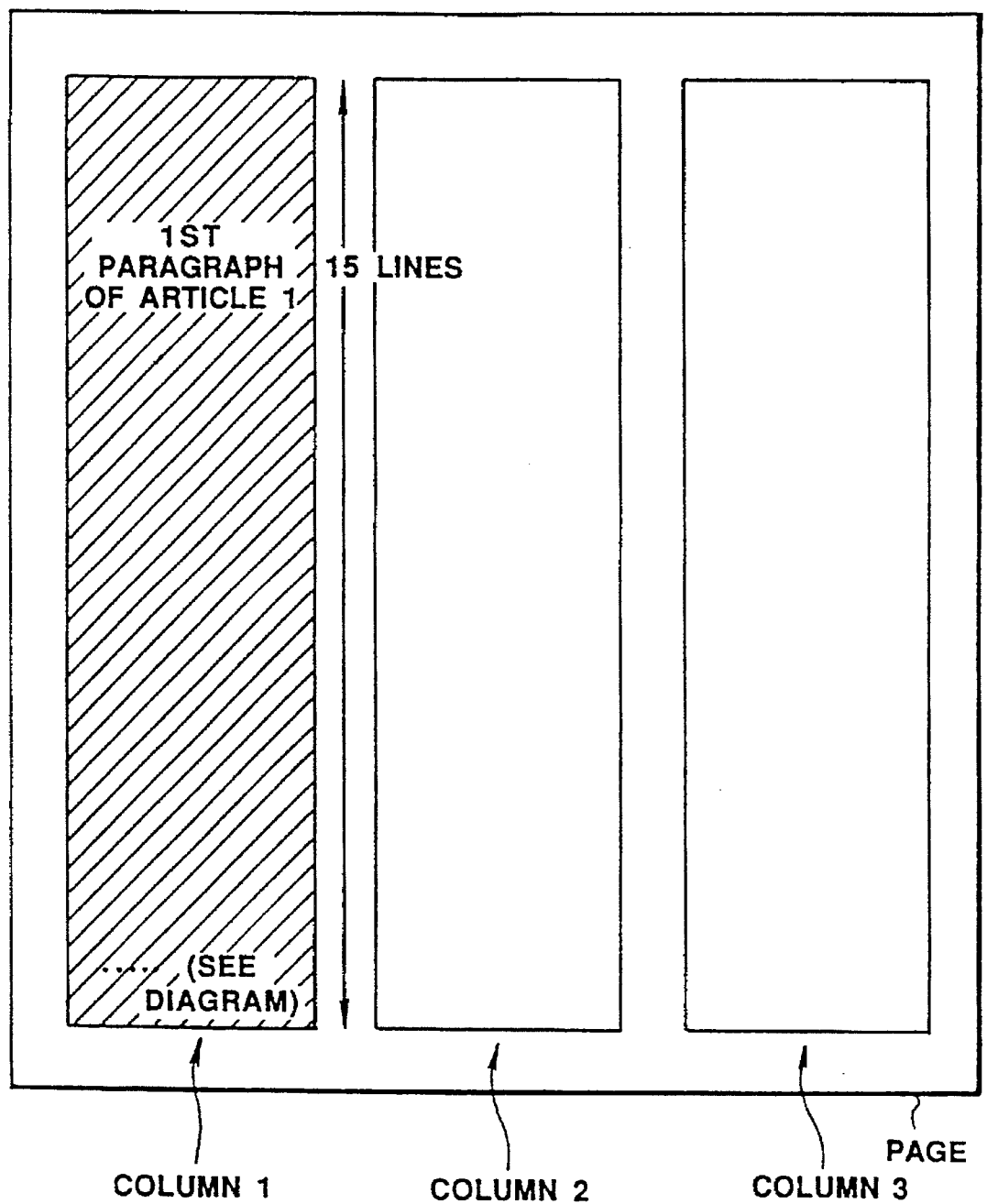
Figure 49:
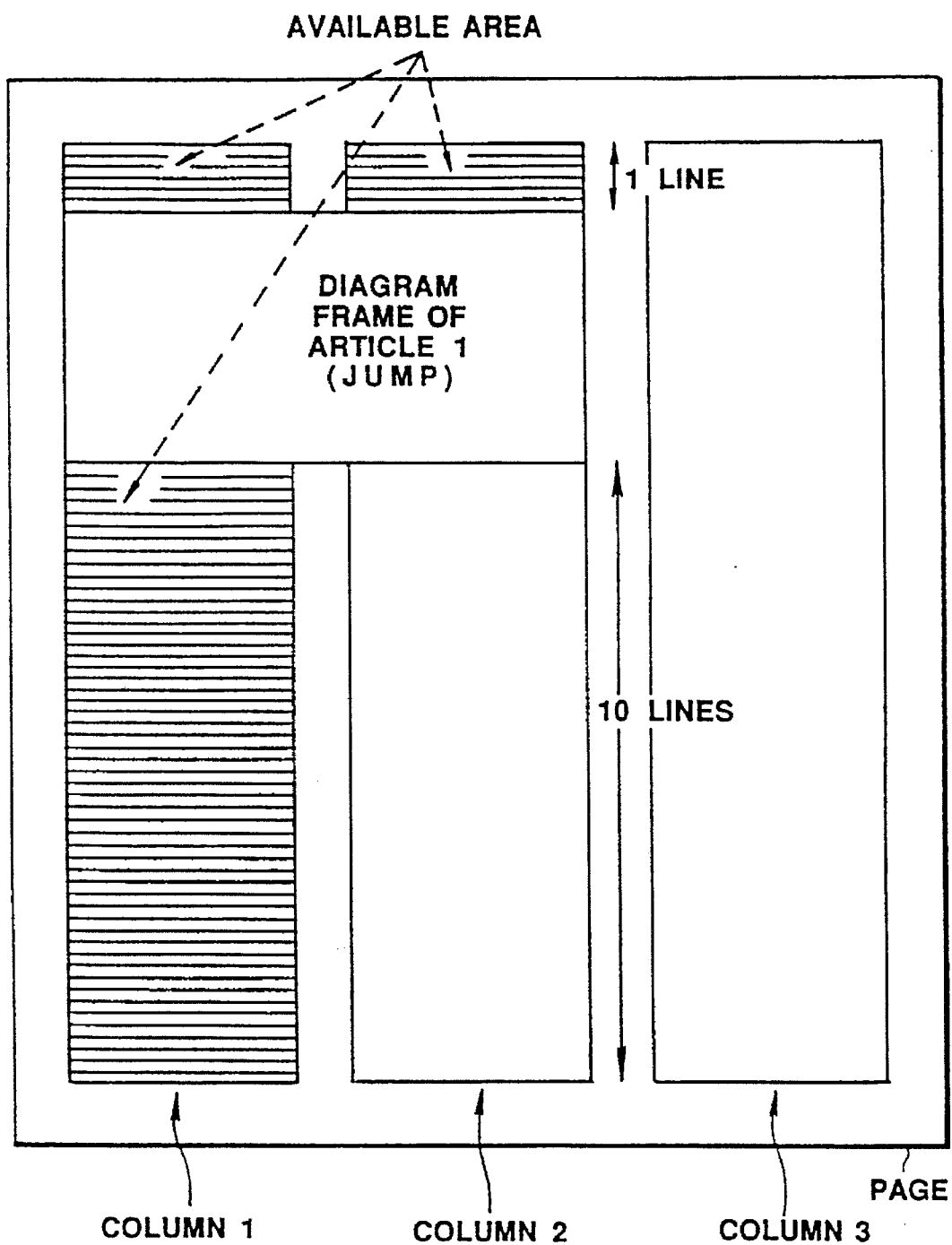

By layout to the logical structure of FIG. 47, the first paragraph of the article 1 is laid out to a column 1, as shown in FIG. 48. The diagram of the article 1 is then to be laid out, which generates a frame to which the diagram of the article 1 is laid out. At this time, a column to which the end of the contents is laid out is the column 1, so that the horizontal position of the diagram frame of the article 1 is determined such that "the diagram frame starts" with the column 1. There is no room below the first paragraph of the article 1 in which the diagram frame of the article 1 is put, so that the first paragraph of the article 1 is to be again laid out. As shown in FIG. 49, the diagram frame of the article 1 is put so as to start with the second line to ensure available areas (shown horizontally hatched in FIG. 49), to which the first paragraph of the article 1 is laid out, in the area of the column 1 other than the area of the column 1 occupied by the diagram frame of the column 1 and above the diagram frame of the column 2.

Figure 50:
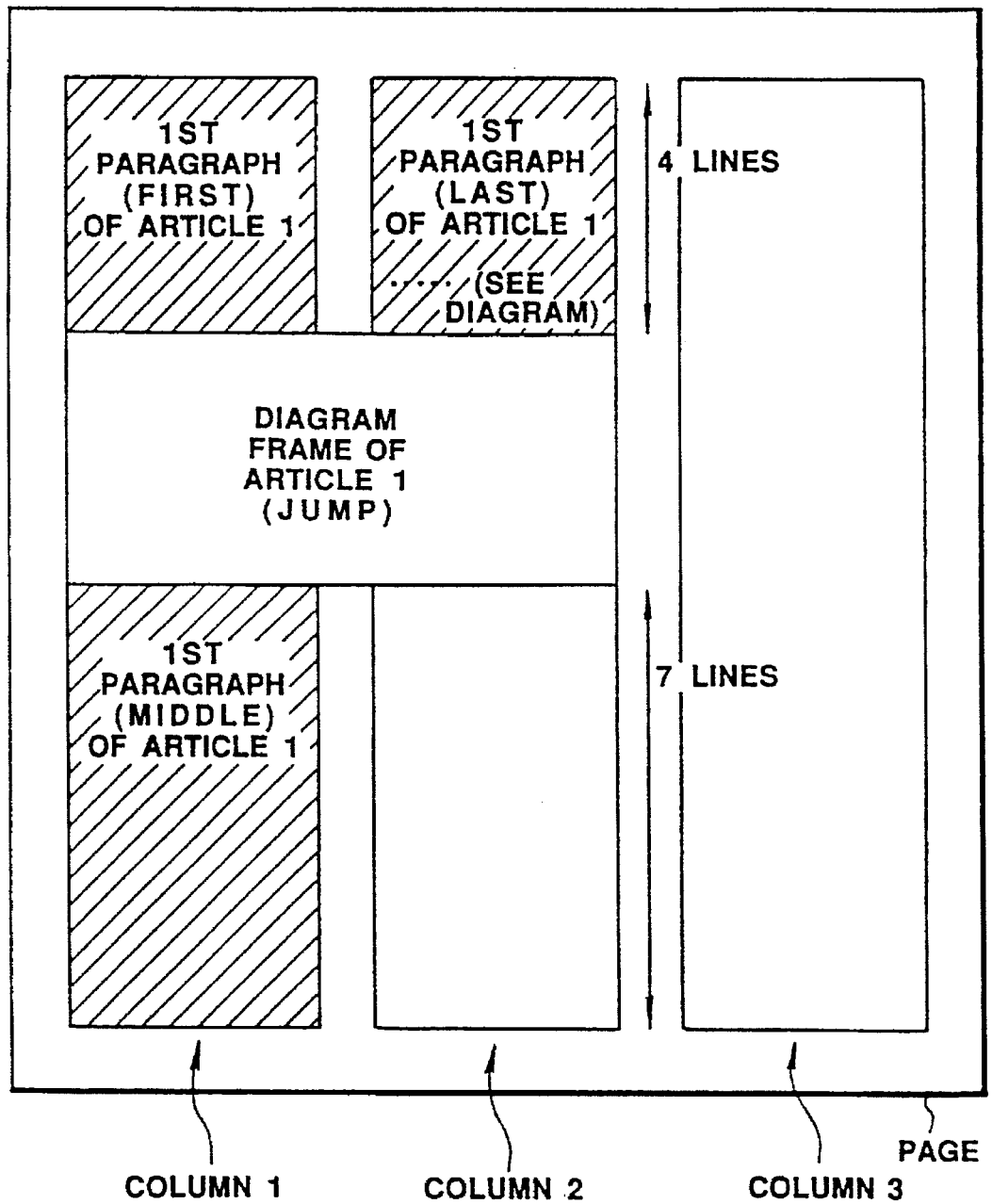

Since only the contents of the article for 12 lines can be laid out to the available areas, however, the layout of the contents (for 15 lines) of the first paragraph of the article 1 would fail. Thus, the position of the diagram frame of the article 1 is shifted down one line by one line to thereby effect the re-layout of the first paragraph of the article 1. As shown in FIG. 50, when the position of the diagram frame of the article 1 starts with the fifth line, the contents of the article for 15 lines can be laid out to the available areas, so that the layout of the text of the article 1 is effected successfully.

Figure 51:
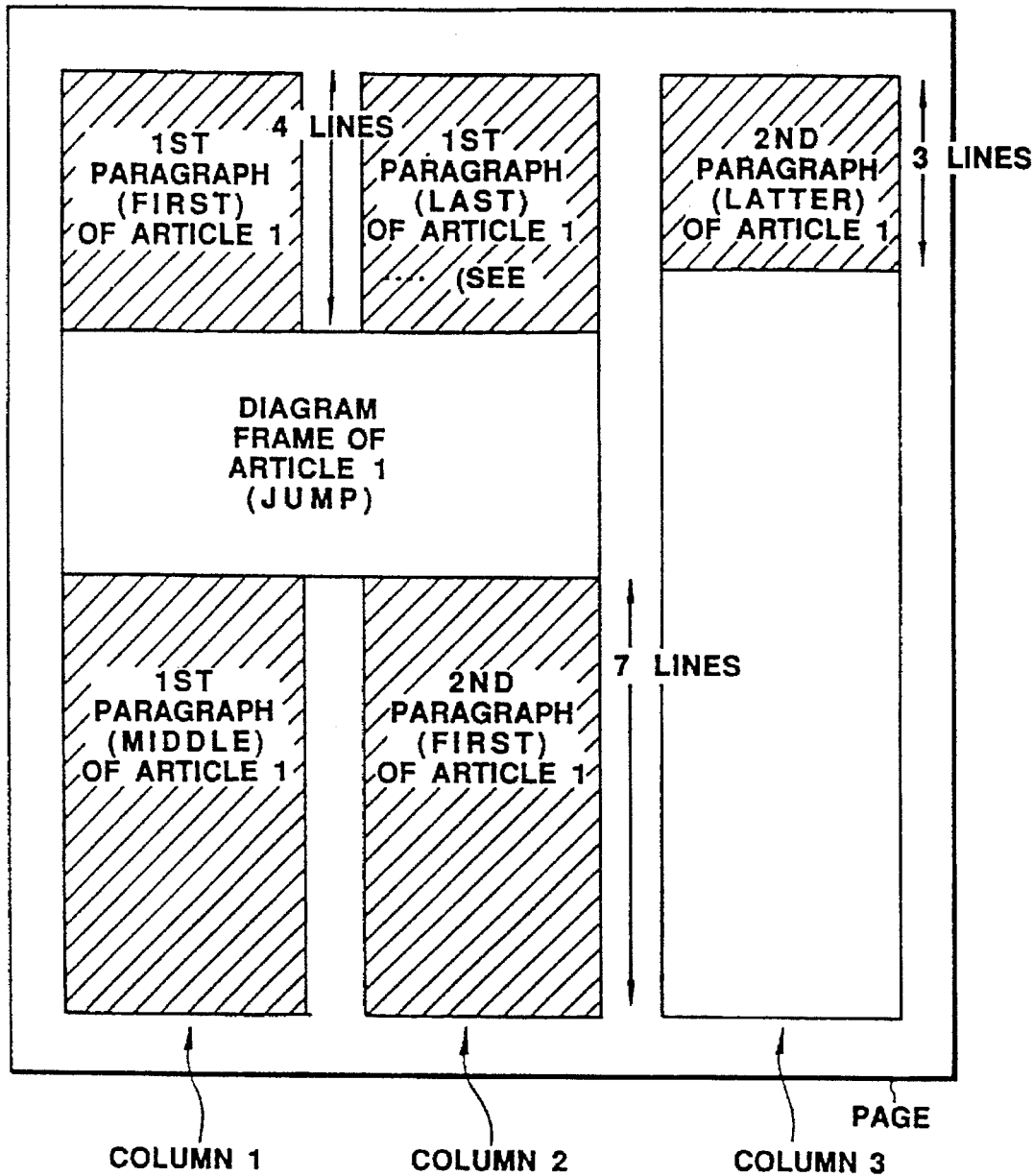

Thus, the vertical position of the diagram frame of the article 1 is determined. Last, the second paragraph of the article 1 is laid out to complete the layout of the overall article. FIG. 51 shows the state of layout in which the layout of the overall article is completed.

As described above in the fourth example, automatic disposition of a jumped frame is possible according to the present invention. As illustrated by the fact that the contents of "(see the diagram)" in the fourth example are always put immediately above the frame, any one of the contents laid out immediately above the jumped frame is the last portion of the contents of the article logically immediately before the contents of the article to which the frame is applied.

Figure 52:
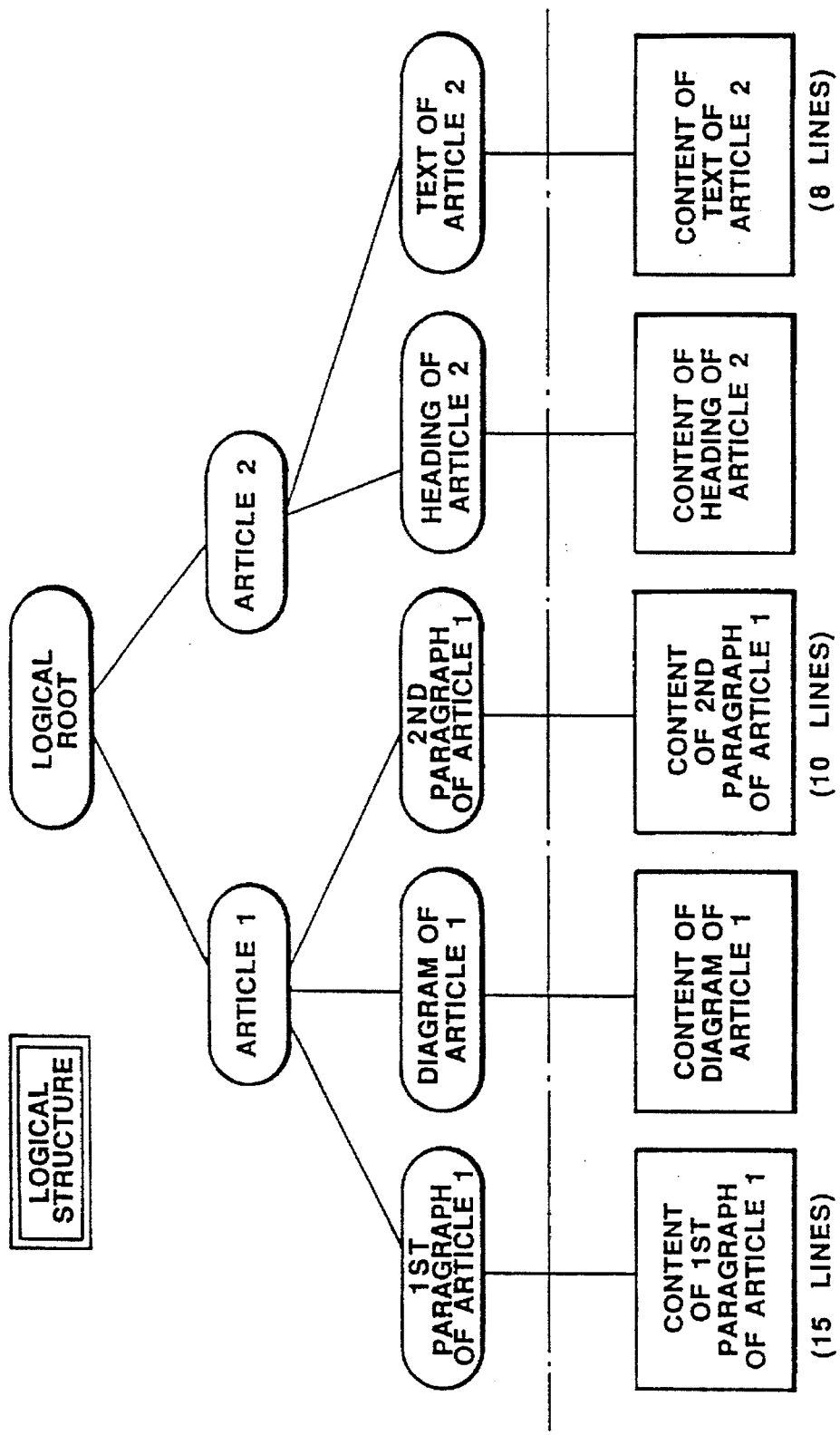

A fifth example will be described next with respect to the layout effected when the logical structure of FIG. 47 is changed to the logical structure of FIG. 52. The logical structure of FIG. 52 includes a combination of the logical structure of FIG. 47 and a new structure (an article 2 including a heading and a text) added to the end of the logical structure of FIG. 47. Assume here that the contents of the text of the article 2 are 8 lines and the heading of the article 2 is laid out to a reflective frame which covers 3 columns of one line.

The state of layout directly before the heading of the article 2 is laid out is the same as in FIG. 51. When the heading of the article 2 is to be laid out, first, a frame to which the heading of the article 2 is laid out is generated. At this time, a column to which the end of the contents of the article is laid out is a column 3, as shown in FIG. 51, so that the horizontal position of the heading frame of the article 2 is determined such that "the heading frame starts" with the column 1. In this case, the vertical initial position of the heading of the article 2 is set so as to start with the ninth line immediately below the diagram frame of the article 1. Since what is laid out so far is to be again laid out at this time, the heading frame of the article 2 is put so as to start with the tenth line and the re-layout is effected. However, in this case, the entire article 1 cannot be laid out above the heading frame of the article 2. Therefore, the position of the heading frame of the article 2 is shifted down one line by one line and layout of what is to be again laid out is effected.

Figure 53:
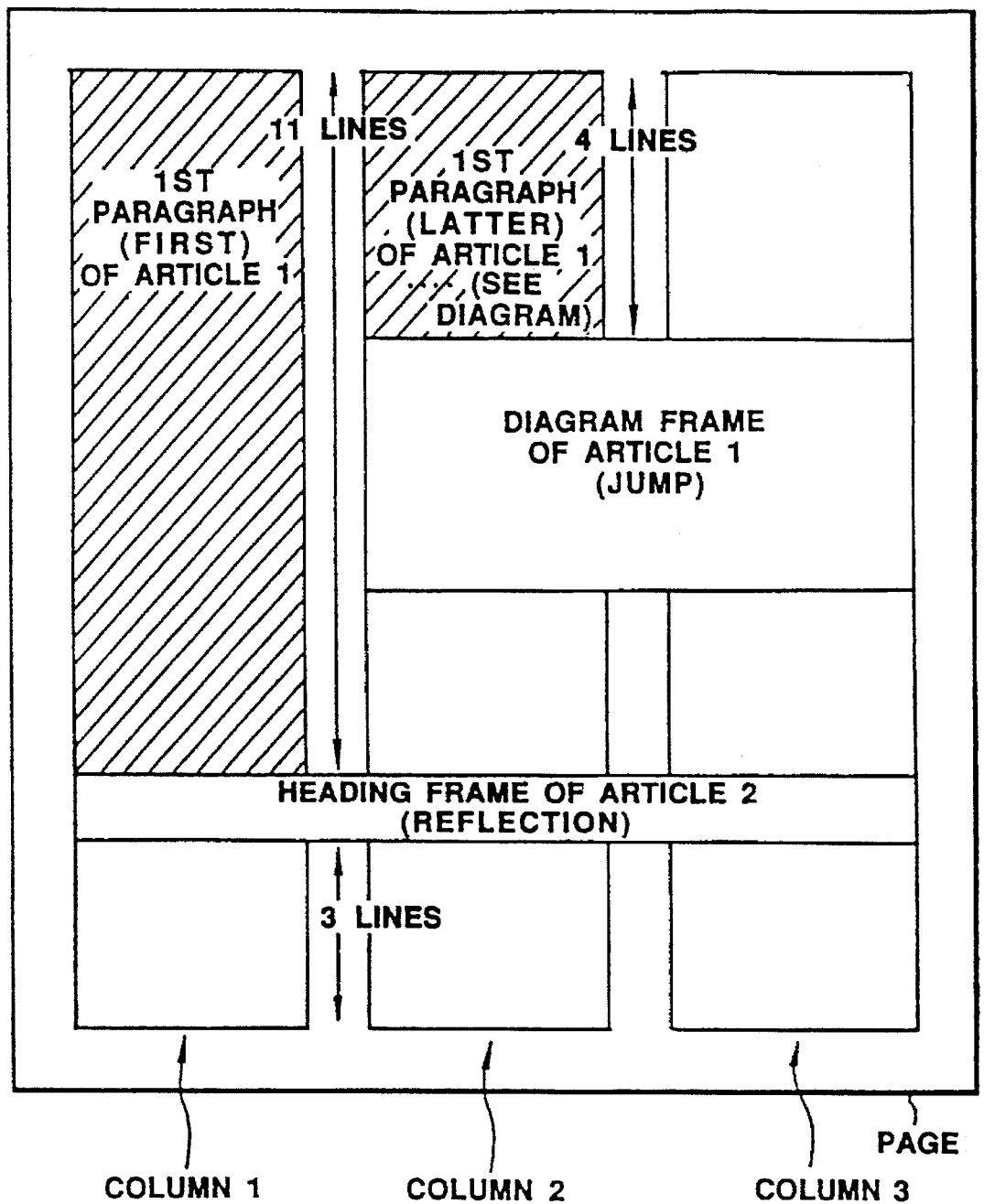
Figure 54:
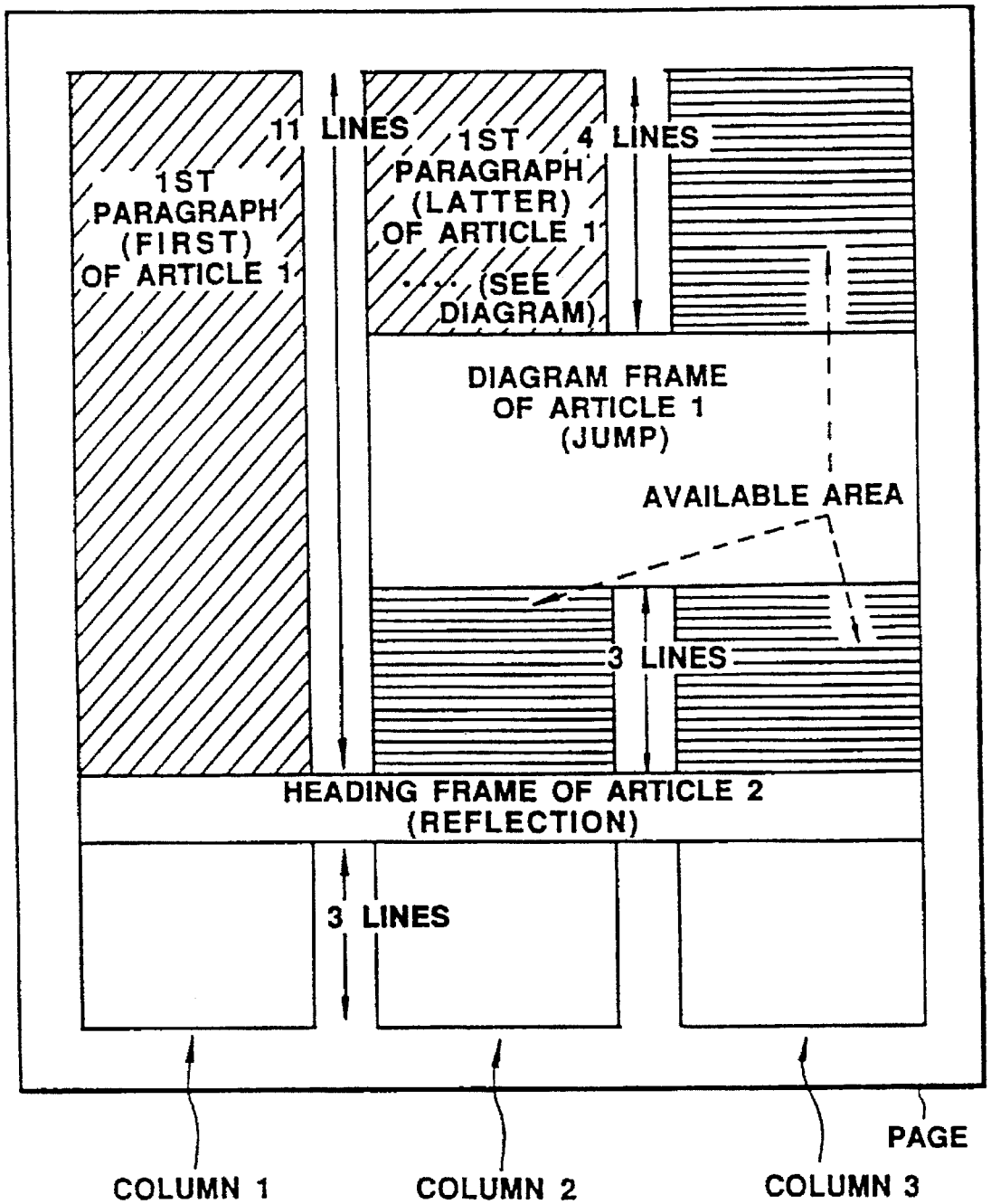

FIG. 53 shows the re-layout completed up to the diagram of the vertical 1 when the vertical position of the head frame of the article 2 is put so as to start with the twelfth line. Re-layout of the second paragraph of the article 1 is then effected. Now, horizontally hatched areas shown in FIG. 54 are ensured as available areas, which are for 10 lines, so that the re-layout of the contents (for 10 lines) of the second paragraph of the article 1 is effected successfully. Since at this time re-layout involving the vertical disposition of the heading frame of the article 2 has all been effected successfully, the vertical position of the heading frame of the article 2 is fixed and the layout of the heading of the article 2 is completed.

Figure 55:
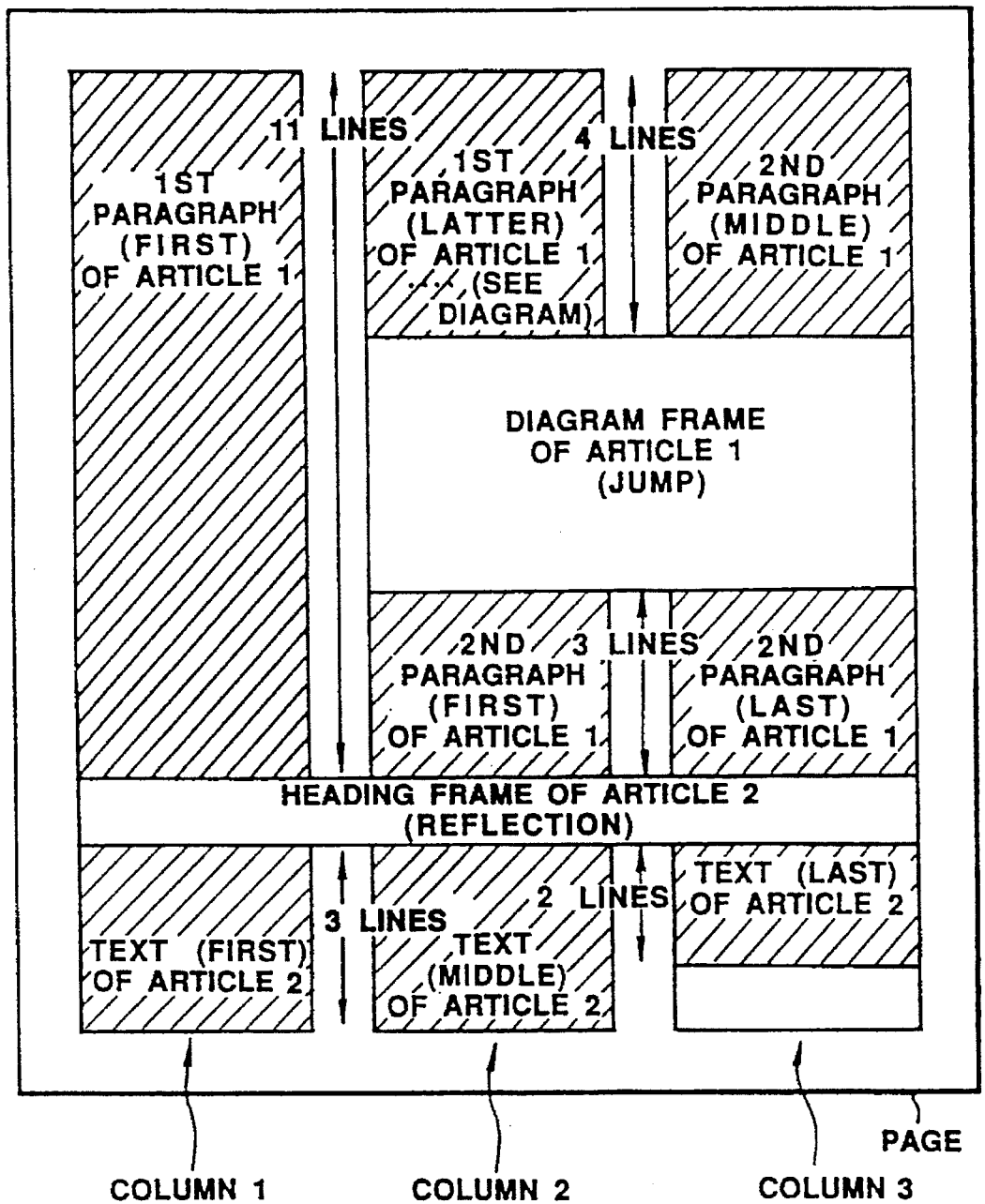

Last, the text of the article 2 is laid out to thereby complete the layout of the overall article, and the resulting state of layout is shown in FIG. 55.

As described in the fifth example, according to the present invention, even jumped frames and reflection frames are automatically laid out in a page.

As described above, according to the present invention, a multi-column document can be automatically generated in which the disposition of a multi-column covering frame and the manner in which the sentences existing before and after the frame flow can vary.

Therefore, automatic generation of various layouts of a document which the user desires is effected to thereby greatly improve the efficiency of generation and edition of documents.

The present invention can be carried out in other various forms without departing from its spirit or main features. Thus, the above embodiments are only illustrative in every respect and should not be construed as restrictive of the present invention. The scope of the present invention is shown by the claims and should not be restricted by the text of the specification. Changes and modifications belonging to equivalents of the claimed invention are intended to be included in the scope of the present invention.

What is claimed is:

1. A document layout processing device wherein a layout structure is generated corresponding to a logical structure of a document, the logical structure comprising a plurality of components, the document layout processing device comprising:

logical structure storing means for storing the logical structure of the document;

page format storing means for storing a page format having a plurality of columns;

document content storing means for storing document contents corresponding to each of the components of the logical structure stored in the logical structure storing means;

layout directive storing means for storing, corresponding to each of the components of the logical structure, layout directive information indicating as to whether a document content corresponding to each of the components of the logical structure is to be laid out in a single column or in a multi-column area that extends over plural columns;

content layout means for laying out the document content in one of the columns or in the multi-column area according to the logical structure stored in the logical structure storing means while referring to the layout directive information stored in the layout directive storing means;

current column storing means for storing a current column that is a column to which the document content is currently laid out; and multi-column area generating means for generating a multi-column area that extends over columns including a current column if the layout directive information indicates that the document content be laid out within a multi-column area when laying out the document content by the content layout means.

2. A document layout processing device according to claim 1, wherein the layout directive information includes column number information indicative of the number of columns over which the multi-column area extends, corresponding to the multi-column area, and the multi-column area generating means generates a multi-column area which includes the current column stored in the current column storing means and extends over columns of the number indicated by the column number information.

3. A document layout processing device according to claim 1, wherein the layout directive information includes layout type information indicative of whether a document content to be laid out in the column is laid out in such a manner as to be reflected at the multi-column area or to jump the multi-column area, and the document content layout means lays out the document content by referring to the layout type information when the multi-column area is generated by the multi-column area generating means.

4. A document layout processing device according to claim 1, wherein the multi-column area generating means comprises:

initial placement means for placing the multi-column area at an initial place while referring to the current column stored in the current column storing means;

subsequent layout object determining means for determining components of the logical structure that become necessary to be subsequently laid out due to the placement of the multi-column area;

multi-column area position determining means for performing subsequent layout of the components determined by the subsequent layout object determining means, and when the subsequent layout is not successfully performed, for repeatedly changing the position of the multi-column area until the subsequent layout is successfully performed.

5. A document layout processing device wherein a layout structure is generated corresponding to a logical structure of a document, the document comprising a plurality of document elements, the document layout processing device comprising:

logical structure holding means for holding hierarchical logical structure of document elements constituting a document to be laid out;

document content holding means for holding a document content of each of the document elements of the document to be laid out;

page format holding means for holding a page format having a plurality of columns;

layout directive holding means for holding layout directive information which includes first information indicative of whether the content of each document element of the document to be laid out is laid out within a first frame structure which corresponds to each column of the page format held in the page format holding means or within a second frame structure which extends a plurality of columns of the page format, second information indicative of the number of columns over which the second frame structure extends, and third information indicative of whether the second frame structure is a reflective frame structure where the content of the document element to be laid out within the first frame structure is reflected by the second frame structure or a jump-over frame structure where the content is jumped over the second frame structure in the process of laying out the content with the first frame structure;

layout structure generating means for generating, in response to a page request and based on a page object corresponding to the page and the page format held in the page format holding means, frame objects, the number of which corresponds to the number of columns corresponding to the first frame structure that are directly subordinate of the page object, adding a first attribute data indicative of a column number to the frame objects, generating a frame object corresponding to the second frame structure based on the layout directive information held in the layout directive holding means, and generating a layout structure corresponding to the page by adding a second attribute data including the first information and the second information to the frame object;

layout structure holding means for holding the layout structure generated by the layout structure generating means;

content layout means for laying out a content of the document element to be laid out held in the document content holding means within a frame object corresponding to the first frame structure of the layout structure or a frame object corresponding to the second frame structure, for each of the document elements while referring to the layout directive information;

identification means for identifying as to whether a frame object of the layout structure held in the layout structure holding means corresponds to the second frame structure based on attribute information of the frame object; and layout structure arranging means for, when the identification means identifies that the frame object corresponds to the second frame structure, determining a layout position of the frame object on the page corresponding to a document element which appears immediately before a document element which appears immediately before a document element which is to be laid out within the second frame structure.

6. A document layout processing device according to claim 5, wherein the frame structure arranging means comprises:

horizontal position determining means for determining the horizontal position of the second frame structure from the second information of the second attribute information which is added to the frame object corresponding to the second frame structure and from the first attribute information of the last frame object to which a document element has already been laid out before the document element to be laid out to a frame object corresponding to the second frame structure;

vertical position determining means for determining vertical position of the second frame structure corresponding to the content of the document element which has already been laid out before the document element to be laid out to a frame object corresponding to the second frame structure; and subsequent layout means for subsequently laying out a document element which has already been laid out before a document element to be laid out to a frame object corresponding to the second frame structure while referring to the second attribute information added to the frame object corresponding to the second frame structure, after determining the position of the frame object corresponding to the second frame structure by the horizontal position determining means and the vertical position determining means.

7. A document layout processing device according to claim 5, wherein the subsequent layout means comprises:

subsequent layout object determining means for determining a subsequent layout object by retrieving a layout structure which is necessary for subsequent layout from layout structures which have already been laid out; and subsequent layout effecting means for effecting a subsequent layout processing for a subsequent layout object determined by the subsequent layout object determining means.

8. A document layout processing device according to claim 5, wherein the content layout means comprises:

available area generating means for generating, from a layout structure which has already been generated, an available area where a document content can be laid out within the layout structure;

available area holding means for holding available area information indicative of an available area generating by the available area generating means; and block generating means for generating a block indicative of a fixed multi-column area to which a document content of the layout object is laid out based on the document content of the layout object and the available area information held in the available area holding means.

9. A method of generating a layout structure of a document having a plurality of columns in accordance with a logical structure of the document, comprising:

a first step of indicating as to whether a document content corresponding to each of the components of the logical structure of the document is to be laid out within a single column or within a multi-column area which extends to two columns or more of the plurality of columns;

a second step of laying out the document content within a single column when the first step indicates that the document content is to be laid out within a single column;

a third step of generating a multi-column area and laying out the document content within the multi-column area when the first step indicates that the document content is to be laid out within a multi-column area; and a fourth step of determining a position of the multi-column area generated by the third step while referring to a component of the logical structure, which component corresponds to a document component in the logical structure which has already been laid out.

10. A method of generating a layout structure of a document according to claim 9, wherein the first step comprises a column number indicating step of indicating the number of columns over which the multi-column area extends, and the third step generates a multi-column area at a position where the multi-column area extends columns of the number indicated at the first step.

11. A method of generating a layout structure of a document according to claim 9, wherein the first step comprises a layout type indicating step of indicating a layout type as to whether the document content to be laid out within a single column is reflected by the multi-column area or the document content jumps over the multi-column area during its layout process, so that the document content is laid out within a single column while referring to the indication by the layout type indicating the third step.

12. A method of generating a layout structure of a document according to claim 11, wherein the fourth step comprises:

an initial placement step for placing the multi-column area at an initial position;

a subsequent layout object determining step for determining a component of the logical structure necessary for subsequent layout which is caused by the placement of the multi-column area; and a multi-column area position determining step of effecting a subsequent layout for the document content of the component determined by the subsequent layout object determining step, and when the subsequent layout is not successfully effected, for repeatedly performing the subsequent layout until it is effected successfully.

13. A method of laying out a document including a first document element which is to be laid out to a first frame structure corresponding to each column of a page and a second document element which is to be laid out to a second frame structure which extends to a plurality of columns, comprising:

a first step of generating a first frame structure corresponding to each column of a page;

a second step of identifying whether a document content to be laid out belongs to the first document element or the second document element;

a third step of laying out the document content in accordance with the first frame structure when the document content is identified as belonging to the first document element;

a fourth step of generating a second frame structure extending to a plurality of columns and retrieving a document element to be subsequently laid out from said second document element which has already been laid out by the generation of the second frame structure, when the document content is identified as belonging to the second document element;

a fifth step of setting an available area to which the retrieved document element which is to be subsequently laid out can be laid out onto a page in connection with the second frame structure generated by the fourth step; and a sixth step of changing the available area which is set by the fifth step by moving the second frame structure which is generated by the fourth step so as to determine a multi-column area to which the retrieved document element to be subsequently laid out can be subsequently laid out.

14. A method of generating a layout structure of a document according to claim 13, wherein the second frame structure has column number information indicative of the number of columns over which the second frame structure extends as an attribute information, and the fourth step determines horizontal position of the second frame structure which is generated based on the column number information.

15. A method of generating a layout structure of a document according to claim 13, wherein the second frame structure has frame structure type information as attribute information indicative of whether a document element to be laid out before a document element to be laid out to the second frame structure is a reflective frame structure where it is laid out in such a manner as to be reflected at the second frame structure or a jumping structure where it is laid out in such a manner as to jump the second frame structure, and the fourth step retrieves a document element to be subsequently laid out based on the frame structure type information.

* * * * *